United States Patent
Liu et al.

(10) Patent No.: US 11,608,458 B2
(45) Date of Patent: Mar. 21, 2023

(54) ADHESION-PROMOTING INTERLAYER COMPOSITIONS CONTAINING ORGANIC TITANATES/ZIRCONATES AND METHODS OF USE

(71) Applicant: PRC-DeSoto International, Inc., Sylmar, CA (US)

(72) Inventors: JianCheng Liu, Arcadia, CA (US); Nagarajan Srivatsan, Diamond Bar, CA (US)

(73) Assignee: PRC-DESOTO INTERNATIONAL, INC., Slymar, CA (US)

( * ) Notice: Subject to any disclaimer, the term of this patent is extended or adjusted under 35 U.S.C. 154(b) by 490 days.

(21) Appl. No.: 16/721,496

(22) Filed: Dec. 19, 2019

(65) Prior Publication Data
US 2021/0189206 A1  Jun. 24, 2021

(51) Int. Cl.
| | |
|---|---|
| *C09J 183/08* | (2006.01) |
| *C08K 3/013* | (2018.01) |
| *B32B 15/08* | (2006.01) |
| *B32B 27/28* | (2006.01) |
| *C08K 3/08* | (2006.01) |
| *C08K 5/05* | (2006.01) |
| *C08K 5/06* | (2006.01) |
| *C08K 5/07* | (2006.01) |
| *C08K 5/56* | (2006.01) |
| *C09J 183/10* | (2006.01) |
| *C08G 77/26* | (2006.01) |

(52) U.S. Cl.
CPC ............. *C09J 183/08* (2013.01); *B32B 15/08* (2013.01); *B32B 27/286* (2013.01); *C08K 3/013* (2018.01); *C08K 3/08* (2013.01); *C08K 5/05* (2013.01); *C08K 5/06* (2013.01); *C08K 5/07* (2013.01); *C08K 5/56* (2013.01); *C09J 183/10* (2013.01); *B32B 2250/02* (2013.01); *B32B 2310/08* (2013.01); *B32B 2311/24* (2013.01); *B32B 2311/30* (2013.01); *B32B 2386/00* (2013.01); *B32B 2581/00* (2013.01); *C08G 77/26* (2013.01); *C08K 2003/0881* (2013.01); *C09J 2203/00* (2013.01); *C09J 2483/00* (2013.01)

(58) Field of Classification Search
USPC ......................................... 106/287.1–287.16
See application file for complete search history.

(56) References Cited

U.S. PATENT DOCUMENTS

| | | | |
|---|---|---|---|
| 3,022,196 A * | 2/1962 | Jenkins et al. ......... | C08G 77/04 428/355 R |
| 4,366,307 A | 12/1982 | Singh et al. | |
| 4,389,432 A | 6/1983 | Inoue et al. | |
| 4,609,762 A | 9/1986 | Morris et al. | |
| 5,178,675 A | 1/1993 | Sexsmith | |
| 5,225,472 A | 7/1993 | Cameron et al. | |
| 5,650,474 A | 7/1997 | Yamaya et al. | |
| 5,750,197 A | 5/1998 | Van Ooij et al. | |
| 5,888,656 A | 3/1999 | Suzuki et al. | |
| 5,907,015 A * | 5/1999 | Sexsmith ............... | C08G 77/26 524/588 |
| 6,172,179 B1 | 1/2001 | Zook et al. | |
| 6,525,168 B2 | 2/2003 | Zook et al. | |
| 6,875,836 B2 | 4/2005 | Yoshihara et al. | |
| 7,438,974 B2 | 10/2008 | Obuhowich | |
| 8,513,339 B1 | 8/2013 | Keledjian et al. | |
| 2001/0032568 A1 | 10/2001 | Schutt | |
| 2001/0036554 A1 | 11/2001 | Jin et al. | |
| 2001/0056141 A1 | 12/2001 | Schutt | |
| 2004/0091716 A1 | 5/2004 | Van Den Berg et al. | |
| 2004/0131793 A1 | 7/2004 | Bier et al. | |
| 2005/0288474 A1 * | 12/2005 | Matsuda ............... | C09D 171/02 428/447 |
| 2006/0105101 A1 | 5/2006 | Pialet et al. | |
| 2006/0251908 A1 * | 11/2006 | Fukasawa ............ | C09D 183/14 106/287.11 |
| 2006/0275616 A1 | 12/2006 | Clough et al. | |
| 2008/0081120 A1 | 4/2008 | Van Ooij et al. | |
| 2008/0268162 A1 | 10/2008 | Borovik et al. | |
| 2008/0268216 A1 | 10/2008 | Schwoeppe et al. | |
| 2010/0010133 A1 | 1/2010 | Zook et al. | |
| 2010/0041839 A1 | 2/2010 | Anderson et al. | |
| 2010/0191001 A1 | 7/2010 | Wassmer et al. | |
| 2011/0148294 A1 | 6/2011 | Krajka et al. | |
| 2011/0268899 A1 | 11/2011 | Albert et al. | |
| 2011/0319559 A1 | 12/2011 | Kania et al. | |
| 2012/0040103 A1 | 2/2012 | Keledjian et al. | |
| 2012/0040104 A1 | 2/2012 | Keledjian et al. | |
| 2013/0284359 A1 | 10/2013 | Virnelson | |
| 2013/0344287 A1 | 12/2013 | Keledjian et al. | |

(Continued)

FOREIGN PATENT DOCUMENTS

| | | | |
|---|---|---|---|
| CN | 1407042 A | | 4/2003 |
| CN | 103773235 A | | 5/2014 |

(Continued)

OTHER PUBLICATIONS

Machine translation of JP 2015-010178 (no date).*

(Continued)

*Primary Examiner* — Marc S Zimmer
(74) *Attorney, Agent, or Firm* — William Lambert

(57) ABSTRACT

Adhesion-promoting compositions containing organic titanates and/or organic zirconates and the use of the adhesion-promoting compositions to provide adhesion-promoting layers to enhance adhesion between metal substrates and an overlying free radical-polymerized sealant are disclosed.

21 Claims, No Drawings

(56) References Cited

U.S. PATENT DOCUMENTS

| | | |
|---|---|---|
| 2013/0345372 A1 | 12/2013 | Blackford et al. |
| 2014/0069293 A1 | 3/2014 | Albert et al. |
| 2014/0186543 A1 | 7/2014 | Keledjian et al. |
| 2014/0272155 A1 | 9/2014 | Kramer et al. |
| 2014/0275461 A1 | 9/2014 | Rao et al. |
| 2015/0115311 A1 | 4/2015 | Yoshida et al. |
| 2016/0200913 A1 | 7/2016 | Matsukawa et al. |
| 2017/0321022 A1* | 11/2017 | Sano .................. B32B 15/06 |

FOREIGN PATENT DOCUMENTS

| | | |
|---|---|---|
| EA | 001588 B1 | 6/2001 |
| EP | 1659160 | 5/2006 |
| JP | 54063176 A | 5/1979 |
| JP | 56125464 A | 10/1981 |
| JP | 2000-256620 A | 9/2000 |
| JP | 2003-176360 A | 6/2003 |
| JP | 2003-531924 A | 10/2003 |
| JP | 2005249031 | 9/2005 |
| JP | 2010-537016 A | 12/2010 |
| JP | 5525431 A | 6/2011 |
| JP | 2015-010178 A * | 1/2015 |
| JP | 2015010178 | 1/2015 |
| RU | 2447113 C2 | 9/2007 |
| RU | 2392288 C2 | 6/2010 |
| RU | 2524342 C1 | 7/2014 |

OTHER PUBLICATIONS

International Search Report and Written Opinion issued in PCT Application No. PCT/US2020/065772, dated Mar. 24, 2021, 6 pages.

Heitz et al., "Cross-condensation and particle growth in aqueous silane mixtures at low concentration," Journal of Colloid and Interface Science, 2006, vol. 298, p. 192-201.

International Search Report and Written Opinion for PCT Application No. PCT/US2016/020602, dated Jun. 1, 2016, 8 pages.

* cited by examiner

US 11,608,458 B2

ADHESION-PROMOTING INTERLAYER COMPOSITIONS CONTAINING ORGANIC TITANATES/ZIRCONATES AND METHODS OF USE

FIELD

The disclosure relates to adhesion-promoting compositions and the use of the adhesion-promoting compositions to provide adhesion-promoting layers to enhance adhesion between metal substrates and free radical-polymerized sealants.

BACKGROUND

It is desirable that a sealant adhere to a variety of metal substrates. Adhesion-promoting layers can be used to enhance the adhesion of an overlying free radical-polymerized sealant to an underlying metal substrate.

SUMMARY

According to the present invention, adhesion-promoting compositions comprise: an organic titanate, an organic zirconate, or a combination thereof; and an alkoxysilane composition, wherein the alkoxysilane composition comprises: an amine-functional alkoxysilane; an alkenyl-functional alkoxysilane; and an organic solvent.

According to the present invention, methods of preparing an adhesion-promoting composition comprise: (a) combining, to form an alkoxysilane composition: from 50 wt % to 95 wt % of an organic solvent; from 1 wt % to 30 wt % of an amino-functional alkoxysilane; and from 1 wt % to 30 wt % of an alkenyl-functional alkoxysilane; wherein wt % is based on the total weight of the alkoxysilane composition; (b) heating the alkoxysilane composition to a temperature up to 100° C. for at least 30 minutes to provide a reacted alkoxysilane composition; (c) cooling the reacted alkoxysilane composition to 25° C.; and (d) combining from 1 wt % to 30 wt % of an organic zirconate and/or an organic titanate and from 70 wt % to 99 wt % of the cooled, reacted alkoxysilane composition to provide a reacted adhesion-promoting composition, wherein wt % is based on the total weight of the adhesion-promoting composition.

According to the present invention, sealant systems comprise: (a) an adhesion-promoting layer overlying a substrate, wherein the adhesion-promoting layer comprises: from 10 wt % to 90 wt % of an organic titanate, an organic zirconate, or a combination thereof; and from 10 wt % to 90 wt % of alkoxysilanes, wherein the alkoxysilanes comprise an amino-functional alkoxysilane and an alkenyl-functional alkoxysilane; wherein wt % is based on the total weight of the adhesion-promoting layer; and (b) a sealant overlying the adhesion-promoting layer.

DETAILED DESCRIPTION

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. [9] A dash that is not between two letters or symbols is used to indicate a point of bonding for a substituent or between two atoms. For example, —$CONH_2$ is attached to another moiety through the carbon atom.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). A branched alkanediyl has a minimum of three carbon atoms. An alkanediyl can be $C_{2-14}$ alkanediyl, $C_{2-10}$ alkanediyl, $C_{2-8}$ alkanediyl, $C_{2-6}$ alkanediyl, $C_{2-4}$ alkanediyl, or $C_{2-3}$ alkanediyl. Examples of alkanediyl groups include methane-diyl (—$CH_2$—), ethane-1,2-diyl (—$CH_2CH_2$—), propane-1,3-diyl and iso-propane-1,2-diyl (e.g., —$CH_2CH_2CH_2$— and —$CH(CH_3)CH_2$—), butane-1,4-diyl (—$CH_2CH_2CH_2CH_2$—), pentane-1,5-diyl (—$CH_2CH_2CH_2CH_2CH_2$—), hexane-1,6-diyl (—$CH_2CH_2CH_2CH_2CH_2CH_2$—), heptane-1,7-diyl, octane-1,8-diyl, nonane-1,9-diyl, decane-1,10-diyl, and dodecane-1,12-diyl. "Alkanecycloalkyl" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. Each cycloalkyl and/or cycloalkanediyl group(s) can be $C_3$-6, $C_{5-6}$, cyclohexyl or cyclohexanediyl. Each alkyl and/or alkanediyl group(s) can be $C_{1-6}$, $C_{1-4}$, $C_{1-3}$, methyl, methanediyl, ethyl, or ethane-1,2-diyl. An alkanecycloalkyl group can be $C_{4-18}$ alkanecycloalkyl, $C_{4-16}$, alkanecycloalkyl, $C_{4-12}$ alkanecycloalkyl, $C_{4-8}$ alkanecycloalkyl, $C_{6-12}$ alkanecycloalkyl, $C_{6-10}$ alkanecycloalkyl, or $C_{6-9}$ alkanecycloalkyl. Examples of alkanecycloalkyl groups include 1,1,3,3-tetramethylcyclohexane and cyclohexylmethane.

"Alkanecycloalkanediyl" refers to a diradical of an alkanecycloalkane group. An alkanecycloalkanediyl group can be $C_{4-18}$ alkanecycloalkanediyl, $C_{4-16}$ alkanecycloalkanediyl, $C_{4-12}$alkanecycloalkanediyl, $C_{4-8}$ alkanecycloalkanediyl, $C_{6-12}$ alkanecycloalkanediyl, $C_{6-10}$ alkanecycloalkanediyl, or $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkanearene" refers to a hydrocarbon group having one or more aryl and/or arenediyl groups and one or more alkyl and/or alkanediyl groups, where aryl, arenediyl, alkyl, and alkanediyl are defined here. Each aryl and/or arenediyl group(s) can be $C_{6-12}$, $C_{6-10}$, phenyl or benzenediyl. Each alkyl and/or alkanediyl group(s) can be $C_{1-6}$, $C_{1-4}$, $C_{1-3}$, methyl, methanediyl, ethyl, or ethane-1,2-diyl. An alkanearene group can be $C_{4-18}$ alkanearene, $C_{4-16}$ alkanearene, $C_{4-12}$ alkanearene, $C_{4-8}$ alkanearene, $C_{6-12}$ alkanearene, $C_{6-10}$ alkanearene, or $C_{6-9}$ alkanearene. Examples of alkanearene groups include diphenyl methane.

"Alkanearenediyl" refers to a diradical of an alkanearene group. An alkanearenediyl group can be $C_{4-18}$ alkanearenediyl, $C_{4-16}$ alkanearenediyl, $C_{4-12}$ alkanearenediyl, $C_{4-8}$ alkanearenediyl, $C_{6-12}$ alkanearenediyl, $C_{6-10}$ alkanearenediyl, or $C_{6-9}$ alkanearenediyl. An example of an alkanearenediyl group is diphenyl methane-4,4'-diyl.

"Alkenyl" group refers to the structure $-CR=C(R)_2$ where the alkenyl group is a terminal group and is bonded to a larger molecule. In such embodiments, each R can independently comprise, for example, hydrogen and $C_{1-3}$ alkyl. Each R can be hydrogen and an alkenyl group can have the structure $-CH=CH_2$.

"Alkynyl" group refers to a moiety $-C\equiv CR$ where the alkynyl group is a terminal group and is bonded to a larger molecule. In such embodiments, each R can independently comprise, for example, hydrogen or $C_{1-3}$ alkyl. Each R can be hydrogen and an alkynyl group can have the structure $-C\equiv CH$.

"Alkoxy" refers to a $-OR$ group where R is alkyl as defined herein. Examples of alkoxy groups include methoxy, ethoxy, n-propoxy, isopropoxy, and n-butoxy. An alkoxy group can be, for example, $C_{1-8}$ alkoxy, $C_{1-6}$ alkoxy, $C_{1-4}$ alkoxy, or $C_{1-3}$ alkoxy.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be, for example, $C_{1-6}$ alkyl, $C_{1-4}$ alkyl, or $C_{1-3}$ alkyl. Examples of alkyl groups include methyl, ethyl, n-propyl, iso-propyl, n-butyl, iso-butyl, tert-butyl, n-hexyl, n-decyl, and tetradecyl.

"Arenediyl" refers to diradical monocyclic or polycyclic aromatic group. Examples of arenediyl groups include benzene-diyl and naphthalene-diyl. An arenediyl group can be, for example, $C_{6-12}$ arenediyl, $C_{6-10}$ arenediyl, $C_{6-9}$ arenediyl, or benzene-diyl.

"Aryl" refers to a monovalent aromatic hydrocarbon radical derived by the removal of one hydrogen atom from a single carbon atom of a parent aromatic ring system. Aryl encompasses 5- and 6-membered carbocyclic aromatic rings, for example, benzene; bicyclic ring systems wherein at least one ring is carbocyclic and aromatic, for example, naphthalene, indane, and tetralin; and bicyclic ring systems wherein at least one ring is carbocyclic and aromatic, for example, fluorene. Aryl encompasses multiple ring systems having at least one carbocyclic aromatic ring fused to at least one carbocyclic aromatic ring, cycloalkyl ring, or heterocycloalkyl ring. For example, aryl includes a phenyl ring fused to a 5- to 7-membered heterocycloalkyl ring containing one or more heteroatoms selected from N, O, and S. For such fused, bicyclic ring systems wherein only one of the rings is a carbocyclic aromatic ring, the radical carbon atom may be at the carbocyclic aromatic ring or at the heterocycloalkyl ring. Examples of aryl groups include groups derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, pentacene, pentalene, pentaphene, perylene, phenalene, phenanthrene, picene, pleiadene, pyrene, pyranthrene, rubicene, biphenylene, binaphthalene, and the like. In certain embodiments, an aryl group is $C_{6-10}$ aryl, $C_{6-9}$ aryl, $C_{6-8}$ aryl, and in certain embodiments, phenyl. Aryl, however, does not encompass or overlap in any way with heteroaryl, separately defined herein.

"Cycloalkanediyl" refers to a diradical saturated monocyclic or polycyclic hydrocarbon group. A cycloalkanediyl group can be, for example, $C_{3-12}$ cycloalkanediyl, $C_{3-8}$ cycloalkanediyl, $C_{3-6}$ cycloalkanediyl, or $C_{5-6}$ cycloalkanediyl. Examples of cycloalkanediyl groups include cyclohexane-1,4-diyl, cyclohexane-1,3-diyl, and cyclohexane-1,2-diyl.

"Cycloalkyl" refers to a saturated monocyclic or polycyclic hydrocarbon mono-radical group. A cycloalkyl group can be, for example, $C_{3-12}$ cycloalkyl, $C_{3-8}$ cycloalkyl, $C_{3-6}$ cycloalkyl, or $C_{5-6}$ cycloalkyl.

"Heteroalkanediyl" refers to an alkanediyl group in which one or more of the carbon atoms are replaced with a heteroatom, such as N, O, S, and/or P. In a heteroalkanediyl, the one or more heteroatoms can be N and/or O.

"Heterocycloalkanediyl" refers to a cycloalkanediyl group in which one or more of the carbon atoms are replaced with a heteroatom, such as N, O, S, and/or P. In a heterocycloalkanediyl, the one or more heteroatoms can be N and/or O.

"Heteroarenediyl" refers to an arenediyl group in which one or more of the carbon atoms are replaced with a heteroatom, such as N, O, S, and/or P. In a heteroarenediyl, the one or more heteroatoms can be N and/or O.

"Heteroaryl" refers to a monovalent heteroaromatic radical derived by the removal of one hydrogen atom from a single atom of a parent heteroaromatic ring system. Heteroaryl encompasses multiple ring systems having at least one heteroaromatic ring fused to at least one other ring, which may be aromatic or non-aromatic. For example, heteroaryl encompasses bicyclic rings in which one ring is heteroaromatic and the second ring is a heterocycloalkyl ring. For such fused, bicyclic heteroaryl ring systems wherein only one of the rings contains one or more heteroatoms, the radical carbon may be at the aromatic ring or at the heterocycloalkyl ring. In certain embodiments, when the total number of N, S, and O atoms in the heteroaryl group exceeds one, the heteroatoms may or may not be adjacent to one another.

In certain embodiments, the total number of heteroatoms in the heteroaryl group is not more than two. In certain embodiments of heteroaryl, the heteroatomic group is selected from $-O-$, $-S-$, $-NH-$, $-N(-CH_3)-$, $-SO-$, and $-SO_2-$, in certain embodiments, the heteroatomic group is selected from $-O-$ and $-NH-$, and in certain embodiments the heteroatomic group is $-O-$ or $-NH-$. A heteroaryl group can be selected from $C_{5-10}$ heteroaryl, $C_{5-9}$ heteroaryl, $C_{5-8}$ heteroaryl, $C_{5-7}$ heteroaryl, and $C_{5-6}$ heteroaryl, such as $C_5$ heteroaryl and $C_6$ heteroaryl.

Examples of heteroaryl groups include groups derived from acridine, arsindole, carbazole, α-carboline, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole, xanthene, thiazolidine, oxazolidine, and the like. In certain embodiments, heteroaryl groups are those derived from thiophene, pyrrole, benzothiophene, benzofuran, indole, pyridine, quinoline, imidazole, oxazole, or pyrazine. For example, in certain embodiments, heteroaryl is $C_5$ heteroaryl and is selected from furyl, thienyl, pyrrolyl, imidazolyl, pyrazolyl, isothiazolyl, or isoxazolyl. In certain embodiments, heteroaryl is $C_6$ heteroaryl, and is selected from pyridinyl, pyrazinyl, pyrimidinyl, and pyridazinyl.

A "polyalkenyl" refers to a compound having at least two alkenyl groups. The at least two alkenyl groups can be terminal alkenyl groups and such polyalkenyls can be referred to as alkenyl-terminated compounds. Alkenyl groups can also be pendent alkenyl groups. A polyalkenyl can be a dialkenyl, having two alkenyl groups. A polyalkenyl can have more than two alkenyl groups such as from three to six alkenyl groups. A polyalkenyl can comprise a single type of polyalkenyl, can be a combination of polyalkenyls having the same alkenyl functionality, or can be a combination of poly alkenyls having different alkenyl functionalities.

A "polyalkenyl prepolymer" refers to a polyalkenyl having at least one repeat unit in the polyalkenyl backbone. A polyalkenyl prepolymer generally can have a number average molecular weight in the range from 500 Da to 6,000 Da, such as from 500 Da to 4,000 Da, or from 500 Da to 2,000 Da.

A "monomeric polyalkenyl" refers to a polyalkenyl that does not include repeat units in the polyalkenyl backbone. A monomeric polyalkenyl generally has a number average molecular weight that is less than that of a polyalkenyl prepolymer. Monomeric polyalkenyls can be difunctional or can have an alkenyl functionality greater than two.

A "polyalkynyl" refers to a compound having at least two alkynyl groups. The at least two alkynyl groups can be terminal alkynyl groups and such polyalkynyls can be referred to as alkynyl-terminated compounds. Alkynyl groups can also be pendent alkynyl groups. A polyalkynyl can be a dialkynyl, having two alkynyl groups. A polyalkynyl can have more than two alkynyl groups such as from three to six alkynyl groups. A polyalkynyl can comprise a single type of polyalkynyl, can be a combination of polyalkynyls having the same alkynyl functionality, or can be a combination of polyalkynyls having different alkynyl functionalities.

A "polyalkynyl prepolymer" refers to a polyalkynyl having at least one repeat unit in the polyalkynyl backbone. A polyalkynyl prepolymer generally can have a number average molecular weight in the range from 500 Da to 6,000 Da, such as from 500 Da to 4,000 Da, or from 500 Da to 2,000 Da.

A "monomeric polyalkynyl" refers to a polyalkynyl that does not include repeat units in the polyalkynyl backbone. A monomeric polyalkynyl generally has a molecular weight that is less than that of a polyalkynyl prepolymer. Monomeric polyalkynyls can be difunctional or can have an alkynyl functionality greater than two.

A compound having a thiol functionality or an alkenyl functionality refers to a compound which has reactive thiol or alkenyl groups, respectively. The reactive thiol or alkenyl groups may be terminal groups bonded to the ends of the molecule, may be bonded to the backbone of the molecule, or the compound may contain thiol or alkenyl groups that are terminal groups and are bonded to the backbone.

As used herein, the term "cure" or "cured" as used in connection with a composition, e.g., "composition when cured" or a "cured composition," means that any curable or crosslinkable components of the composition are at least partially reacted or crosslinked.

The term "equivalents" refers to the number of functional reactive groups of the substance.

"Equivalent weight" is effectively equal to the molecular weight of a substance, divided by the valence or number of functional reactive groups of the substance. [37] A "backbone" of a prepolymer refers to the segment between the reactive terminal groups. A prepolymer backbone typically includes repeating subunits. For example, the backbone of a polythiol HS—[R]$_n$—SH is —[R]$_n$—.

A "core" of a polyfunctionalizing agent B(—V)$_z$ refers to the moiety B. A "core" of a compound or a polymer refers to the segment between the reactive terminal groups. For example, the core of a polythiol HS—R—SH will be —R—. A core of a compound or prepolymer can also be referred to as a backbone of a compound or a backbone of a prepolymer. A core of a polyfunctionalizing agent can be an atom or a structure such as a cycloalkane, a substituted cycloalkane, heterocycloalkane, substituted heterocycloalkane, arene, substituted arene, heteroarene, or substituted heteroarene from which moieties having a reactive functional are bonded.

"Prepolymer" refers to oligomers, homopolymers, and copolymers. For thiol-terminated prepolymers, molecular weights are number average molecular weights "Mn" as determined by end group analysis using iodine titration. For prepolymers that are not thiol-terminated, the number average molecular weights are determined by gel permeation chromatography using polystyrene standards. A prepolymer comprises reactive groups capable of reacting with another compound such as a curing agent or crosslinker to form a cured polymer. A prepolymer such as a chain-extended polythioether prepolymer provided by the present disclosure can be combined with a curing agent to provide a curable composition, which can cure to provide a cured polymer network. Prepolymers are liquid at room temperature (23° C.) and pressure (760 torr; 101 kPa).

A prepolymer includes multiple repeating subunits bonded to each other than can be the same or different. The multiple repeating subunits make up the backbone of the prepolymer.

A "curable composition" refers to a composition that comprises at least two reactants capable of reacting to form a cured composition. For example, a curable composition can comprise an isocyanate-terminated chain-extended polythioether prepolymer and a polyamine capable of reacting to form a cured polymer. A curable composition may include a catalyst for the curing reaction and other components such as, for example, filler, pigments, and adhesion promoters. A curable composition may be curable at room temperature or may require exposure to elevated temperature such as a temperature above room temperature or other condition(s) to initiate and/or to accelerate the curing reaction. A curable composition can be a free radical polymerizable composition in which the curing reaction proceeds in the presence of free radicals. A curable composition may initially be provided as a two-part composition including, for example, a separate base component and an accelerator component. The base composition can contain one of the reactants participating in the curing reaction such as an isocyanate-terminated chain-extended polythioether prepolymer and the accelerator component can contain the other reactant such as a polyamine. The two components can be mixed shortly before use to provide a curable composition. A curable composition can exhibit a viscosity suitable for a particular method of application. For example, a Class A sealant composition, which is suitable for brush-on applications, can be characterized by a viscosity from 1 poise to 500 poise (0.1 Pa-sec to 50 Pa-sec). A Class B sealant composition, which is suitable for fillet seal applications, can be characterized by a viscosity from 4,500 poise to 20,000 poise (450 Pa-sec to 2,000 Pa-sec). A Class C sealant composition, which is suitable for fay seal applications, can be characterized by a viscosity from 500 poise to 4,500 poise (50 Pa-sec to 450 Pa-sec). The viscosity of compositions (curable compositions) can be measured as described herein.

After the two components of a sealant system are combined and mixed, the curing reaction can proceed, and the viscosity of the curable composition can increase and at some point, will no longer be workable.

The duration between when the two components are mixed to form the curable composition to when the curable composition can no longer be reasonably or practically applied to a surface for its intended purpose can be referred to as the working time. As can be appreciated, the working time can depend on a number of factors including, for example, the curing chemistry, the catalyst used, the application method, and the temperature. Once a curable composition is applied to a surface (and during application), the curing reaction can proceed to provide a cured composition. A cured composition develops a tack-free surface, cures, and then fully cures over a period of time. A curable composition can be considered to be cured when the hardness of the surface is at least Shore 30A for a Class B sealant or a Class C sealant. After a sealant has cured to a hardness of Shore 30A it can take from several days to several weeks for a curable composition fully cure. A composition is considered fully cured when the hardness no longer increases. Depending on the formulation, a fully cured sealant can exhibit, for example, a hardness from Shore 40A to Shore 70A. Shore A hardness is, determined according to ISO 868. For coating applications, a curable composition can have a viscosity, for example, from 200 cps to 800 cps (0.2 Pa-sec to 0.8 Pa-sec). For sprayable coating and sealant compositions, a curable composition can have a viscosity, for example, from 15 cps to 100 cps (0.015 Pa-sec to 0.1 Pa-sec), such as from 20 cps to 80 cps (0.02 Pa-sec to 0.0.8 Pa-sec).

"Curing agent" refers to a compound that has reactive groups that are reactive with the reactive groups of a prepolymer with which it is used to form a cured crosslinked polymer. A curing agent may include monomers, chain-extenders, and crosslinkers. In general, a curing agent is characterized by a low molecular weight, which is less than the molecular weight of the prepolymer with which it is used. A curing agent and the prepolymer are used in a one-to-one equivalent ratio.

"SCOD" refers to cure on demand sealants. Cure-on-demand sealants can include free radical polymerizable compositions in which the curing reaction is proceeds in the presence of free radicals. Free radicals can be generated using radiation-activated free radical initiators, thermally-activated free radical initiators, and/or chemically-activated free radical initiators. SCOD sealants can be formulated as Class A, Class B, or Class C sealants as described in the preceding paragraph. A SCOD sealant in which the free radical curing reaction is initiated upon exposure to UV is referred to as a UV SCOD sealant.

"Substituted" refers to a group in which one or more hydrogen atoms are each independently replaced with the same or different substituent(s). A substituent can comprise halogen, $-S(O)_2OH$, $-S(O)_2$, $-SH$, $-SR$ where R is $C_{1-6}$ alkyl, $-COOH$, $-NO_2$, $-NR_2$ where each R is independently hydrogen, $C_{1-3}$ alkyl, $-CN$, $=O$, $C_{1-6}$ alkyl, $-CF_3$, $-OH$, phenyl, $C_{2-6}$ heteroalkyl, $C_{5-6}$ heteroaryl, $C_{1-6}$ alkoxy, or $-C(O)R$ where R is $C_{1-6}$ alkyl. A substituent can be $-OH$, $-NH_2$, or $C_{1-3}$ alkyl.

"Derived from" as in "a moiety derived from a compound" refers to a moiety that is generated upon reaction of a parent compound with a reactant. For example, a bis(alkenyl) compound such as $CH_2=CH-R-CH=CH_2$ can react with another compound such as a compound having thiol groups to produce the moiety $-(CH_2)_2-R-(CH_2)_2-$, which is derived from the reaction of the alkenyl groups with the thiol groups. For example, for a parent diisocyanate having the structure $O=C=N-R-N=C=O$, a moiety derived from the diisocyanate has the structure $-C(O)-NH-R-NH-C(O)-$. As another example, for a parent non-linear short chain diol having the structure $HO-R-OH$, a moiety derived from the non-linear short-chain diol has the structure $-O-R-O-$.

"Derived from the reaction of —V with a thiol" refers to a moiety $-V'-$ that results from the reaction of a thiol group with a moiety comprising a terminal group reactive with a thiol group. For example, a group V— can comprise $CH_2=CH-CH_2-O-$, where the terminal alkenyl group $CH_2=CH-$ is reactive with a thiol group $-SH$. Upon reaction with a thiol group, the moiety $-V'-$ is $-CH_2-CH_2-CH_2-O-$.

"Dark cure" refers to curing mechanisms that do not require exposure to actinic radiation such as UV radiation to initiate the curing reaction. Actinic radiation may be applied to a dark cure system to accelerate curing of all or a part of a composition but exposing the composition to actinic radiation is not necessary to cure the sample. A dark cure composition can fully cure under dark conditions without exposure to actinic radiation.

Glass transition temperature $T_g$ is determined by dynamic mechanical analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

When reference is made to a chemical group defined, for example, by a number of carbon atoms, the chemical group is intended to include all sub-ranges of carbon atoms as well as a specific number of carbon atoms. For example, a $C_{2-10}$ alkanediyl includes a $C_{2-4}$ alkanediyl, $C_{5-7}$ alkanediyl, and other sub-ranges, such as a $C_2$ alkanediyl, a $C_6$ alkanediyl, and alkanediyls having other specific number(s) of carbon atoms from 2 to 10.

A polyfunctionalizing agent can have the structure of Formula (1):

$$B(-V)_z \qquad (1)$$

where B is the core of the polyfunctionalizing agent, each V is a moiety terminated in a reactive functional group such as a thiol group, an alkenyl group, an alkynyl group, an epoxy group, an isocyanate group, or a Michael acceptor group, and z is an integer from 3 to 6, such as 3, 4, 5, or 6. In polyfunctionalizing agents of Formula (1), each —V can have the structure, for example, —R—SH or —R—CH=$CH_2$, where R can be, for example, $C_{2-10}$ alkanediyl, $C_{2-10}$ heteroalkanediyl, substituted $C_{2-10}$ alkanediyl, or substituted $C_{2-10}$ heteroalkanediyl.

When the moiety V is reacted with another compound the moiety $-V^1-$ results and is said to be derived from the reaction with the other compound. For example, when V is —R—CH=$CH_2$ and is reacted, for example, with a thiol group, the moiety $V^1$ is —R—$CH_2$—$CH_2$— is derived from the reaction.

In polyfunctionalizing agents of Formula (1), B can be, for example $C_{2-8}$ alkane-triyl, $C_{2-8}$ heteroalkane-triyl, $C_{5-8}$ cycloalkane-triyl, $C_{5-8}$ heterocycloalkane-triyl, substituted $C_{5-8}$ cycloalkene-triyl, $C_{5-8}$ heterocycloalkane-triyl, $C_6$ arene-triyl, $C_{4-5}$ heteroarene-triyl, substituted $C_6$ arene-triyl, or substituted $C_4$ 5 heteroarene-triyl.

In polyfunctionalizing agents of Formula (1), B can be, for example, $C_{2-8}$ alkane-tetrayl, $C_{2-8}$ heteroalkane-tetrayl, $C_{5-10}$ cycloalkane-tetrayl, $C_{5-10}$ heterocycloalkane-tetrayl, $C_{6-10}$ arene-tetrayl, $C_4$ heteroarene-tetrayl, substituted $C_{2-8}$ alkane-tetrayl, substituted $C_{2-8}$ heteroalkane-tetrayl, substituted $C_{5-10}$ cycloalkane-tetrayl, substituted $C_{5-10}$ heterocycloalkane-tetrayl, substituted $C_{6-10}$ arene-tetrayl, and substituted $C_{4-10}$ heteroarene-tetrayl.

Examples of suitable alkenyl-terminated polyfunctionalizing agents include triallyl cyanurate (TAC), triallylisocyanurate (TAIC), 1,3,5-triallyl-1,3,5-triazinane-2,4,6-trione1, 3-bis(2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris(prop-2-enyl)-1,3,5-triazinane-2,4-dione, and 1,3,5-tris(2-methylallyl)-1,3,5-triazinane-2,4,6-trione, 1,2,4-trivinylcyclohexane, and combinations of any of the foregoing.

A polyfunctionalizing agent of Formula (1) can be thiol terminated.

Examples of suitable trifunctional thiol-terminated polyfunctionalizing agents include, for example, 1,2,3-propanetrithiol, 1,2,3-benzenetrithiol, heptane-1,3-7-trithiol, 1,3,5-triazine-2,4-6-trithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225,472. Combinations of polyfunctionalizing agents may also be used.

Examples of suitable polythiol polyfunctionalizing agents include pentaerythritol tetra(3-mercapto-propionate) (PETMP), trimethylol-propane tri(3-mercaptopropionate) (TMPMP), tris[2-(3-mercapto-propionyloxy)ethyl]isocyanurate (TEMPIC), di-pentaerythritol hexa(3-mercaptopropionate) (di-PETMP), tri(3-mercaptopropionate) pentaerythritol, triethylolethane tri-(3-mercaptopropionate), and combinations of any of the foregoing.

Examples of suitable mercapto-acetate polythiol polyfunctionalizing agents include pentaerythritol tetramercaptoacetate (PRTMA), trimethylolpropane trimercaptoacetate (TMPMA), ditrimethylolpropane tetramercaptoacetate, and combinations of any of the foregoing.

Examples of suitable polythiol polyfunctionalizing agents include, tris[2-(3-mercaptopropionyloxy)ethyl]isocyanurate, 2,3-di(2-mercaptoethylthio)-1-propane-thiol, and combinations of any of the foregoing.

Other examples of polythiol polyfunctionalizing agents and polythiol monomers include pentaerythritol tetra(3-mercaptopropionate) (PETMP), pentaerythritol tetramercaptoacetate (PETMA), dipentaerythritol tetra(3-mercaptopropionate), dipentaerythritol tetramercaptoacetate, dipentaerythritol penta(3-mercaptopropionate), dipentaerythritol pentamercaptoacetate, dipentaerythritol hexa(3-mercaptopropionate), dipentaerythritol hexamercaptoacetate, ditrimethylolpropane tetra(3-mercaptopropionate), ditrimethylolpropane tetramercaptoacetate, and also alkoxylated, for example, ethoxylated and/or propoxylated, such as ethoxylated, products of these compounds. Examples include, pentaerythritol tetra(3-mercaptopropionate) (PETMP), pentaerythritol tetramercaptoacetate (PETMA), dipentaerythritol tetra(3-mercaptopropionate), dipentaerythritol tetramercaptoacetate, dipentaerythritol penta(3-mercaptopropionate), dipentaerythritol pentamercaptoacetate, dipentaerythritol hexa(3-mercaptopropionate), dipentaerythritol hexamercaptoacetate, ditrimethylolpropane tetra(3-mercaptopropionate), ditrimethylolpropane tetramercaptoacetate, particularly pentaerythritol tetra(3-mercaptopropionate) (PETMP), pentaerythritol tetramercaptoacetate (PETMA), dipentaerythritol hexa(3-mercaptopropionate), dipentaerythritol hexamercaptoacetate, ditrimethylolpropane tetra(3-mercaptopropionate), and ditrimethylolpropane tetramercaptoacetate.

Suitable polythiol polyfunctionalizing agents are commercially available, for example, from Bruno Bock Thiochemicals under the Thiocure® tradename.

"Derived from a polyfunctionalizing agent" refers to a moiety that results from the reaction of a polyfunctionalizing agent with a reactive functional group. For example, a moiety derived from the polyfunctionalizing agent triallyl cyanurate of Formula (2a):

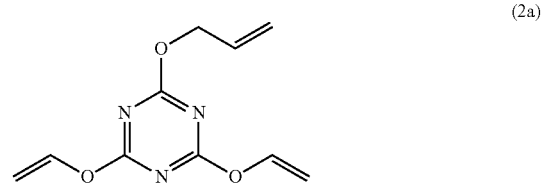 [SMILES: C=CCOc1nc(OC=C)nc(OC=C)n1]

(2a)

results in a moiety having the structure of Formula (2b):

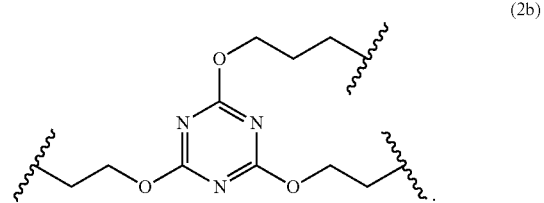 [SMILES: *CCCOc1nc(OCC*)nc(OCC*)n1]

(2b)

where the segments are bonded to the other reactants.

"Polythiol polyfunctionalizing agent" refers to a polythiol having, for example, from 3 to 6 terminal thiol groups. A polythiol polyfunctionalizing agent can have a number average molecular weight, for example, less than 1,400 Da, less than 1,200 Da, less than 1,000 Da, less than 800 Da, less than 700 Da, less than 600 Da, less than 500 Da, less than 400 Da, less than 300 Da, less than 200 Da, or less than 100 Da. Polythiol polyfunctionalizing agents can be represented by the formula $B(-V)_z$, where $B^4$ represents a core of a z-valent polyfunctionalizing agent $B(-V)_z$, z is an integer from 3 to 6; and each —V is a moiety comprising a terminal thiol (—SH) group.

A polythiol or a polyalkenyl can be a polythiol polyfunctionalizing agent or a polyalkenyl polyfunctionalizing agent, respectively.

"Composition" is intended to encompass a product comprising the specified components in the specified amounts, as well as any product which results, directly or indirectly, from the combination of the specified ingredients in the specified amounts.

"Average molecular weight" refers to number average molecular weight. Number average molecular weight can be determined by gel permeation chromatography using a polystyrene standard, or for thiol-terminated prepolymers, can be determined using iodine titration.

"Sulfur-containing prepolymer" refers to a prepolymer in which the repeating unit of the prepolymer backbone comprises sulfur atom such as —S— or —$S_n$— groups. Thiol-terminated prepolymers have reactive thiol groups at the ends of the prepolymer backbone. Prepolymers can have pendent reactive thiol groups extending from the prepolymer backbone. Prepolymers having only thiol-terminal and/or only pendent thiol groups are not encompassed by a sulfur-containing prepolymer.

"Sulfur-containing sealant" refers to a sealant composition having a sulfur content, for example, greater than 10 wt %, greater than 15 wt %, greater than 17.5 wt %, greater than 20 wt %, greater than 25 wt %, or greater than 30 wt %., where wt % is based on the total weight of the organic constituents of the sealant composition. Organic constituents of a sealant composition can include polymerizable constituents such as prepolymers, monomers and polyfunctionalizing agents, adhesion promoters, and other organic additives. A sulfur-containing sealant can have a sulfur content, for example, from 10 wt % to 35 wt %, from 10 wt % to 30 wt %, from 10 wt % to 25 wt %, from 10 wt % to 20 wt %, from 12 wt % to 20 wt %, or from 14 wt % to 20 wt %, where wt % is based on the total weight of the sealant composition. Sealant compositions having a high sulfur content can be more resistant to fluids and solvents.

"Reacted alkoxysilanes" or "reacted alkoxysilane composition" refers to the reaction product of an alkoxysilane composition comprising one or more alkoxysilanes in an organic solvent that has been reacted at a temperature up to 100° C. for at least 30 minutes to provide reacted alkoxysilanes. The alkoxysilane composition can further comprise water and/or an organic titanate, an organic zirconate, or a combination thereof.

A mono-organo-functional alkoxysilane refers to an alkoxysilane having one organo-functional group. A di-organo-functional alkoxysilane refers to an alkoxysilane having two organo-functional groups. A tri-organo-functional alkoxysilane refers to an alkoxysilane having three organo-functional groups. Examples of organo-functional groups include primary amines, secondary amines and alkenyl groups. A secondary amine-functional alkoxysilane refers to an alkoxysilane having one or more secondary amine groups. A dipodal organo-functional alkoxysilane refers to an organo-silane having to alkoxysilane groups.

An "alkoxysilane" refers to a silane have one alkoxy group, two alkoxy groups, or three alkoxy groups. Similarly, an alkoxysilane refers to a compound having at least one alkoxysilane group in which the alkoxysilane group may have one, two, or three alkoxy groups.

Reference is now made to certain compounds, compositions, and methods of the present invention. The disclosed compounds, compositions, and methods are not intended to be limiting of the claims. To the contrary, the claims are intended to cover all alternatives, modifications, and equivalents.

Adhesion between metal substrates and an overlying radical-polymerized sealant can be enhanced by using an adhesion-promoting layer comprising organo-functional alkoxysilanes and an organic titanate and/or an organic zirconate.

Adhesion-promoting compositions provided by the present disclosure can comprise amine-functional alkoxysilanes or combination of amine-functional alkoxysilanes; an alkenyl-functional alkoxysilanes or a combination of alkenyl-functional alkoxysilanes; an organic titanate and/or organic zirconate or a combination of organic titanates and/or organic zirconates; and an organic solvent or combination of organic solvents.

Adhesion-promoting compositions provided by the present disclosure can comprise an organic titanate, an organic zirconate, or a combination thereof; and an alkoxysilane composition, wherein the alkoxysilane composition comprises an amine-functional alkoxysilane, an alkenyl-functional alkoxysilane, and an organic solvent. An adhesion promotion composition and an alkoxysilane composition can further comprise water. An alkoxysilane composition can comprise a non-reacted alkoxysilane composition or a reacted alkoxysilane composition.

Adhesion-promoting compositions provided by the present disclosure can comprise an organic titanate, a combination of organic titanates, an organic zirconate, a combination of organic zirconates, or a combination of any of the foregoing.

An organic titanate can have the structure $Ti(-O-R)_4$, where each R is independently selected from $C_{1-8}$ alkyl or substituted $C_{1-8}$ alkyl. Examples of tetraalkyl titanates include tetraethyl titanate (TET, $Ti(OC_2H_5)_4$), tetra-n-butyl titanate ($T_nBT$, $Ti(OC_4H_9)_4$) octylene glycol titanate (OGT, $Ti(O_2C_8H_{17})_4$), and combinations of any of the foregoing. Tetraalkyl titanates are compatible with water.

An organic titanate compatible in an organic solvent can comprise a chelated organic titanate.

Examples of chelated organic titanates compatible in organic solvents include Tyzor© organic titanates available from Dupont de Nemours.

Examples of suitable organic titanates include Tyzor® AA (titanium acetylacetonate), Tyzor® AA-75 (acetylacetonate titanate chelate), Tyzor® AA-65 (acetylacetonate titanate chelate), Tyzor® AA-105 (acetylacetonate titanate chelate), Tyzor® BTP (n-butyl poly titanate), Tyzor® DC (ethyl acetoacetate titanate chelate), Tyzor® ET (ethyl titanate), Tyzor® GBA (titanium acetylacetonate), Tyzor® LA (lactic acid titanate chelate), Tyzor® NPT (titanium tetrapropanolate), Tyzor® OGT (octyleneglycol titanate), Tyzor® TnBT (tetra-n-butyl titanate), Tyzor® TOT (tetrakis(2-ethylhexyl) titanate), Tyzor® TPT-20B (tetraisopropyl titanate), Tyzor® GBO (titanium acetylacetonate), Tyzor® TE (triethanolamine titanate chelate), Tyzor® 131, and combinations of any of the foregoing.

Chelated organic titanates compatible in water can have the structure:

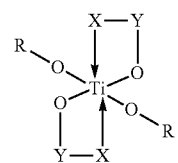

where each R is independently $C_{1-8}$ alkyl or substituted $C_{1-8}$ alkyl, each X is independently an organic group comprising an oxygen or nitrogen atom, each Y is independently a $C_{1-4}$ alkanediyl. For example, each X can independently be an amino radical or a lactate radical.

Examples of suitable organic titanates include titanium diisopropoxide bis(acetylacetonate), titanium(IV) 2-ethylhexyloxide, and combinations thereof.

Examples of organic titanates compatible with water include triethanolamine titanates such as Tyzor® TE and Tyzor® TEP, alkanol amine titanate such as Tyzor® TA and lactic acid titanates such as Tyzor® LA.

Examples of suitable organic titanates include titanium acetylacetonate, tetra n-butyl titanate, tetra isopropyl titanate, tetra 2-ethylhexyl titanate, poly butyl titanate, isopropyl butyl titanate, tetra n-propyl titanate, tetra ethyl titanate, tetra n-propyl titanate, tetra ethyl titanate, tetra tot-butyl titanate, tetra n-propyl zirconate, tetra n-butyl zirconate, and combinations of any of the foregoing.

Other examples of suitable organic titanates include titanium acetylacetonate complex, butyl titanium phosphate, triethanolamine titanate, di-iso-propoxy titanium bis-ethyl acetoacetate, di-iso-butoxy titanium bis-ethyl acetoacetate, alkanolamine titanate complex, titanium ammonium lactate, and combinations of any of the foregoing.

An organic zirconate can have the structure $Zr(-O-R)_4$, where each R can be independently selected from $C_{1-8}$ alkyl or substituted $C_{1-8}$ alkyl. Examples of tetraalkyl zirconates include tetra-n-propyl zirconate and tetra-n-butyl zirconate, and combinations thereof. Tetraalkyl titanates are compatible with water.

An organic zirconate can be compatible with water or with an organic solvent.

An example of an organic zirconate compatible with organic solvents are chelated diethyl citrate zirconate such as Tyzor® ZEC.

Examples of suitable organic zirconates include the sodium salt of zirconium lactate, tetra-n-propyl zirconate, and combinations thereof.

Examples of organic zirconates compatible with water include triethanolamine zirconate such as Tyzor® TEAZ and lactic acid chelated zirconates such as Tyzor® LAZ.

Examples of suitable organic zirconates include, for example, ammonium zirconium lactate acetate, triethanolamine zirconate, the sodium salt of zirconium lactate, and combinations of any of the foregoing.

Examples of suitable organic zirconates include Tyzor® NPZ (zirconium tetra-n-propanolate), Tyzor® TEAZ (ethanolamine zirconium complex), Tyzor® NBZ (zirconium tetra-n-butanolate), Tyzor®217 (zirconium lactate), and combinations of any of the foregoing.

Adhesion-promoting compositions provided by the present disclosure can be prepared by adding an organic titanate, a combination of organic titanates, an organic zirconate, a combination of organic zirconates, or a combination of any of the foregoing to a reacted alkoxysilane composition.

The organic titanates/zirconates can be provided as chelates in a solvent such as isopropanol and water. The solvent content can range, for example, from about 0 wt % to about 30 wt % of the organic titanate/zirconate composition. The active titanate/zirconate content in an adhesion-promoting composition can range, for example, from about 70 wt % to about 100%, the $TiO_2/ZrO_2$ content can range from about 5 wt % to 30 wt %, and the Ti/Zr content can range, for example, from about 5 wt % to 25 wt %, wherein wt % is based on the total weight of the adhesion-promoting composition.

Adhesion-promoting compositions provided by the present disclosure can be prepared by combining an organic titanate/zirconate with a reacted alkoxysilane composition at 25° C. while stirring.

An adhesion-promoting composition provided by the present disclosure can comprise, for example, from 1 wt % to 30 wt % of an organic titanate and/or organic zirconate, from 2 wt % to 25 wt %, from 3 wt % to 20 wt %, from 4 wt % to 15 wt %, from 5 wt % to 10 wt %, from 1 wt % to 9 wt %, from 2 wt % to 8 wt %, or from 3 wt % to 7 wt % of an organic titanate and/or organic zirconate, where wt % is based on the total weight of the adhesion-promoting composition.

An adhesion-promoting composition provided by the present disclosure can comprise, for example, greater than 1 wt % of an organic titanate and/or organic zirconate, greater than 2 wt %, greater than 3 wt %, greater than 5 wt %, greater than 7 wt %, greater than 10 wt %, greater than 15 wt %, greater than 20 wt %, or greater than 25 wt %, of an organic titanate and/or organic zirconate, where wt % is based on the total weight of the adhesion-promoting composition.

An adhesion-promoting composition provided by the present disclosure can comprise, for example, less than 30 wt % of an organic titanate and/or organic zirconate, less than 25 wt %, less than 20 wt %, less than 15 wt %, less than 10 wt %, less than 7 wt %, less than 5 wt %, or less than 2 wt %, of an organic titanate and/or organic zirconate, where wt % is based on the total weight of the adhesion-promoting composition.

Adhesion-promoting compositions provided by the present disclosure can comprise, for example, from 0.05 wt % to 8 wt % titanium and/or zirconium, from 0.1 wt % to 8 wt %, from 0.5 wt % to 6 wt %, from 1 wt % to 5 wt %, or from 2 wt % to 4 wt % titanium and/or zirconium, where wt % is based on the total weight of the adhesion-promoting composition.

Adhesion-promoting compositions provided by the present disclosure can comprise an amine-functional alkoxysilane or a combination of amine-functional alkoxysilanes. An amine-functional alkoxysilane can comprise a non-reacted amine-functional alkoxysilane and/or a reacted amine-functional alkoxysilane.

Adhesion-promoting compositions provided by the present disclosure can comprise a non-reacted amine-functional alkoxysilane or a combination of non-reacted amine-functional alkoxysilanes.

Adhesion-promoting compositions provided by the present disclosure can comprise a reacted amine-functional alkoxysilane or a combination of reacted amine-functional alkoxysilanes.

An amine-functional alkoxysilane can comprise a primary amine group and/or a secondary amine group.

An amine-functional alkoxysilane can comprise a monoamine-functional alkoxysilane, a di-amine-functional alkoxysilane, a tri-amine-functional alkoxysilane, a mono-amine-functional dipodal alkoxysilane, a di-amine-functional dipodal alkoxysilane, a tri-amine-functional dipodal alkoxysilane, or a combination of any of the foregoing.

Examples of suitable monoamine-functional trialkoxysilanes include 4-aminobutyltriethoxysilane, 4-amino-3,3-dimethylbutyltrimethoxysilane, n-(2-aminoethyl)-3-aminopropyltriethoxysilane, 3-aminopropyltriethoxysilane, 3-aminopropyltriethoxysilane, 3-aminopropyltrimethoxysilane, 11-aminoundecyltriethoxysilane, 2-(4-pyridylethyl)triethoxysilane, and combinations of any of the foregoing.

Examples of suitable monoamine-functional dialkoxysilanes include 4-amino-3,3-dimethylbutylmethyldimethoxysilane, 3-aminopropylmethyldiethoxysilane, and combinations of any of the foregoing.

Examples of suitable monoamine-functional monoalkoxysilanes include 1-amino-2-(dimethylethoxysilyl)propane, 3-aminopropyldiisopropylethoxysilane, 3-aminopropyldimethylethoxysilane, and combinations of any of the foregoing.

Examples of suitable diamine-functional trialkoxysilanes include (aminoethylaminomethyl)phenethyltrimethoxysilane, n-(2-aminoethyl)-3-aminopropyltrimethoxysilane, n-(2-aminoethyl)-3-aminopropyltrimethoxysilane, n-(6-aminohexyl)aminomethyltriethoxysilane, n-(6-aminohexyl)aminopropyltrimethoxysilane, n-(2-aminoethyl)-11-aminoundecyltrimethoxysilane, n-3-[(amino(polypropylenoxy)]aminopropyltrimethoxysilane, n-(2-n-benzylaminoethyl)-3-aminopropyltrimethoxysilane, n-(2-aminoethyl)-3-aminopropylsilanetriol, n-(2-aminoethyl)-3-aminoisobutylmethyldimethoxysilane, n-(2-aminoethyl)-3-aminopropylmethyldiethoxysilane, n-(2-aminoethyl)-3-aminopropylmethyldimethoxysilane, n-(2-aminoethyl)-3-aminoisobutyldimethylmethoxysilane, (3-trimethoxysilylpropyl)diethylenetriamine, and combinations of any of the foregoing.

Examples of suitable secondary amine-functional alkoxysilanes include 3-(n-allylamino)propyltrimethoxysilane, n-butylaminopropyltrimethoxysilane, t-butylaminopropyltrimethoxysilane, (n-cyclohexylaminomethyl)methyldiethoxysilane, (n-cyclohexylaminomethyl)triethoxysilane, (n-cyclohexylaminopropyl)trimethoxysilane, (3-(n-ethylamino)isobutyl)methyldiethoxysilane, (3-(n-ethylamino)isobutyl)trimethoxysilane, n-methylaminopropylmethyldimethoxysilane, n-methylaminopropyltrimethoxysilane, (phenylaminomethyl)methyldimethoxysilane, 3-(n,n-dimethylaminopropyl)aminopropylmethyldimethoxysilane, and combinations of any of the foregoing.

Examples of suitable dipodal amine-functional alkoxysilanes include 1-[3-(2-aminoethyl)-3-aminoisobutyl]-1,1,3,3,3-pentaethoxy-1,3-disilapropane, bis(methyldiethoxysilylpropyl)amine, bis(3-triethoxysilylpropyl)amine, 1,11-bis(trimethoxysilyl)-4-oxa-8-azaundecan-6-ol, bis(3-trimethoxysilylpropyl)amine, n,n'-bis[(3-trimethoxysilyl)propyl]ethylenediamine, n,n'-bis[(3-trimethoxysilyl)propyl]ethylenediamine, and combinations of any of the foregoing.

In general, the adhesive strength of an adhesion-promoting layer formed using an adhesion-promoting composition is improved by the use of amine-terminated alkoxysilanes. It is believed that the amine groups, in proximity to reactive organo-functional groups, partially catalyze the reaction of the organo-functional groups with functional groups of an overlying coating. Also, in general, the adhesive strength of the adhesion-promoting layer is improved with the addition of dipodal alkoxy silanes. It is believed that dipodal alkoxysilanes create cross-linked networks of condensed alkoxysilanes.

Reacted amine-functional alkoxysilanes refer to amine-functional alkoxysilanes obtained by reacting an alkoxysilane composition comprising an amine-functional alkoxysilane and an organic solvent at a temperature up to 100° C. for at least 30 minutes to provide a reacted alkoxysilane composition. An alkoxysilane composition can further comprise an alkenyl-functional alkoxysilane. An alkoxysilane composition can further comprise water and/or an organic titanate, an organic zirconate, or a combination thereof. The water and/or organic titanate and/or organic zirconate can be added to the alkoxysilane composition before being reacted or can be added to the reacted alkoxysilane composition.

Reacted amine-functional alkoxysilanes can comprise partially hydrolyzed amine-functional alkoxysilanes, fully hydrolyzed amine-functional alkoxysilanes, partially condensed amine-functional alkoxysilanes, fully condensed amine-functional alkoxysilanes, amine-functional alkoxysilanes, or a combination of any of the foregoing.

An adhesion-promoting composition provided by the present disclosure can comprise, for example, from 1 wt % to 30 wt % of an amine-functional alkoxysilane or combination of amine-functional alkoxysilanes, such as from 2 wt % to 20 wt %, from 3 wt % to 15 wt %, from 4 wt % to 10 wt % or from 4 wt % to 8 wt % of an amine-functional alkoxysilane or combination of amine-functional alkoxysilanes, where wt % is based on the total weight of the adhesion-promoting composition.

An adhesion-promoting composition can comprise, for example, greater than 1 wt % of an amine-functional alkoxysilane or combination of amine-functional alkoxysilanes, greater than 2 wt %, greater than 3 wt %, greater than 4 wt %, greater than 8 wt %, greater than 10 wt %, or greater than 15 wt % of an amine-functional alkoxysilane or combination of amine-functional alkoxysilanes, where wt % is based on the total weight of the adhesion-promoting composition.

An adhesion-promoting composition can comprise, for example, less than 15 wt % of an amine-functional alkoxysilane or combination of amine-functional alkoxysilanes, less than 12 wt %, less than 9 wt %, less than 6 wt %, less than 4 wt %, less than 3 wt %, or less than 2 wt % of an amine-functional alkoxysilane or combination of amine-functional alkoxysilanes, where wt % is based on the total weight of the adhesion-promoting composition.

Adhesion-promoting compositions provided by the present disclosure can comprise an alkenyl-functional alkoxysilane or a combination of alkenyl-functional alkoxysilanes. An alkenyl functional alkoxysilane can be a non-reacted alkenyl-functional alkoxysilane and/or a reacted alkenyl-functional alkoxysilane.

Adhesion-promoting compositions provided by the present disclosure can comprise a non-reacted alkenyl-functional alkoxysilane or a combination of non-reacted alkenyl-functional alkoxysilanes.

Adhesion-promoting compositions provided by the present disclosure can comprise a reacted alkenyl-functional alkoxysilane or a combination of reacted alkenyl-functional alkoxysilanes.

An alkenyl-functional alkoxysilane can comprise, for example, a monoalkenyl-functional alkoxysilane, a dialkenyl-functional alkoxysilane, an alkenyl-functional ketoximino alkoxysilane, a dipodal alkenyl-functional alkoxysilane, or a combination of any of the foregoing.

Examples of suitable alkenyl-functional trialkoxysilanes include 11-allyloxyundecyltrimethoxysilane, m-allylphenylpropyltriethoxysilane, allyltriethoxysilane, [(5-bicyclo[2.2.1]hept-2-enyl)ethyl]trimethoxysilane, (5-bicyclo[2.2.1]hept-2-enyl)triethoxysilane, 3-butenyltriethoxysilane, [2-(3-cyclohexenyl)ethyl]triethoxysilane, (3-cyclopentadienylpropyl)triethoxysilane, 2-(divinylmethylsilyl)ethyltriethoxysilane, docosenyltriethoxysilane, 5-hexenyltrimethoxysilane, 7-octenyltrimethoxysilane, 10-undecenyltrimethoxysilane, vinyltriethoxysilane, vinyltrimethoxysilane, and combinations of any of the foregoing.

Examples of suitable alkenyl-functional dialkoxysilanes include allylmethyldimethoxysilane, (5-bicyclo[2.2.1]hept-2-enyl)methyldiethoxysilane, vinylmethyldiethoxysilane, vinylmethyldimethoxysilane, and combinations of any of the foregoing.

Examples of suitable alkenyl-functional monoalkoxysilanes include (5-bicyclo[2.2.1]hept-2-enyl)dimethylethoxysilane, trivinylmethoxysilane, vinyldimethylethoxysilane, and combinations of any of the foregoing.

Examples of suitable dipodal alkenyl-functional alkoxysilanes include 1,2-bis(methyldiethoxysilyl)ethylene, bis(triethoxysilylethyl)vinylmethylsilane, 1,2-bis(triethoxysilyl)ethylene, 1,1-bis(trimethoxysilylmethyl)ethylene, and combinations of any of the foregoing.

Examples of suitable alkenyl-functional ketoximino alkoxysilanes include vinyltris(methylethylketoximino)silane (SIV9280).

Examples of suitable amine-functional alkoxysilanes include γ-aminopropyltriethoxysilane, γ-aminopropyltrimethoxysilane, and 3-aminopropylmethyldiethoxysilane.

Other examples of suitable amino-functional alkoxysilanes include 3-aminopropyltriethoxysilne, bis(3-triethoxysilyl)propyl]amine, 3-aminopropyltrimethoxysilne, bis(3-triemethoxysilyl)propylamine, 3-aminopropylmethyldiethoxysilane, 3-aminopropylmethyldimethoxysilane, aminoethylaminopropyltrimethoxysilane, aminoethylaminopropyltriethoxysilane, aminoethylaminopropylmethyldimethoxysilane, diethylenetriaminopropylmethyldimethoxysilane, piperazinylpropylmethyldimethoxysilane, (N-phenylamino)methyltrimethoxysilane, (N-phenylamino)methyltriethoxysilane, 3-(N-phenylamino)propyltrimethoxysilane, diethylaminomethyltriethoxysilane, diethylaminomethylmethyldiethoxysilane, diethylaminopropyltrimethoxysilane, and N—(N-butyl)-3-aminopropyltrimethoxysilane.

Examples of suitable alkenyl-functional alkoxysilanes include vinyltriethoxysilane, vinyltrimethoxysilane, vinyltris-(2-methoxyethoxy)silane, 10-undecenylsilane, bis-(γ-trimethoxysilylpropyl)amine, vinyltrisisopropoxysilane, vinyltris(tert-butylperoxysilane, vinyldimethylethoxysilane, vinylmethyldimethoxysilane, and vinylmethyldiethoxysilane.

Examples of suitable bis(alkoxysilanes) include bis-(γ-trimethoxysilylpropyl)amine, bis[(3-triethoxysilyl)propyl)amine, bis[(3-trimethoxysilyl)propyl)amine, is (triethoxysilylpropyl)disulfide, bis(triethoxysilylpropyl)tetrasulfide, 1,2-bis(trimethoxysilyl)ethane, and 1,2-bis(triethoxysilyl)ethane.

Examples of suitable alkenyl functional dipodal alkoxysilanes include Gelest SIB 1817.0, 8-bis(triethoxysilyl) octane (Gelest SIB 1824.0), Gelest SIB 1831.0, and 1,2-bis (trimethoxysilyl)decane (Gelest SIB 1829.0), Gelest SIB 1833.0, SIB 1834.0, Gelest SIB 1142.0, Gelest SIB 1824.82, and Gelest SIB 1824.5.

Examples of suitable alkenyl-functional alkoxysilanes include methyltris(3-methyoxy propylene glycoxy)silane, vinyltris(3-methoxypropylene glycoxy)silane, and phenyltris(3-methoxypropylene glycoxy silane), Silquest® G-170 silane, and Gelest SIU9048.0 (10-undecenylsilane).

An alkenyl-functional alkoxysilane can comprise one or more reactive alkenyl groups.

An alkenyl-functional alkoxysilane can comprise an alkenyl-functional ketoximino alkoxysilane.

An alkenyl-functional alkoxysilane can comprise, for example, vinyltris(methylethylkeoximino)silane.

Reacted alkenyl-functional alkoxysilanes refer to alkenyl-functional alkoxysilanes obtained by reacting an alkoxysilane composition comprising alkenyl-functional alkoxysilanes, and an organic solvent at a temperature up to 100° C. for at least 30 minutes to provide a reacted alkoxysilane composition. An alkoxysilane composition can further comprise amine-functional alkoxysilanes. The reacted alkoxysilane composition can further comprise water; and/or an organic titanate, an organic zirconate, or a combination thereof. The water and/or organic titanate and/or organic zirconate can be added to the alkoxysilane composition before being reacted or can be added to the reacted alkoxysilane composition.

Reacted alkenyl-functional alkoxysilanes can comprise partially hydrolyzed alkenyl-functional alkoxysilanes, fully hydrolyzed alkenyl-functional alkoxysilanes, partially condensed alkenyl-functional alkoxysilanes, fully condensed alkenyl-functional alkoxysilanes, alkenyl-functional alkoxysilanes, or a combination of any of the foregoing.

An adhesion-promoting composition can comprise, for example, from 1 wt % to 30 wt % of an alkenyl-functional alkoxysilane or combination of alkenyl-functional alkoxysilanes, such as from 3 wt % to 20 wt %, from 4 wt % to 15 wt %, from 6 wt % to 15 wt % or from 8 wt % to 14 wt % of an alkenyl-functional alkoxysilane or combination of alkenyl-functional alkoxysilanes, where wt % is based on the total weight of the adhesion-promoting composition.

An adhesion-promoting composition can comprise, for example, greater than 1 wt % of an alkenyl-functional alkoxysilane or combination of alkenyl-functional alkoxysilanes, greater than 3 wt %, greater than 4 wt %, greater than 6 wt %, greater than 8 wt %, greater than 10 wt %, greater than 12 wt %, greater, or greater than 20 wt % an alkenyl-functional alkoxysilane or combination of alkenyl-functional alkoxysilanes, where wt % is based on the total weight of the adhesion-promoting composition.

An adhesion-promoting composition can comprise, for example, less than 20 wt % of an alkenyl-functional alkoxysilane or combination of alkenyl-functional alkoxysilanes, less than 15 wt %, less than 12 wt %, less than 9 wt %, less than 6 wt %, less than 4 wt %, or less than 3 wt % an alkenyl-functional alkoxysilane or combination of alkenyl-functional alkoxysilanes, where wt % is based on the total weight of the adhesion-promoting composition.

An adhesion-promoting composition provided by the present disclosure can comprise a combination of amine-functional alkoxysilanes and alkenyl-functional alkoxysilanes. The amine-functional alkoxysilanes and alkenyl-functional alkoxysilanes can be unreacted or reacted.

An adhesion-promoting composition can comprise a weight percent ratio of amine-functional alkoxysilanes to alkenyl-functional alkoxysilanes, for example, from 2:1 to 1:2, from 1.75:1 to 1:1.75, from 1.5:1 to 1:1.5, or from 1.25:1 to 1:1.25, where wt % is based on the total weight of the amine-functional alkoxysilanes and alkenyl-functional alkoxysilanes in the adhesion-promoting composition.

An adhesion-promoting composition can comprise a wt % ratio of alkenyl-functional alkoxysilanes to amine-functional alkoxysilanes, for example, greater than 1.0, greater than 1.2, greater than 1.4, greater than 1.6, greater than 2, or greater than 2.5, where wt % is based on the total weight of the alkenyl-functional alkoxysilanes and amine-functional alkoxysilanes in the alkoxysilane composition.

An adhesion-promoting composition can comprise a wt % ratio of alkenyl-functional alkoxysilanes to amine-functional alkoxysilanes, for example, less than 2.5, less than 2.0, less than 1.6, less than 1.4, or less than 1.2, where wt % is based on the total weight of the alkenyl-functional alkoxysilanes and amine-functional alkoxysilanes in the adhesion-promoting composition.

An adhesion-promoting composition can comprise a wt % excess of alkenyl-functional alkoxysilanes to amino-functional alkoxysilanes. An adhesion-promoting composition can comprise a mol % excess of alkenyl-functional alkoxysilanes to amino-functional alkoxysilanes.

Adhesion-promoting compositions provided by the present disclosure can comprise an organic solvent or combination of organic solvents.

An organic solvent can comprise an alcohol, a propylene glycol ether, or a combination thereof.

Examples of suitable alcohols include methanol, n-propanol, isopropanol, n-butanol, butan-2-ol, 2-methylpropan-1-ol, pentan-2-ol, 3-methylbutan-1-ol, 2-methylbutan-1-ol, pentan-3-ol, and combinations of any of the foregoing. The alcohol can be isopropanol.

Examples of suitable propylene glycol ethers include diethylene glycol ethyl ethers, diethylene glycol methyl ether, diethylene glycol n-butyl ether, diethylene glycol hexyl ether, diethylene glycol n-butyl ether acetate, ethylene glycol propyl ether, ethylene glycol n-butyl ether, ethylene glycol hexyl ether, ethylene glycol n-butyl ether acetate, triethylene glycol methyl ether, triethylene glycol ethyl ether, triethylene glycol n-butyl ether, ethylene glycol phenyl ether, ethylene glycol phenyl ether, ethylene glycol n-butyl phenyl ether, and a combination of any of the foregoing. A propylene glycol ether can be propylene glycol methyl ether.

An organic solvent can comprise, for example, isopropanol, propylene glycol methyl ether, or a combination thereof.

An organic solvent can include other suitable solvents such as, for example, methyl ethyl ketone and ethyl acetate.

An adhesion-promoting composition provided by the present disclosure can comprise, for example, from 50 wt % to 95 wt % of an organic solvent, from 55 wt % to 90 wt %, from 60 wt % to 85 wt %, or from 65 wt % to 80 wt % of an organic solvent, where wt % is based on the total weight of the adhesion-promoting composition. For example, an adhesion-promoting composition can comprise greater than 50 wt % of an organic solvent, greater than 60 wt %, greater than 70 wt %, greater than 80 wt %, or greater than 90 wt % of an organic solvent, where wt % is based on the total weight of the adhesion-promoting composition. For example, an adhesion-promoting composition can comprise less than 95 wt % of an organic solvent, less than 90 wt %, less than 85 wt %, less than 75 wt %, or less than 65 wt % of an organic solvent, where wt % is based on the total weight of the adhesion-promoting composition.

In addition to an organic solvent including an alcohol such as propanol, or a propylene glycol ether such as propylene glycol methyl ether, adhesion-promoting compositions and alkoxysilane compositions provided by the present disclosure can include water.

Adhesion promoting compositions provided by the present disclosure can comprise, for example, from 0.5 wt % to 20 wt % water, from 1 wt % to 16 wt %, from 1 wt % to 12 wt %, from 1 wt % to 8 wt %, or from 2 wt % to 6 wt %, where wt % is based on the total weight of the adhesion-promoting composition. An adhesion-promoting composition can comprise, for example, less than 20 wt % water, less than 16 wt % water, less than 12 wt % water, less than 8 wt %, water, less than 6 wt % water, less than 4 wt % water less than 2 wt % water or less than 1 wt % water, where wt % is based on the total weight of the adhesion-promoting composition. An adhesion-promoting composition can comprise, for example, greater than 0.5 wt % water, greater than 1 wt % water, greater than 2 wt % water, greater than 4 wt % water, greater than 6 wt % water, greater than 8 wt % water, greater than 12 wt % water, or greater than 16 wt % water, where wt % is based on the total weight of the adhesion-promoting composition.

An adhesion-promoting composition provided by the present disclosure can comprise 0 wt % water, i.e., no water.

Water can be added to an alkoxysilane composition and reacted with the alkoxysilanes. In general, following the reaction to form a reacted alkoxysilane composition, the amount of water in the reacted alkoxysilane composition can be, for example, from 5 wt % to 20 wt % less, such as from 7 wt % to 18 wt % less, or from 10 wt % to 15 wt % less than the initial amount of water in the non-reacted alkoxysilane composition before the reaction. For example, an alkoxysilane composition can comprise from 1 wt % to 30 wt % water, and following heating at a temperature up to 100° C. for at least 30 minutes, the reacted alkoxysilane composition can comprise from 0.95 wt % to 28.5 wt % water, from 0.90 wt % to 27 wt % water, from 0.85 wt % to 25.5 wt %, or from 0.80 to 24.0 wt % water, where wt % is based on the total weight of the reacted alkoxysilane composition.

An un-reacted alkoxysilane composition can comprise, for example, from 0.9 equivalents to 1.1 equivalents hydroxyl groups to equivalents alkoxy groups, from 0.95 equivalents to 1.05 equivalents, or from 0.97 equivalents to 1.03 equivalents hydroxyl groups to equivalents alkoxy groups.

The use of an organic solvent such as alcohol and the low solids content of the alkoxysilane composition can be important in maintaining an equilibrium of the reacted alkoxysilanes and thereby increase the shelf life of a reacted adhesion-promoting composition. An organic solvent such as an alcoholic solvent, following application to a surface, can also dry rapidly at 25° C./50% RH. For practical application, it is also important that the film of the adhesion-promoting composition be applied with a homogeneous thickness such that the adhesive properties are consistent across the surface of a part. Both thick and thin regions can lead to variable adhesive strength across a surface. The balance of solids content and the chemical nature of the adhesion-promoting composition are believed to contribute to the homogeneity of the dried surface film. Furthermore, it is also believed that the drying time of the applied thin film can affect the adhesive strength of the adhesion-promoting layer. For example, it is believed that some migration of the alkoxysilanes over a surface facilitates reaction of the alkoxysilanes with surface functional groups and thereby improves adhesive strength. It is believed that rapid drying may restrict surface migration and thereby inhibit development of full adhesive strength and that extended drying times may either have no effect on adhesive strength or may facilitate formation of in-plane condensed alkoxysilane gels and inhomogeneous films in contrast to facilitating bonding with surface reactive groups.

An adhesion-promoting composition provided by the present disclosure can comprise, for example, from 1 wt % to 30 wt % of amine-functional alkoxysilanes, from 1 wt % to 30 wt % alkenyl-functional alkoxysilanes, from 50 wt % to 95 wt % of an organic solvent, and from 1 wt % to 30 wt % of organic titanates and/or organic zirconates, where wt % is based on the total weight of the adhesion-promoting composition.

An adhesion-promoting composition provided by the present disclosure can comprise, for example, from 2 wt % to 20 wt % of amine-functional alkoxysilanes, from 2 wt % to 20 wt % of alkenyl-functional alkoxysilanes, from 60 wt % to 90 wt % of an organic solvent, and from 2 wt % to 20 wt % of organic titanates and/or organic zirconates, where wt % is based on the total weight of the adhesion-promoting composition.

An adhesion-promoting composition provided by the present disclosure can comprise, for example, from 3 wt % to 10 wt % of the amine-functional alkoxysilanes, from 5 wt % to 15 wt % of the amine-functional alkoxysilanes, from 70 wt % to 85 wt % of an organic solvent, and from 3 wt % to 10 wt % of organic titanates and/or organic zirconates, where wt % is based on the total weight of the adhesion-promoting composition.

An adhesion-promoting composition provided by the present disclosure can comprise, for example, from 1 wt % to 30 wt % of amine-functional alkoxysilanes, from 1 wt % to 30 wt % alkenyl-functional alkoxysilanes, from 50 wt % to 95 wt % of an organic solvent, from 1 wt % to 30 wt % of organic titanates and/or organic zirconates, and from 0.5 wt % to 20 wt % water, where wt % is based on the total weight of the adhesion-promoting composition.

An adhesion-promoting composition provided by the present disclosure can comprise, for example, from 2 wt % to 20 wt % of amine-functional alkoxysilanes, from 2 wt % to 20 wt % of alkenyl-functional alkoxysilanes, from 60 wt % to 90 wt % of an organic solvent, from 2 wt % to 20 wt % of organic titanates and/or organic zirconates, and from 1 wt % to 10 wt % water, where wt % is based on the total weight of the adhesion-promoting composition.

An adhesion-promoting composition provided by the present disclosure can comprise, for example, from 3 wt % to 10 wt % of the amine-functional alkoxysilanes, from 5 wt % to 15 wt % of the amine-functional alkoxysilanes, from 70 wt % to 85 wt % of an organic solvent, from 3 wt % to 10 wt % of organic titanates and/or organic zirconates, and from 2 wt % to 10 wt % water, where wt % is based on the total weight of the adhesion-promoting composition.

An adhesion-promoting composition can comprise a reacted alkoxysilane composition and an organic titanate and/or organic zirconate in which the organic titanate and/or organic zirconate is added to the reacted alkoxysilane composition. The organic titanate and/or organic zirconate can be added to the reacted alkoxysilane composition has cooled to from 23° C. to 30° C.

An adhesion-promoting composition can comprise, for example, from 70 wt % to 99 wt % of a reacted alkoxysilane composition, and from 1 wt % to 30 wt % of an organic titanate and/or organic zirconate, where wt % is based on the total weight of the adhesion-promoting composition. The reacted alkoxysilane composition can comprise reacted amine-functional alkoxysilanes, alkenyl-functional alkoxysilanes, organic solvent, and optionally water. For example, an adhesion-promoting composition can comprise from 80 wt % to 98 wt % of a reacted alkoxysilane composition, and from 2 wt % to 20 wt % of an organic titanate and/or organic zirconate; from 90 wt % to 97 wt % of a reacted alkoxysilane composition, and from 3 wt % to 10 wt % of an organic titanate and/or organic zirconate; or from 92 wt % to 97 wt % of a reacted alkoxysilane composition, and from 3 wt % to 8 wt % of an organic titanate and/or organic zirconate, where wt % is based on the total weight of the adhesion-promoting composition.

An adhesion-promoting composition can comprise, for example, from 70 wt % to 98 wt % of a reacted alkoxysilane composition, from 1 wt % to 30 wt % of an organic titanate and/or organic zirconate, and from 0.5 wt % to 20 wt % water, where wt % is based on the total weight of the adhesion-promoting composition. The reacted alkoxysilane composition can comprise reacted amine-functional alkoxysilanes, alkenyl-functional alkoxysilanes, organic solvent, and optionally water. For example, an adhesion-promoting composition can comprise from 75 wt % to 97 wt % of a reacted alkoxysilane composition, from 1 wt % to 20 wt % of an organic titanate and/or organic zirconate, and from 1 wt % to 15 wt % water; from 80 wt % to 96 wt % of a reacted alkoxysilane composition, from 3 wt % to 10 wt % of an organic titanate and/or organic zirconate, and from 2 wt % to 10 wt % water; or from 85 wt % to 95 wt % of a reacted alkoxysilane composition, from 3 wt % to 8 wt % of an organic titanate and/or organic zirconate, and from 3 wt % to 8 wt % water, where wt % is based on the total weight of the adhesion-promoting composition.

Adhesion-promoting compositions provided by the present disclosure can comprise an alkoxysilane composition and an organic titanate and/or an organic zirconate. Adhesion-promoting compositions provided by the present disclosure can comprise a reacted alkoxysilane composition or a non-reacted alkoxysilane composition and an organic titanate and/or an organic zirconate.

A non-reacted alkoxysilane composition provided by the present disclosure can be prepared by combining an amino-functional alkoxysilane, an alkenyl-functional alkoxysilane, an organic solvent, an organic titanate and/or organic zirconate, and optionally water, and allowing the mixture to equilibrate at 25° C. for at least 1 hour, at least 2 hours at least 3 hours, at least 6 hours, at least 12 hours, or at least 24 hours, and thereafter not subjecting the non-reacted alkoxysilane composition to a temperature greater than 25° C. for any appreciable period of time. In certain non-reacted alkoxysilane compositions, the non-reacted alkoxysilane composition does not intentionally include water and is protected from exposure to water vapor and moisture.

A non-reacted alkoxysilane composition can comprise water such as, for example, from 0.5 wt % to 20 wt % water, or from 1 wt % to 10 wt % water, wherein wt % is based on the total weight of the non-reacted alkoxysilane composition.

A reacted alkoxysilane composition provided by the present disclosure can be prepared by combining an amino-functional alkoxysilane, an alkenyl-functional alkoxysilane, and an organic solvent and heating the mixture to a temperature up to 100° C. for at least 30 minutes. For example, the mixture can be heated to a temperature up to 90° C., 80° C., 70° C., 60° C., 50° C., 40° C., or 30° C., for at least 1 hour, at least 2 hours, at least 3 hours, at least 4 hours, at least 5 hours, at least 10 hours or at least 15 hours. The mixture can be reacted, for example, at a temperature from 26° C. to 100° C. for from 30° C. to 90° C., from 35° C., to 85° C., from 40° C. to 80° C., or from 50° C. to 75° C. for at least 30 minutes, at least 1 hour, at least 2 hours, at least 3 hours, at least 4 hours, at least 5 hours, at least 10 hours, or at least 15 hours.

A reacted alkoxysilane composition can comprise water such as, for example, from 0.5 wt % to 20 wt % water, or from 1 wt % to 10 wt % water, wherein wt % is based on the total weight of the reacted alkoxysilane composition.

After the amino-functional alkoxysilane, alkenyl-functional alkoxysilane and organic solvent are reacted to form a reacted alkoxysilane composition, an organic titanate and/or zirconate and optionally water can be added to the reacted alkoxysilane composition to provide an adhesion-promoting composition provided by the present disclosure. A reacted alkoxysilane composition can be cooled, for example, to 25° C., before the organic titanate and/or zirconate and optionally water are added.

Alternatively, an organic titanate and/or organic zirconate and optionally water can be added to the alkoxysilane composition and the resulting mixture reacted to provide an adhesion-promoting composition provided by the present disclosure.

A non-reacted or reacted alkoxysilane composition does not comprise an acid catalyst for catalyzing alkoxysilane hydrolysis.

A solvent such as an organic solvent and/or water need not be added to a reacted alkoxysilane composition to provide an adhesion-promoting composition. A reacted alkoxysilane composition, organic titanate and/or organic zirconate and optionally water is sufficiently dilute that it is not necessary to adjust the viscosity by adding additional solvent.

An alkoxysilane composition can comprise, for example, from 1 wt % to 30 wt % of an amine-functional alkoxysilane or combination of amine-functional alkoxysilanes, such as from 2 wt % to 20 wt %, from 3 wt % to 15 wt %, from 4 wt % to 10 wt % or from 4 wt % to 8 wt % of an amine-functional alkoxysilane or combination of amine-functional alkoxysilanes, where wt % is based on the total weight of the alkoxysilane composition.

An alkoxysilane composition can comprise, for example, greater than 1 wt % of an amine-functional alkoxysilane or combination of amine-functional alkoxysilanes, greater than 2 wt %, greater than 3 wt %, greater than 4 wt %, greater than 8 wt %, greater than 10 wt %, or greater than 15 wt % an amine-functional alkoxysilane or combination of amine-functional alkoxysilanes, where wt % is based on the total weight of the alkoxysilane composition.

An alkoxysilane composition can comprise, for example, from 1 wt % to 30 wt % of an amine-functional alkoxysilane or combination of amine-functional alkoxysilanes, such as from 2 wt % to 20 wt %, from 3 wt % to 15 wt %, from 4 wt % to 10 wt % or from 4 wt % to 8 wt % of an amine-functional alkoxysilane or combination of amine-functional alkoxysilanes, where wt % is based on the total weight of the alkoxysilane composition.

An alkoxysilane composition can comprise, for example, greater than 1 wt % of an amine-functional alkoxysilane or combination of amine-functional alkoxysilanes, greater than 2 wt %, greater than 3 wt %, greater than 4 wt %, greater than 8 wt %, greater than 10 wt %, or greater than 15 wt % an amine-functional alkoxysilane or combination of amine-functional alkoxysilanes, where wt % is based on the total weight of the alkoxysilane composition.

An alkoxysilane composition can comprise, for example, less than 15 wt % of an amine-functional alkoxysilane or combination of amine-functional alkoxysilanes, less than 12 wt %, less than 9 wt %, less than 6 wt %, less than 4 wt %, less than 3 wt %, or less than 2 wt % an amine-functional alkoxysilane or combination of amine-functional alkoxysilanes, where wt % is based on the total weight of the alkoxysilane composition.

An alkoxysilane composition can comprise, for example, from 1 wt % to 30 wt % of an alkenyl-functional alkoxysilane or combination of alkenyl-functional alkoxysilanes, such as from 3 wt % to 20 wt %, from 4 wt % to 15 wt %, from 6 wt % to 15 wt % or from 8 wt % to 14 wt % of an alkenyl-functional alkoxysilane or combination of alkenyl-functional alkoxysilanes, where wt % is based on the total weight of the alkoxysilane composition.

An alkoxysilane composition can comprise, for example, greater than 1 wt % of an alkenyl-functional alkoxysilane or combination of alkenyl-functional alkoxysilanes, greater than 3 wt %, greater than 4 wt %, greater than 6 wt %, greater than 8 wt %, greater than 10 wt %, greater than 12 wt %, greater, or greater than 20 wt % an alkenyl-functional alkoxysilane or combination of alkenyl-functional alkoxysilanes, where wt % is based on the total weight of the alkoxysilane composition.

An alkoxysilane composition can comprise, for example, less than 20 wt % of an alkenyl-functional alkoxysilane or combination of alkenyl-functional alkoxysilanes, less than 15 wt %, less than 12 wt %, less than 9 wt %, less than 6 wt %, less than 4 wt %, or less than 3 wt % an alkenyl-functional alkoxysilane or combination of alkenyl-functional alkoxysilanes, where wt % is based on the total weight of the alkoxysilane composition.

An alkoxysilane composition can comprise a weight percent ratio of amine-functional alkoxysilanes to alkenyl-functional alkoxysilanes, for example, from 2:1 to 1:2, from 1.75:1 to 1:1.75, from 1.5:1 to 1:1.5, or from 1.25:1 to 1:1.25, where wt % is based on the total weight of the amine-functional alkoxysilanes and alkenyl-functional alkoxysilanes in the alkoxysilane composition.

An alkoxysilane composition can comprise a wt % ratio of alkenyl-functional alkoxysilanes to amine-functional alkoxysilanes, for example, greater than 1.0, greater than 1.2, greater than 1.4, greater than 1.6, greater than 2, or greater than 2.5, where wt % is based on the total weight of the alkenyl-functional alkoxysilanes and amine-functional alkoxysilanes in the alkoxysilane composition.

An alkoxysilane composition can comprise a wt % ratio of alkenyl-functional alkoxysilanes to amine-functional alkoxysilanes, for example, less than 2.5, less than 2.0, less than 1.6, less than 1.4, or less than 1.2, where wt % is based on the total weight of the alkenyl-functional alkoxysilanes and amine-functional alkoxysilanes in the alkoxysilane composition.

An alkoxysilane composition can comprise a wt % excess of alkenyl-functional alkoxysilanes to amino-functional alkoxysilanes. An alkoxysilane composition can comprise a mol % excess of alkenyl-functional alkoxysilanes to amino-functional alkoxysilanes.

An alkoxysilane composition provided by the present disclosure can comprise, for example, from 50 wt % to 95 wt % of an organic solvent, from 55 wt % to 90 wt %, from 60 wt % to 85 wt %, or from 65 wt % to 80 wt % of an organic solvent, where wt % is based on the total weight of the alkoxysilane composition. For example, an alkoxysilane composition can comprise greater than 50 wt % of an organic solvent, greater than 60 wt %, greater than 70 wt %, greater than 80 wt %, or greater than 90 wt % of an organic solvent, where wt % is based on the total weight of the alkoxysilane composition. For example, an alkoxysilane composition can comprise less than 95 wt % of an organic solvent, less than 90 wt %, less than 85 wt %, less than 75 wt %, or less than 65 wt % of an organic solvent, where wt % is based on the total weight of the alkoxysilane composition.

An alkoxysilane composition can comprise, for example, from 0.5 wt % to 20 wt % water, from 1 wt % to 16 wt %, from 1 wt % to 12 wt %, from 1 wt % to 8 wt %, or from 2 wt % to 6 wt %, where wt % is based on the total weight of the adhesion-promoting composition. An alkoxysilane composition can comprise, for example, less than 20 wt % water, less than 16 wt % water, less than 12 wt % water, less than 8 wt %, water, less than 6 wt % water, less than 4 wt % water less than 2 wt % water or less than 1 wt % water, where wt % is based on the total weight of the alkoxysilane composition. An alkoxysilane composition can comprise, for example, greater than 0.5 wt % water, greater than 1 wt % water, greater than 2 wt % water, greater than 4 wt % water, greater than 6 wt % water, greater than 8 wt % water, greater than 12 wt % water, or greater than 16 wt % water, where wt % is based on the total weight of the alkoxysilane composition.

An alkoxysilane composition provided by the present disclosure can comprise 0 wt % water, i.e., no water.

An alkoxysilane composition provided by the present disclosure can comprise, for example, from 50 wt % to 95 wt % organic solvent, from 55 wt % to 90 wt %, from 60 wt % to 85 wt %, or from 70 wt % to 80 wt % organic solvent, where wt % is based on the total weight of the alkoxysilane composition. An alkoxysilane composition provided by the present disclosure can comprise, for example, greater than 50 wt % organic solvent, greater than 60 wt %, greater than 70 wt %, greater than 80 wt %, or greater than 90 wt % organic solvent, where wt % is based on the total weight of the alkoxysilane composition. An alkoxysilane composition provided by the present disclosure can comprise, for example, less than 95 wt % organic solvent, less than 90 wt %, less than 85 wt %, less than 75 wt %, less than 65 wt %, or less than 60 wt % organic solvent, where wt % is based on the total weight of the alkoxysilane composition.

An alkoxysilane composition can comprise, for example, from 1 wt % to 30 wt % of an amine-functional alkoxysilane, from 1 wt % to 30 wt % of an alkenyl-functional alkoxysilane, and from 50 wt %, to 95 wt % organic solvent, where wt % is based on the total weight of the alkoxysilane composition.

An alkoxysilane composition can comprise, for example, from 2 wt % to 20 wt % of an amine-functional alkoxysilane, from 2 wt % to 20 wt % of an alkenyl-functional alkoxysilane, and from 55 wt %, to 90 wt % organic solvent, where wt % is based on the total weight of the alkoxysilane composition.

An alkoxysilane composition can comprise, for example, from 4 wt % to 15 wt % amine-functional alkoxysilanes, from 4 wt % to 15 wt % alkenyl-functional alkoxysilanes, and from 60 wt % to 85 wt % organic solvent, where wt % is based on the total weight of the alkoxysilane composition.

An alkoxysilane composition can comprise water such as from 0.5 wt % to 20 wt % of water, wherein wt % is based on the total weight of the alkoxysilane composition.

An alkoxysilane composition can comprise, for example, from 1 wt % to 30 wt % of an amine-functional alkoxysilane, from 1 wt % to 30 wt % of an alkenyl-functional alkoxysilane, from 50 wt %, to 95 wt % organic solvent, and from 0.5 wt % to 20 wt % water, where wt % is based on the total weight of the alkoxysilane composition.

An alkoxysilane composition can comprise, for example, from 2 wt % to 20 wt % of an amine-functional alkoxysilane, from 2 wt % to 20 wt % of an alkenyl-functional alkoxysilane, from 55 wt %, to 90 wt % organic solvent, and from 1 wt % to 10 wt % water, where wt % is based on the total weight of the alkoxysilane composition.

An alkoxysilane composition can comprise, for example, from 4 wt % to 15 wt % amine-functional alkoxysilanes, from 4 wt % to 15 wt % alkenyl-functional alkoxysilanes, from 60 wt % to 85 wt % organic solvent, and from 2 wt % to 10 wt % water, where wt % is based on the total weight of the alkoxysilane composition.

Adhesion-promoting compositions provided by the present disclosure can be prepared, fore example, by (a) combining, to form a mixture, an organic titanate, an organic zirconate, or a combination thereof, and an unreacted alkoxysilane composition comprising an amine-functional alkoxysilane, an alkenyl-functional alkoxysilane, and an organic solvent; and (b) aging the mixture to provide the adhesion-promoting composition.

The mixture can comprise, for example, from 1 wt % to 30 wt % of the organic titanate, the organic zirconate, or a combination thereof; from 1 wt % to 30 wt % of the amine-functional alkoxysilane; from 1 wt % to 30 wt % of the alkenyl-functional alkoxysilane; and from 50 wt % to 95 wt % of the organic solvent, wherein wt % is based on the total weight of the mixture.

The mixture can further comprise, for example, from 0.5 wt % to 20 wt % of water, wherein wt % is based on the total weight of the mixture.

The mixture can be aged, for example, for at least 30 minutes, at least one hour, at least 2 hours, at least 4 hours, at least 6 hours, at least 12 hours, or at least 24 hours. Aging comprises leaving the mixture to equilibrate at 25° C.

Adhesion-promoting compositions provided by the present disclosure can be prepared by combining an organic titanate and/or organic zirconate to a reacted alkoxysilane composition.

For example, an adhesion-promoting composition can be prepared by (a) combining, to form an alkoxysilane composition: an amine-functional alkoxysilane; an alkenyl-functional alkoxysilane; and organic solvent; (b) heating the alkoxysilane composition to a temperature up to 100° C. for at least 30 minutes to provide a reacted alkoxysilane composition; and (c) adding an organic titanate and/or an organic zirconate to the reacted alkoxysilane composition to provide an adhesion-promoting composition.

The reacted alkoxysilane composition can be cooled to 25° C. before adding the organic titanate and/or organic zirconate.

The alkoxysilane composition can further comprise, for example, from 0.5 wt % to 20 wt % of water, where wt % is based on the total weight of the alkoxysilane composition. Water can be added to the alkoxysilane composition in step (a) and reacted along with the amine-functional alkoxysilane, alkenyl-functional alkoxysilane and solvent to provide the reacted alkoxysilane composition and/or water can be added to the reacted alkoxysilane composition along with the organic titanate and/or zirconate after the reacted alkoxysilane composition has cooled to 25° C.

As an example, an adhesion-promoting composition can be prepared by: (a) preparing an alkoxysilane composition by combining: from 50 wt % to 95 wt % of an organic solvent; from 1 wt % to 30 wt % of an amino-functional alkoxysilane; and from 1 wt % to 30 wt % of an alkenyl-functional alkoxysilane; wherein wt % is based on the total weight of the alkoxysilane composition; and (b) heating the alkoxysilane composition to a temperature up to 100° C. for at least 30 minutes to provide a reacted alkoxysilane composition; (c) cooling the reacted alkoxysilane composition to 25° C.; and (d) adding from 1 wt % to 30 wt % of an organic zirconate and/or an organic titanate to the cooled, reacted alkoxysilane composition to provide the adhesion-promoting composition, wherein wt % is based on the total weight of the adhesion-promoting composition.

Adhesion-promoting compositions provided by the present disclosure can comprise colorants such as pigments, dyes, or a combination thereof.

A pigment and/or dye can be included in an adhesion-promoting composition to facilitate the ability of an operator to visually inspect a surface to determine, for example, whether an adhesion-promoting composition has been applied to a surface and/or whether a sufficient amount of an adhesion-promoting composition has been applied to a surface. In this way, an operator can determine whether a homogeneous layer of an adhesion-promoting composition has been uniformly applied across the surface before applying an overlying sulfur-containing sealant.

Examples of suitable inorganic pigments include metal-containing inorganic pigments such as those containing cadmium, carbon, chromium, cobalt, copper, iron oxide, lead, mercury, titanium, tungsten, and zinc. Suitable examples further include ultramarine blue, ultramarine violet, reduced tungsten oxide, cobalt aluminate, cobalt phosphate, manganese ammonium pyrophosphate and/or metal-free inorganic pigments. An inorganic pigment can comprise nanoparticles such as ultramarine blue, ultramarine violet, Prussian blue, cobalt blue and/or reduced tungsten oxide nanoparticles. Examples of suitable organic pigments include indanthrone, quinacridone, phthalocyanine blue, copper phthalocyanine blue, and perylene anthraquinone.

Additional examples of suitable pigments include iron oxide pigments, in all shades of yellow, brown, red and black; in all their physical forms and grain categories; titanium oxide pigments in all the different inorganic surface treatments; chromium oxide pigments also co-precipitated with nickel and nickel titanates; black pigments from organic combustion (e. g., carbon black); blue and green pigments derived from copper phthalocyanine, also chlorinated and brominated, in the various α, β and ε crystalline forms; yellow pigments derived from lead sulfochromate; yellow pigments derived from lead bismuth vanadate; orange pigments derived from lead sulfochromate molybdate; yellow pigments of an organic nature based on arylamides; orange pigments of an organic nature based on naphthol; orange pigments of an organic nature based on diketo-pyrrolo-pyrrole; red pigments based on manganese salts of azo dyes; red pigments based on manganese salts of β-oxynaphthoic acid; red organic quinacridone pigments; and red organic anthraquinone pigments.

Examples of suitable dyes include acridines, anthraquinones, arylmethane dyes, azo dyes, phthalocyanine dyes, quinone-imine dyes including azin dyes, indamins, indophenyls, oxazins, oxazones, and thiazines, thiazole dyes, saffranin dyes, xanthene dyes including fluorene dyes. Examples of suitable dyes include Alcian blue, Alcian yellow, Alizarin, Alizarin red, Alizarin yellow, Azophloxin, Bismarck brown R, Bismarck brown Y, Brilliant cresyl blue, Chrysoidine R, Crisoidine Y, Congo red, Crystal violet, Ethyl green, Fuchsin acid, Gentian violet, Janus green, Lissamine fast yellow, Malachite green, Martius yellow, Meldola blude, Metanil yellow, Methyl orange, Methyl red, Naphthalene black, Naphthol green, Naphthol yellow, Orange G, Purpurin, Rose bengal, Sudan II, Titan yellow, Tropaeolin O, Tropaeolin OO, Tropaeolin OOO, Victoria blue, and Xylene cyanol.

The amount of dye or pigment added to an adhesion-promoting composition can be an amount sufficient to facilitate visual inspection and not compromise the ability of the adhesion-promoting layer to provide sufficient adhesion between the overlying sealant and underlying metal substrate.

Adhesion-promoting compositions provided by the present disclosure can have a viscosity, for example, less than 100 cps measured using a CAP 2000 viscometer (parallel plate) at 25° C. and at a shear rate of 50 rpm.

Adhesion-promoting compositions provided by the present disclosure can exhibit a theoretical density, for example, from 0.7 g/cc to 0.9 g/cc, from 0.72 g/cc to 0.88 g/cc, from 0.74 g/cc to 0.86 g/cc, from 0.76 g/cc to 0.84 g/cc, from 0.78 g/cc to 0.81 g/cc, or 0.79 g/cc.

Adhesion-promoting compositions can be visually clear and are not visually turbid.

Adhesion-promoting compositions can be storage-stable at 25° C. for at least 2 months, at least 3 months, at least 4 months, or for at least 6 months. Storage stability means that the adhesion-promoting composition remains clear, exhibits a viscosity less than 100 centipoise, and is capable of being used for its intended purpose. A clear adhesion-promoting composition is not hazy and does not show signs of alkoxysilane condensation. A storage-stable adhesion-promoting composition retains substantially the same optical properties as first formed for at least 2 months. In a storage stable adhesion-promoting composition the alkoxysilanes and the organic titanates and/or organic zirconates remain substantially homogeneously suspended in the solution.

Adhesion-promoting compositions provided by the present disclosure can include reactive alkenyl groups. The reactive alkenyl groups can react, for example, with reactive thiol groups of a compound such as a thiol-terminated prepolymer and/or polythiol of an overlying sealant or coating composition. The resulting covalent bonding between alkenyl-functional alkoxysilanes in the adhesion-promoting composition and the overlying sealant can enhance the adhesion strength of a multilayer sealant system.

Adhesion-promoting compositions provided by the present disclosure can be used to enhance the adhesion between a sealant and a metal substrate. Sealant systems comprising a sealant and an underlying adhesion-promoting layer are included within the scope of the present disclosure. Adhesion-promoting compositions provided by the present disclosure can be used to promote adhesion between any suitable overlying sealant or coating and an underlying metal or metal alloy substrate.

An adhesion promoting layer comprises an adhesion-promoting composition provided by the present disclosure applied to a substrate and dried. An adhesion-promoting layer can comprise, for example, from 10 wt % to 90 wt % of an organic titanate, an organic zirconate, or a combination thereof; and from 10 wt % to 90 wt % of alkoxysilanes, wherein the alkoxysilanes comprise an amino-functional alkoxysilane and an alkenyl-functional alkoxysilane, wherein wt % is based on the total weight of the adhesion-promoting layer.

The adhesion-promoting compositions provided by the present disclosure are effective, for example, in enhancing the adhesion between radical polymerizable sulfur-containing sealant compositions and metal surfaces such as aluminum and stainless-steel surfaces. Sulfur-containing sealants are useful in applications that require fuel resistance such as vehicular applications.

Radical polymerizable sulfur-containing sealant compositions are used, for example, in the aerospace industry.

Radical polymerizable sulfur-containing sealants can be based on the reaction of polythiols with poly alkenyls and/or polyalkynyls.

Adhesion-promoting compositions provided by the present disclosure can be used as an layer to enhance the adhesion of an overlying sealant or coating to an underlying metal surface. Adhesion-promoting compositions provided by the present disclosure are particularly useful in enhancing the adhesion of a thiol-ene/yne based sealant to an underlying metal surface. A thiol-ene based sealant refers to a sealant formed by the reaction of thiol-functional compounds and alkenyl-functional and/or alkynyl-functional compounds. For example, the sealant may be formed from the reaction of a thiol-functional sulfur-containing prepolymer and an alkenyl-functional curing agent, or from the reaction of an alkenyl-functional prepolymer and a thiol-functional curing agent. A thiol-ene/yne based coating may be cured upon exposure to actinic radiation such as, for example, ultraviolet (UV) radiation.

Examples of UV-curable sealants based on thiol-ene chemistry are provided in U.S. Pat. No. 7,438,974, U.S. Application Publication No. 2014/0186543, U.S. Application Publication No. 2013/0345372, U.S. Application Publication No. 2013/0284359, U.S. Application Publication No. 2013/0344287, U.S. Application Publication No. 2012/0040104, U.S. Application Publication No. 2014/0040103, and U.S. Application Publication No. 2015/0086726.

Radical polymerizable sulfur-containing sealant compositions can comprise a polythiol, a polyalkenyl and/or polyalkynyl, and a free radical initiator.

Sealants provided by the present disclosure can comprise a polythiol or a combination of polythiols; and a polyalkenyl, a combination of polyalkenyls, a polyalkynyl, a combination of polyalkynyls, or a combination of any of the foregoing.

A polythiol, a polyalkenyl, and a polyalkynyl can independently be selected from a prepolymer, an adduct, an oligomer, a monomer, or a combination of any of the foregoing.

A sealant can comprise a sulfur-containing prepolymer such as, for example, a polythioether prepolymer, a polysulfide prepolymer, a sulfur-containing polyformal prepolymer, a monosulfide, or a combination of any of the foregoing. A sulfur-containing prepolymer can comprise a thiol-terminated sulfur-containing prepolymer or an alkenyl-terminated sulfur-containing prepolymer. For example, a thiol-terminated sulfur-containing prepolymer can comprise a thiol-terminated polythioether prepolymer, a thiol-terminated polysulfide prepolymer, a thiol-terminated sulfur-containing polyformal prepolymer, a thiol-terminated monosulfide, or a combination of any of the foregoing.

A sulfur-containing prepolymer can comprise a thiol-terminated polythioether prepolymer or combinations of thiol-terminated polythioether prepolymers. Examples of suitable thiol-terminated polythioether prepolymers are disclosed, for example, in U.S. Pat. No. 6,172,179. A thiol-terminated polythioether prepolymer can comprise Permapol® P3.1E, Permapol® P3.1E-2.8, Permapol® L56086, or a combination of any of the foregoing, each of which is available from PPG Aerospace. These Permapol® products are encompassed by the thiol-terminated polythioether prepolymers of Formula (3)-(3c), (5) and (6) Thiol-terminated polythioethers include prepolymers described in U.S. Pat. No. 7,390,859 and urethane-containing polythiols described in U.S. Application Publication Nos. 2017/0369757 and 2016/0090507.

A thiol-terminated polythioether prepolymer can comprise a thiol-terminated polythioether prepolymer comprising at least one moiety having the structure of Formula (3):

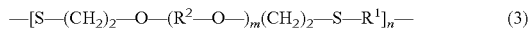

—[S—(CH$_2$)$_2$—O—(R$^2$—O—)$_m$(CH$_2$)$_2$—S—R$^1$]$_n$—    (3)

where,
each R$^1$ can independently be selected from C$_{2-10}$ n-alkanediyl, C$_{3-6}$ branched alkanediyl, C$_{6-8}$ cycloalkanediyl, C$_{6-10}$ alkanecycloalkanediyl, and —[(CHR$^3$)$_p$—X—]$_q$(CHR$^3$)$_r$—, wherein each R$^3$ can be selected from hydrogen and methyl;
each R$^2$ can independently be selected from C$_{2-10}$ n-alkanediyl, C$_{3-6}$ branched alkanediyl, C$_{6-8}$ cycloalkanediyl, C$_{6-14}$ alkanecycloalkanediyl, and —[(CH$_2$)$_p$—X—]$_q$(CH$_2$)$_r$—;
each X can independently be selected from O, S, and NR, wherein R can be selected from hydrogen and methyl;
m ranges from 0 to 50;
n can be an integer ranging from 1 to 60;
p can be an integer ranging from 2 to 6;
q can be an integer ranging from 1 to 5; and
r can be an integer ranging from 2 to 10.

In moieties of Formula (3), R$^1$ can be —[(CHR$^3$)$_p$—X—]$_q$(CHR$^3$)$_r$— wherein each X can independently be can be selected from O and S.

In moieties of Formula (3), R$^1$ can be —[(CHR$^3$)$_p$—X—]$_q$(CHR$^3$)$_r$—, each X can be O or each X can be S.

In moieties of Formula (3), R$^1$ can be —[(CH$_2$)$_p$—X—]$_q$(CH$_2$)$_r$—, where p can be 2, X can be O, q can be 2, r can be 2, R$^2$ can be ethanediyl, m can be 2, and n can be 9.

In moieties of Formula (3), each R$^1$ can be derived from 1,8-dimercapto-3,6-dioxaoctane (DMDO), each R$^1$ can be derived from dimercaptodiethylsulfide (DMDS), or a combination thereof.

In moieties of Formula (3), each m can independently be an integer from 1 to 3. Each m can be the same and can be 1, 2, or 3.

In moieties of Formula (3), n can be an integer from 1 to 30, an integer from 1 to 20, an integer from 1 to 10, or an integer from 1 to 5. In addition, n may be any integer from 1 to 60.

In moieties of Formula (3), each p can independently be 2, 3, 4, 5, and 6. Each p can be the same and can be 2, 3, 4, 5, or 6.

In moieties of Formula (3), each q can independently be 1, 2, 3, 4, or 5. Each q can be the same and can be 1, 2, 3, 4, or 5.

In moieties of Formula (3), each r can independently be 2, 3, 4, 5, 6, 7, 8, 9, or 10.

In moieties of Formula (3), each r can be the same and can be 2, 3, 4, 5, 6, 7, 8, 9, or 10.

In moieties of Formula (3), each r can independently be an integer from 2 to 4, from 2 to 6, or from 2 to 8.

In moieties of Formula (3), each R$^2$ can independently be selected from a C$_{2-10}$ n-alkanediyl group, a C$_{3-6}$ branched alkanediyl group, and a —[(CH$_2$)$_p$—X—]$_q$(CH$_2$)$_r$— group.

In moieties of Formula (3), each R$^2$ can independently be a C$_{2-10}$ n-alkanediyl group.

In moieties of Formula (3), each R$^2$ can independently comprise a —[(CH$_2$)$_p$—X—]$_q$(CH$_2$)$_r$— group, where each X can be O or S.

Thiol-terminated sulfur-containing prepolymer of Formula (3) can comprise a thiol-terminated polythioether prepolymer or combination of thiol-terminated polythioether prepolymers, where E comprises the backbone of a polythioether prepolymer.

A thiol-terminated polythioether prepolymer can have the structure of Formula (4):

HS-(E-SH)$_w$—SH    (4)

wherein, each E can comprise a moiety having the structure of Formula (5):

—S—R$^1$—[S-A-S—R$^1$—]$_n$—S—    (5)

wherein,
n can be an integer from 1 to 60;
each R$^1$ can independently be selected from C$_{2-10}$ alkanediyl, C$_{6-8}$ cycloalkanediyl, C$_{6-14}$ alkanecycloalkanediyl, C$_{5-8}$ heterocycloalkanediyl, and —[(CHR$^3$)$_p$—X—]$_q$(CHR$^3$)$_r$—, where,
p can be an integer from 2 to 6;
q can be an integer from 1 to 5;
r can be an integer from 2 to 10;
each R$^3$ can independently be selected from hydrogen and methyl; and
each X can independently be selected from O, S, S—S, and NR, wherein R can be selected from hydrogen and methyl; and
each A can independently be a moiety derived from a polyvinyl ether of Formula (6) and a polyalkenyl polyfunctionalizing agent of Formula (7):

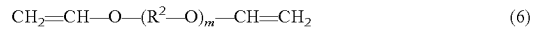

CH$_2$=CH—O—(R$^2$—O)$_m$—CH=CH$_2$    (6)

B(—R$^{70}$—CH=CH$_2$)$_z$    (7)

wherein,
   m can be an integer from 0 to 50;
   each $R^2$ can independently be selected from $C_{1-10}$ alkanediyl, $C_{6-8}$ cycloalkanediyl, $C_{6-14}$ alkanecycloalkanediyl, and $—[(CHR^3)_p—X—]_q(CHR^3)_r—$, wherein p, q, r, $R^3$, and X are as defined as for $R^1$;
   B represents a core of a z-valent, polyalkenyl polyfunctionalizing agent $B(—R^{70}—CH=CH_2)_z$ wherein,
   z can be an integer from 3 to 6; and
   each $R^{70}$ can independently be selected from $C_{1-10}$ alkanediyl, $C_{1-10}$ heteroalkanediyl, substituted $C_{1-10}$ alkanediyl, and substituted $C_{1-10}$ heteroalkanediyl.

In moieties of Formula (5), $R^1$ can be $C_{2-10}$ alkanediyl.

In moieties of Formula (5), $R^1$ can be $—[(CHR^3)_p—X—]_q(CHR^3)_r—$.

In moieties of Formula (5), X can be selected from O and S, and thus $—[(CHR^3)_p—X—]_q(CHR^3)_r—$ in Formula (5) can be $—[(CHR^3)_p—O—]_q(CHR^3)_r—$ or $—[(CHR^3)_p—S—]_q(CHR^3)_r—$. P and r can be equal, such as where p and r can both be two.

In moieties of Formula (5), $R^1$ can be selected from $C_{2-6}$ alkanediyl and $—[(CHR^3)_p—X—]_q(CHR^3)_r—$.

In moieties of Formula (5), $R^1$ can be $—[(CHR^3)_p—X—]_q(CHR^3)_r—$, and X can be O, or X can be S.

In moieties of Formula (5) where $R^1$ can be $—[(CHR^3)_p—X—]_q(CHR^3)_r—$, p can be 2, r can be 2, q can be 1, and X can be S; or p can be 2, q can be 2, r can be 2, and X can be O; or p can be 2, r can be 2, q can be 1, and X can be O.

In moieties of Formula (5) where $R^1$ can be $—[(CHR^3)_p—X—]_q(CHR^3)_r—$, each $R^3$ can be hydrogen, or at least one $R^3$ can be methyl.

In moieties of Formula (5), $R^1$ can be $—[(CH_2)_p—X—]_q(CH_2)_r—$ wherein each X can independently be selected from O and S. In polythioethers of Formula (5), $R^1$ can be $—[(CH_2)_p—X—]_q(CH_2)_r—$ each X can be O or each X can be S.

In moieties of Formula (5), $R^1$ can be $—[(CH_2)_p—X—]_q(CH_2)_r—$, where p can be 2, X can be O, q can be 2, r can be 2, $R^2$ can be ethanediyl, m can be 2, and n can be 9.

In moieties of Formula (5), each $R^1$ can be derived from 1,8-dimercapto-3,6-dioxaoctane (DMDO; 2,2-(ethane-1,2-diylbis(sulfanyl))bis(ethan-1-thiol)), or each $R^1$ can be derived from dimercaptodiethylsulfide (DMDS; 2,2'-thiobis(ethan-1-thiol)), and combinations thereof.

In moieties of Formula (5), each p can independently be selected from 2, 3, 4, 5, and 6. Each p can be the same and can be 2, 3, 4, 5, or 6.

In moieties of Formula (5) each q can independently be 1, 2, 3, 4, or 5. Each q can be the same and can be 1, 2, 3, 4, or 5.

In moieties of Formula (5), each r can independently be 2, 3, 4, 5, 6, 7, 8, 9, or 10. Each r can be the same and can be 2, 3, 4, 5, 6, 7, 8, 9, or 10.

In moieties of Formula (5), each r can independently be an integer from 2 to 4, from 2 to 6, or from 2 to 8.

In moieties of Formula (5), each A can be derived from a polyvinyl ether such as a divinyl ether. A divinyl ether can comprise a divinyl ether having the structure of Formula (6).

In divinyl ethers of Formula (6), m can be an integer from 0 to 50, such as from 0 to 40, from 0 to 20, from 0 to 10, from 1 to 50, from 1 to 40, from 1 to 20, from 1 to 10, from 2 to 50, from 2 to 40, from 2 to 20, or from 2 to 10.

In divinyl ethers of Formula (6), each $R^2$ can independently be selected from a $C_{2-10}$ n-alkanediyl group, a $C_{3-6}$ branched alkanediyl group, and a $—[(CH_2)_p—X—]_q(CH_2)_r—$ group.

In divinyl ethers of Formula (6), each $R^2$ can independently be a $C_{2-10}$ n-alkanediyl group, such as methanediyl, ethanediyl, n-propanediyl, or n-butanediyl.

In divinyl ethers of Formula (6), each $R^2$ can independently comprise a $—[(CH_2)_p—X—]_q(CH_2)_r—$ group, where each X can be O or S.

In divinyl ethers of Formula (6), each $R^2$ can independently comprise a $—[(CH_2)_p—X—]_q(CH_2)_r—$ group.

In divinyl ethers of Formula (6), each m can be independently an integer from 1 to 3. Each m can be the same and can be 1, 2, or 3.

In divinyl ethers of Formula (6), each $R^2$ can independently be selected from a $C_{2-10}$ n-alkanediyl group, a $C_{3-6}$ branched alkanediyl group, and a $—[(CH_2)_p—X—]_q(CH_2)_r—$ group.

In divinyl ethers of Formula (6), each $R^2$ can independently be a $C_{2-10}$ n-alkanediyl group.

In divinyl ethers of Formula (6), each $R^2$ can independently be a $—[(CH_2)_p—X—]_q(CH_2)_r—$ group, where each X can be O or S.

In divinyl ethers of Formula (6), each $R^2$ can independently be a $—[(CH_2)_p—X—]_q(CH_2)_r—$ group, where each X can be O or S, and each p can independently be 2, 3, 4, 5, and 6.

In divinyl ethers of Formula (6), each p can be the same and can be 2, 3, 4, 5, or 6.

In divinyl ethers of Formula (6), each $R^2$ can independently be a $—[(CH_2)_p—X—]_q(CH_2)_r—$ group, where each X can be O or S, and each q can independently be 1, 2, 3, 4, or 5.

In divinyl ethers of Formula (6), each q can be the same and can be 1, 2, 3, 4, or 5.

In divinyl ethers of Formula (6), each $R^2$ can independently be a $—[(CH_2)_p—X—]_q(CH_2)_r—$ group, where each X can be O or S, and each r can independently be 2, 3, 4, 5, 6, 7, 8, 9, or 10.

In divinyl ethers of Formula (6), each r can be the same and can be 2, 3, 4, 5, 6, 7, 8, 9, or 10. In divinyl ethers of Formula (6), each r can independently be an integer from 2 to 4, from 2 to 6, or from 2 to 8.

Examples of suitable divinyl ethers include ethylene glycol divinyl ether (EG-DVE) butanediol divinyl ether (BD-DVE) hexanediol divinyl ether (HD-DVE), diethylene glycol divinyl ether (DEG-DVE), triethylene glycol divinyl ether, tetraethylene glycol divinyl ether, polytetrahydrofuryl divinyl ether, cyclohexane dimethanol divinyl ether, and combinations of any of the foregoing.

A divinyl ether can comprise a sulfur-containing divinyl ether. Examples of suitable sulfur-containing divinyl ethers are disclosed, for example, in PCT Publication No. WO 2018/085650.

In moieties of Formula (5) each A can independently be derived from a polyalkenyl polyfunctionalizing agent. A polyalkenyl polyfunctionalizing agent can have the structure of Formula (7), where z can be 3, 4, 5, or 6.

In polyalkenyl polyfunctionalizing agents of Formula (7), each $R^{70}$ can independently be selected from $C_{1-10}$ alkanediyl, $C_{1-10}$ heteroalkanediyl, substituted $C_{1-10}$ alkanediyl, or substituted $C_{1-10}$ heteroalkanediyl. The one or more substituent groups can be selected from, for example, $—OH$, $=O$, $C_{1-4}$ alkyl, and $C_{1-4}$ alkoxy. The one or more heteroatoms can be selected from, for example, O, S, and a combination thereof.

Examples of suitable polyalkenyl polyfunctionalizing agents include triallyl cyanurate (TAC), triallylisocyanurate (TAIC), 1,3,5-triallyl-1,3,5-triazinane-2,4,6-trione), 1,3-bis(2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris(prop-2-enyl)-1,3,5-triazinane-2,4-dione, and 1,3,5-tris(2-methylallyl)-1,3,5-triazinane-2,4,6-trione, 1,2,4-trivinylcyclohexane, trimethylolpropane trivinyl ether, and combinations of any of the foregoing.

In moieties of Formula (5) the molar ratio of vinyl ether moieties derived from a divinyl ether to alkenyl moieties derived from a polyalkenyl polyfunctionalizing agent can be, for example, from 10:1 to 1,000:1, from 10:1 to 100:1, or from 20:1 to 100:1.

In moieties of Formula (5), each $R^1$ can be —$(CH_2)_2$—O—$(CH_2)_2$—O—$(CH_2)_2$—; each $R^2$ can be —$(CH_2)_2$—; and m can be an integer from 1 to 4.

In moieties of Formula (5), $R^2$ can be derived from a divinyl ether such a diethylene glycol divinyl ether, a poly alkenyl polyfunctionalizing agent such as triallyl cyanurate, or a combination thereof.

In moieties of Formula (5), each A can independently be selected from a moiety of Formula (6a) and a moiety of Formula (7a):

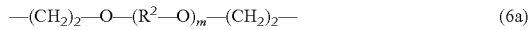

$$—(CH_2)_2—O—(R^2—O)_m—(CH_2)_2— \quad (6a)$$

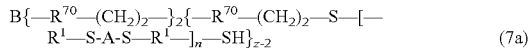

$$B\{—R^{70}—(CH_2)_2—\}_z\{—R^{70}—(CH_2)_2—S—[—R^1—S-A-S—R^1—]_n—SH\}_{z-2} \quad (7a)$$

where m, $R^1$, $R^2$, $R^{70}$, A, B, m, n, and z are defined as in Formula (5), Formula (6), and Formula (7).

In moieties of Formula (5),
each $R^1$ can be —$(CH_2)_2$—O—$(CH_2)_2$—O—$(CH_2)_2$—;
each $R^2$ can be —$(CH_2)_2$—;
m can be an integer from 1 to 4; and
the polyfunctionalizing agent $B(—R^{70}—CH=CH_2)_z$ comprises triallyl cyanurate where z is 3 and each $R^{70}$ is —O—$CH_2$—CH=$CH_2$.

A thiol-terminated polythioether prepolymer can have the structure of Formula (5a):

$$HS—R^1—[S-A-S—R^1—]_n—SH \quad (5a)$$

wherein,
n can be an integer from 1 to 60;
each $R^1$ can independently be selected from $C_{2-10}$ alkanediyl, $C_{6-8}$ cycloalkanediyl, $C_{6-14}$ alkanecycloalkanediyl, $C_{5-8}$ heterocycloalkanediyl, and —$[(CHR^3)_p—X—]_q(CHR^3)_r$—, wherein,
p can be an integer from 2 to 6;
q can be an integer from 1 to 5;
r can be an integer from 2 to 10;
each $R^3$ can independently be selected from hydrogen and methyl; and
each X can independently be selected from O, S, and NR, wherein R can be selected from hydrogen and methyl; and
each A can independently be selected from a moiety derived from a polyvinyl ether of Formula (6) and a moiety derived from a poly alkenyl polyfunctionalizing agent of Formula (7):

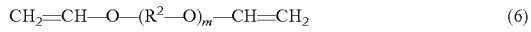

$$CH_2=CH—O—(R^2—O)_m—CH=CH_2 \quad (6)$$

$$B(—R^{70}—CH=CH_2)_z \quad (7)$$

wherein,
each $R^2$ can independently be selected from $C_{1-10}$ alkanediyl, $C_{6-8}$ cycloalkanediyl, $C_{6-14}$ alkanecycloalkanediyl, and —$[(CHR^3)_p—X—]_q(CHR^3)_r$—, wherein p, q, r, $R^3$, and X are as defined as for $R^1$;
m can be an integer from 0 to 50;
B represents a core of a z-valent, polyalkenyl polyfunctionalizing agent $B(—R^{70}—CH=CH_2)_z$ wherein,
z can be an integer from 3 to 6; and
each $R^{70}$ can independently be selected from $C_{1-10}$ alkanediyl, $C_{1-10}$ heteroalkanediyl, substituted $C_{1-10}$ alkanediyl, and substituted $C_{1-10}$ heteroalkanediyl.

In thiol-terminated polythioether prepolymers of Formula (5a), $R^1$ can be $C_{2-10}$ alkanediyl.

In thiol-terminated polythioether prepolymers of Formula (5a), $R^1$ can be —$[(CHR^3)_p—X—]_q(CHR^3)_r$—.

In thiol-terminated polythioether prepolymers of Formula (5a), X can be selected from O and S, and thus —$[(CHR^3)_p—X—]_q(CHR^3)_r$— in Formula (5a) can be —$[(CHR^3)_p—O—]_q(CHR^3)_r$— or —$[(CHR^3)_p—S—]_q(CHR^3)_r$—. P and r can be equal, such as where p and r can be both two.

In thiol-terminated polythioether prepolymers of Formula (5a), $R^1$ can be selected from $C_{2-6}$ alkanediyl and —$[(CHR^3)_p—X—]_q(CHR^3)_r$—.

In thiol-terminated polythioether prepolymers of Formula (5a), $R^1$ can be —$[(CHR^3)_p—X—]_q(CHR^3)_r$—, and X can be O, or X can be S.

In thiol-terminated polythioether prepolymers of Formula (5a), where $R^1$ can be —$[(CHR^3)_p—X—]_q(CHR^3)_r$—, p can be 2, r can be 2, q can be 1, and X can be S; or p can be 2, q can be 2, r can be 2, and X can be O; or p can be 2, r can be 2, q can be 1, and X can be O.

In thiol-terminated polythioether prepolymers of Formula (5a), where $R^1$ can be —$[(CHR^3)_p—X—]_q(CHR^3)_r$—, each $R^3$ can be hydrogen, or at least one $R^3$ can be methyl.

In thiol-terminated polythioether prepolymers of Formula (5a), $R^1$ can be —$[(CH_2)_p—X—]_q(CH_2)_r$— wherein each X can independently be selected from O and S. In thiol-terminated polythioethers of Formula (5a), $R^1$ can be —$[(CH_2)_p—X—]_q(CH_2)_r$— each X can be O or each X can be S.

In thiol-terminated polythioether prepolymers of Formula (5a), $R^1$ can be —$[(CH_2)_p—X—]_q(CH_2)_r$—, where p can be 2, X can be O, q can be 2, r can be 2, $R^2$ can be ethanediyl, m can be 2, and n can be 9.

In thiol-terminated polythioether prepolymers of Formula (5a), each $R^1$ can be derived from 1,8-dimercapto-3,6-dioxaoctane (DMDO; 2,2-(ethane-1,2-diylbis(sulfanyl))bis(ethan-1-thiol)), or each $R^1$ can be derived from dimercaptodiethylsulfide (DMDS; 2,2'-thiobis(ethan-1-thiol)), and combinations thereof.

In thiol-terminated polythioether prepolymers of Formula (5a), each p can independently be selected from 2, 3, 4, 5, and 6. Each p can be the same and can be 2, 3, 4, 5, or 6.

In thiol-terminated polythioether prepolymers of Formula (5a), each q can independently be 1, 2, 3, 4, or 5. Each q can be the same and can be 1, 2, 3, 4, or 5.

In thiol-terminated polythioether prepolymers of Formula (5a), each r can independently be 2, 3, 4, 5, 6, 7, 8, 9, or 10. Each r can be the same and can be 2, 3, 4, 5, 6, 7, 8, 9, or 10.

In thiol-terminated polythioether prepolymers of Formula (5a), each r can independently be an integer from 2 to 4, from 2 to 6, or from 2 to 8.

In thiol-terminated polythioether prepolymers of Formula (5a), each A can independently be selected from a moiety of Formula (6a) and a moiety of Formula (7a):

$$—(CH_2)_2—O—(R^2—O)_m—(CH_2)_2— \quad (6a)$$

$$B\{—R^{70}—(CH_2)_2—\}_2\{—R^{70}—(CH_2)_2—S—[—R^1—S—A—S—]_n—R^1—SH\}_{z-2} \quad (7a)$$

where m, $R^1$, $R^2$, $R^{70}$, A, B, m, n, and z are defined as in Formula (5), Formula (6), and Formula (7).

In thiol-terminated polythioether prepolymers of Formula (5a) the molar ratio of moieties derived from a divinyl ether to moieties derived from a polyalkenyl polyfunctionalizing agent can be, for example, of 200:1, 150:1, 100:1, 50:1, or 25:1.

A thiol-terminated polythioether prepolymer can comprise a thiol-terminated polythioether prepolymer of Formula (3a), a thiol-terminated polythioether prepolymer of Formula (3b), a thiol-terminated polythioether prepolymer of Formula (3c), or a combination of any of the foregoing:

$$HS—R^1—[S—(CH_2)_2—O—(R^2—O)_m(CH_2)_2—S—R^1—]_nSH \quad (3a)$$

$$\{HS—R^1—[S—(CH_2)_2—O—(R^2—O)_m(CH_2)_2—S—R^1—]_n—S—V'—\}_zB \quad (3b)$$

$$\{R^4—S—R^1—[S—(CH_2)_2—O—(R^2—O)_m(CH_2)_2—S—R^1—]_n—S—V'—\}_zB \quad (3c)$$

wherein,
each $R^1$ can independently be selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(CHR^3)_p—X—]_q(CHR^3)_r—$, wherein,
p can be an integer from 2 to 6;
q can be an integer from 1 to 5;
r can be an integer from 2 to 10;
each $R^3$ can independently be selected from hydrogen and methyl; and
each X can independently be selected from O, S, and NR, wherein R can be selected from hydrogen and methyl;
each $R^2$ can independently be selected from $C_{1-10}$alkanediyl, $C_{6-8}$ cycloalkanediyl, $C_{6-14}$ alkanecycloalkanediyl, and $—[(CHR^3)_p—X—]_q(CHR^3)_r—$, wherein p, q, r, $R^3$, and X are as defined as for $R^1$;
m can be an integer from 0 to 50;
n can be an integer from 1 to 60;
B represents a core of a z-valent, polyfunctionalizing agent $B(—V)_z$ wherein,
z can be an integer from 3 to 6; and
each V can be a moiety comprising a terminal group reactive with a thiol;
each —V'— can be derived from the reaction of —V with a thiol; and
each $R^4$ can independently be selected from hydrogen and a moiety of Formula (3), which is bound to a prepolymer of Formula (3c).

In prepolymers of Formula (3a)-(3c), $R^1$ can be $—[(CH_2)_p—X—]_q(CH_2)_r$, where p can be 2, X can be O, q can be 2, r can be 2, $R^2$ can be ethanediyl, m can be 2, and n can be 9.

In prepolymers of Formula (3a)-(3c), $R^1$ can be selected from $C_{2-6}$ alkanediyl and $—[(CHR^3)_p—X—]_q(CHR^3)_r—$.

In prepolymers of Formula (3a)-(3c), $R^1$ can be $—[(CHR^3)_p—X—]_q(CHR^3)_r—$, X can be O or X can be S.

In prepolymers of Formula (3a)-(3c), where $R^1$ can be $—[(CHR^3)_p—X—]_q(CHR^3)_r—$, p can be 2, r can be 2, q can be 1, and X can be S; or wherein p can be 2, q can be 2, r can be 2, and X can be O; or p can be 2, r can be 2, q can be 1, and X can be O.

In prepolymers of Formula (3a)-(3c), $R^1$ can be $—[(CHR^3)_p—X—]_q(CHR^3)_r—$, and each $R^3$ can be hydrogen or at least one $R^3$ can be methyl.

In prepolymers of Formula (3a)-(3c), each $R^1$ can be the same, or at least one $R^1$ can be different.

In prepolymers of Formula (3a)-(3c), each m can be independently an integer from 1 to 3. Each m can be the same and can be 1, 2, or 3.

In prepolymers of Formula (3a)-(3c), n can be an integer from 1 to 30, an integer from 1 to 20, an integer from 1 to 10, or an integer from 1 to 5. The variable n may be any integer from 1 to 60.

In prepolymers of Formula (3a)-(3c), each p can independently be 2, 3, 4, 5, and 6. Each p can be the same and can be 2, 3, 4, 5, or 6.

In prepolymers of Formula (3a)-(3c), each q can independently be 1, 2, 3, 4, or 5. Each q can be the same and can be 1, 2, 3, 4, or 5.

In prepolymers of Formula (3a)-(3c), each r can independently be 2, 3, 4, 5, 6, 7, 8, 9, or 10.

In prepolymers of Formula (3a)-(3c), each r can independently be an integer from 2 to 4, from 2 to 6, or from 2 to 8.

Various methods can be used to prepare thiol-terminated polythioether prepolymers of Formula (3a)-(3c). Examples of suitable thiol-terminated polythioether prepolymers, and methods for their production, are described in U.S. Pat. Nos. 6,172,179, 6,232,401, and 8,932,685. Such thiol-terminated polythioether prepolymers may be difunctional, that is, linear prepolymers having two terminal thiol groups, or can be polyfunctional, that is, branched prepolymers having three or more terminal thiol groups.

Thiol-terminated polythioether prepolymers are liquid at room temperature and can have a glass transition temperature $T_g$, for example, less than −20° C., less than −30° C., or less than −40° C., where the glass transition temperature $T_g$ is determined by Dynamic Mass Analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

Thiol-terminated polythioether prepolymers can exhibit a viscosity, for example, within a range from 20 poise to 500 poise (2 Pa-sec to 50 Pa-sec), from 20 poise to 200 poise (2 Pa-sec to 20 Pa-sec) or from 40 poise to 120 poise (4 Pa-sec to 12 Pa-sec), measured using a Brookfield CAP 2000 viscometer, with a No. 6 spindle, at speed of 300 rpm, and a temperature of 25° C.

Thiol-terminated polythioether prepolymers can be characterized by a number average molecular weight and/or a molecular weight distribution. Thiol-terminated polythioether prepolymers can exhibit a number average molecular weight, for example, from 500 Da to 20,000 Da, from 2,000 Da to 5,000 Da, or from 1,000 Da to 4,000 Da. Thiol-terminated polythioether prepolymers can exhibit a polydispersity (Mw/Mn; weight average molecular weight/number average molecular weight), for example, from 1 to 20, or from 1 to 5. The backbone of a thiol-terminated polythioether prepolymer can be modified to improve the properties such as adhesion, tensile strength, elongation, UV resistance, hardness, and/or flexibility of sealants and coatings prepared using polythioether prepolymers. For example, adhesion-promoting groups, antioxidants, metal ligands, and/or urethane linkages can be incorporated into the backbone of a polythioether prepolymer to improve one or more performance attributes. Examples of backbone-modified polythioether prepolymers are disclosed, for example, in U.S. Pat. No. 8,138,273 (urethane containing), U.S. Pat. No. 9,540,540 (sulfone-containing), U.S. Pat. No. 8,952,124 (bis(sulfonyl)alkanol-containing), U.S. Pat. No. 9,382,642 (metal-ligand containing), U.S. Application Publication No. 2017/0114208 (antioxidant-containing), PCT International Publication No. WO 2018/085650 (sulfur-containing divinyl ether), and PCT International Publication No. WO 2018/031532 (urethane-containing).

Thiol-terminated polythioether prepolymers include prepolymers described in U.S. Application Publication Nos. 2017/0369737 and 2016/0090507.

A thiol-terminated urethane-containing prepolymer can comprise a thiol-terminated urethane-containing prepolymer of Formula (8a), a thiol-terminated urethane-containing prepolymer of Formula (8b), or a combination thereof:

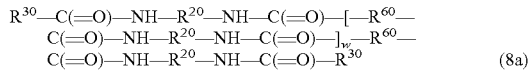  (8a)

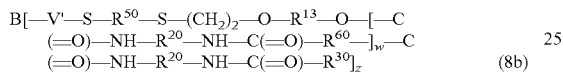  (8b)

wherein,
w is an integer from 1 to 100;
each $R^{13}$ independently be selected from $C_{2-10}$ alkanediyl;
each $R^{20}$ independently comprises a core of a diisocyanate;
each $R^{30}$ independently is a moiety comprising at least one terminal thiol group;
each $R^{50}$ independently comprises a core of a sulfur-containing prepolymer;
each $R^{60}$ independently comprises a moiety having the structure of Formula (9):

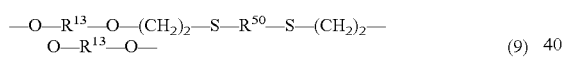  (9)

B represents a core of a z-valent, polyfunctionalizing agent B(—V)$_z$ wherein,
z is an integer from 3 to 6; and
each V is a moiety comprising a terminal group reactive with a thiol group; and
each —V'— is derived from the reaction of —V with a thiol.

A moiety —C(=O)—NH—$R^{20}$—NH—C(=O)— can be derived from a diisocyanate of Formula (10):

  (10)

In moieties of Formula (10), $R^{20}$ can be a core of an aliphatic diisocyanate such as 4,4'-methylene dicyclohexyl diisocyanate and has the structure of Formula (11):

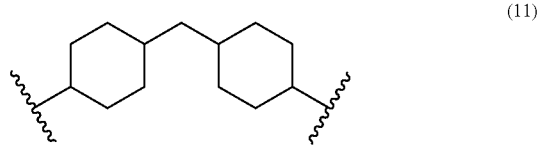 [SMILES: *C1CCC(CC2CCC(*)CC2)CC1]  (11)

An isocyanate-terminated urethane-containing prepolymer can comprise an isocyanate-terminated urethane-containing prepolymer of Formula (12a), an isocyanate-terminated urethane-containing prepolymer of Formula (12b), or a combination thereof:

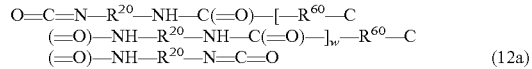  (12a)

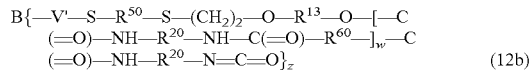  (12b)

wherein,
w is an integer from 1 to 100;
each $R^{13}$ independently can be selected from $C_{2-10}$ alkanediyl;
each $R^{20}$ independently comprises a core of a diisocyanate;
each $R^{50}$ independently comprises a core of a sulfur-containing prepolymer;
each $R^{60}$ independently comprises a moiety having the structure of Formula (9):

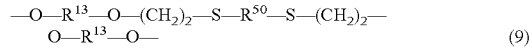  (9)

B represents a core of a z-valent, polyfunctionalizing agent B(—V)$_z$ wherein,
z is an integer from 3 to 6; and
each V is a moiety comprising a terminal group reactive with a thiol group; and
each —V'— is derived from the reaction of —V with a thiol.

In prepolymers of Formula (12a) and Formula (12b), each $R^{50}$ can be derived from a polythioether. For example, each $R^{50}$ can haves the structure of Formula (13):

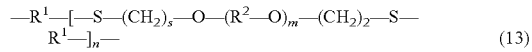  (13)

wherein,
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and —[(—CHR$^3$—)$_p$—X—]$_q$—(—CHR$^3$—)$_r$—,
wherein:
p is an integer from 2 to 6;
q is an integer from 1 to 5;
r is an integer from 2 to 10;
each $R^3$ is independently selected from hydrogen and methyl; and
each X is independently selected from —O—, —S—, and —NR—, wherein R is selected from hydrogen and methyl;
each $R^2$ is independently selected from CHO alkanediyl, $C_{6-8}$ cycloalkanediyl, $C_{6-14}$ alkanecycloalkanediyl, and —[(—CHR$^3$—)$_p$—X—]$_q$—(—CHR$^3$—)$_r$—, wherein p, q, r, $R^3$, and X are as defined as for $R^1$;
m is an integer from 0 to 50;
n is an integer from 1 to 60; and
s is an integer from 2 to 6.

In prepolymers of Formula (12a) and Formula (12b), w can be an integer from 1 to 50, from 2 to 50, or from 1 to 20 or from 2 to 20.

An isocyanate-terminated urethane-containing adduct can comprise the reaction product of reactants comprising a hydroxyl-terminated sulfur-containing adduct and a diisocyanate.

Thiol-terminated urethane-containing prepolymers can comprise a backbone of Formula (14):

  (14)

wherein, s is an integer from 1 to 60;

each $R^1$ is selected from $C_{2-10}$ alkanediyl, $C_{6-8}$ cycloalkanediyl, $C_{6-10}$ alkanecycloalkanediyl, and —[(CHR—)$_p$—X—]$_q$—(CHR)$_r$—, wherein each R is independently selected from hydrogen and methyl, wherein, each X is independently selected from —O— and —S— each p is independently an integer from 2 to 6;

q is an integer from 1 to 5; and r is an integer from 2 to 10;

each A independently is selected from a moiety of Formula (15) and a moiety of Formula (16):

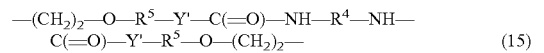

—(CH$_2$)$_2$—O—R$^5$—Y'—C(=O)—NH—R$^4$—NH— C(=O)—Y'—R$^5$—O—(CH$_2$)$_2$—     (15)

—(CH$_2$)$_2$—O—(R$^2$—O)$_m$—(CH$_2$)$_2$—     (16)

wherein, m is an integer from 0 to 50;

each Y' is independently selected from —NH— and —O—; and each $R^2$ is selected from $C_{2-6}$ n-alkanediyl, $C_{3-6}$ branched alkanediyl, $C_{6-8}$ cycloalkanediyl, $C_{6-10}$ alkanecycloalkanediyl, and —[(CH$_2$—)$_p$O—]$_q$—(CH$_2$—)$_r$—, wherein, each p is independently an integer ranging from 2 to 6;

q is an integer from 1 to 5; and r is an integer from 2 to 10;

$R^4$ comprises a core of a diisocyanate;

each $R^5$ is independently selected from CHO alkanediyl; and at least one A comprises a moiety of Formula (15).

Thiol-terminated urethane-containing prepolymers can comprise reaction products of reactants comprising:

(a) a polythiol comprising a dithiol of Formula (17):

HS—R$^1$—SH     (17)

wherein $R^1$ is selected from $C_{2-10}$ alkanediyl, $C_{6-8}$ cycloalkanediyl, $C_{6-10}$ alkanecycloalkanediyl, $C_{5-8}$ heterocycloalkanediyl, and —[(CHR—)$_p$X—]$_q$—(CHR)$_r$—, wherein:

each p is independently an integer from 2 to 6;

q is an integer from 1 to 5;

r is an integer from 2 to 10;

each R is independently selected from hydrogen and methyl; and each X is independently selected from —O—, —S—, and —NR$^5$—, wherein R$^5$ is selected from hydrogen and methyl;

(b) a urethane/urea-containing bis(alkenyl) ether of Formula (18):

CH$_2$=CH—O—R$^5$—Y'—C(=O)—NH—R$^4$—NH— C(=O)—Y'—R$^5$—O—CH=CH$_2$     (18)

wherein, each Y' is independently selected from —NH— and —O—;

R$^4$ comprises a core of a diisocyanate; and each R$^5$ independently is selected from CHO alkanediyl; and (c) a divinyl ether of Formula (19):

CH$_2$=CH—O—(R$^2$—O)$_m$—CH=CH$_2$     (19)

wherein, m is 0 to 50; and each $R^2$ is independently selected from $C_2$-6 n-alkanediyl, $C_3$-6 branched alkanediyl, $C_{6-8}$ cycloalkanediyl, $C_{6-10}$ alkanecycloalkanediyl, and —[(CH$_2$—)$_p$—O—]$_q$—(—CH$_2$—)$_r$—, wherein, each p is independently an integer ranging from 2 to 6;

q is an integer from 1 to 5; and r is an integer from 2 to 10.

A dithiol and a urethane/urea-containing bis(alkenyl) ether can include any of those disclosed herein.

A poly thiol can further comprise a polythiol of Formula (1a):

B(—V)$_z$     (1a)

wherein,

B represents a core of a z-valent polyfunctionalizing agent B(—V)$_z$, z is an integer from 3 to 6; and each —V is a moiety comprising terminal thiol group.

A thiol-terminated sulfur-containing prepolymer can comprise a thiol-terminated polysulfide prepolymer or a combination of thiol-terminated poly sulfide prepolymers.

A poly sulfide prepolymer refers to a prepolymer that contains one or more polysulfide linkages, i.e., —S$_x$— linkages, where x is from 2 to 4, in the prepolymer backbone. A polysulfide prepolymer can have two or more sulfur-sulfur linkages. Suitable thiol-terminated polysulfide prepolymers are commercially available, for example, from AkzoNohel and Toray Industries, Inc. under the tradenames Thioplast® and from Thiokol-LP®, respectively.

Examples of suitable polysulfide prepolymers are disclosed, for example, in U.S. Pat. Nos. 4,623,711; 6,172,179; 6,509,418; 7,009,032; and 7,879,955.

Examples of suitable thiol-terminated polysulfide prepolymers include are liquid polysulfide prepolymers that are blends of di- and tri-functional molecules where the difunctional polysulfide prepolymers have the structure of Formula (20a) and E in the thiol-terminated prepolymer of Formula (4) can be a moiety of Formula (20):

—(—R—S—S—)$_n$—R—     (20)

HS—(—R—S—S—)$_n$—R—SH     (20a)

and the trifunctional polysulfide polymers can have the structure of Formula (21a) and E in the thiol-terminated prepolymer of Formula (4) can be a moiety of Formula (21):

—S—(—R—S—S—)$_a$—CH$_2$—CH{—CH$_2$—(—S— S—R—)$_b$—S—}{—(—S—S—R—)$_c$—S—}     (21)

HS—(—R—S—S—)$_a$—CH$_2$—CH{—CH$_2$—(—S— S—R—)$_b$—SH}{—(—S—S—R—)$_c$—SH}     (21a)

where each R is —(CH$_2$)$_2$—O—CH$_2$—O—(CH$_2$)$_2$—, and n=a+b+c, where the value for n may be from 7 to 38 depending on the amount of the trifunctional cross-linking agent (1,2,3-trichloropropane; TCP) used during synthesis of the polysulfide prepolymer. Such thiol-terminated polysulfide prepolymers include Thioplast™ G polysulfides/resins such as Thioplast™ G1, Thioplast™ G4, Thioplast™ G10, Thioplast™ G12, Thioplast™ G21, Thioplast™ G22, Thioplast™ G44, Thioplast™ G122, and Thioplast™ G131, which are commercially available from AkzoNohel. Thioplast™ G polysulfides can have a number average molecular weight from 1,000 Da to 6,500 Da, a SH content from 1% to greater than 5.5%, and a cross-linking density from 0% to 2.0%.

Examples of suitable thiol-terminated polysulfide prepolymers also include Thiokol™ FP polysulfides available from Toray Industries, Inc. such as Thiokol™ FP2, Thiokol™ FP3, Thiokol™LP12, Thiokol™ LP23, Thiokol™ LP33, and Thiokol™ LP55. Thiokol™ LP polysulfides have a number average molecular weight from 1,000 Da to 7,500 Da, a —SH content from 0.8% to 7.7%, and a cross-linking density from 0% to 2%. Thiokol™ LP polysulfide prepolymers have the general structure of Formula (22a) and E in the thiol-terminated prepolymer of Formula (4) can be a moiety of Formula (22):

$$-S-[(CH_2)_2-O-CH_2-O-(CH_2)_2-S-S-]_n-(CH_2)_2-O-CH_2-O-(CH_2)_2-S- \quad (22)$$

$$HS-[(CH_2)_2-O-CH_2-O-(CH_2)_2-S-S-]_n-(CH_2)_2-O-CH_2-O-(CH_2)_2-SH \quad (22a)$$

where n can be such that the number average molecular weight from 1,000 Da to 7,500 Da, such as, for example an integer from 8 to 80.

A thiol-terminated sulfur-containing prepolymer can comprise a Thiokol-LP® polysulfide, a Thioplast® G polysulfide, or a combination thereof.

A thiol-terminated polysulfide prepolymer can comprise a thiol-terminated polysulfide prepolymer of Formula (23a) and E in the thiol-terminated prepolymer of Formula (4) can be a moiety of Formula (23):

$$-R-(S_y-R)_t- \quad (23)$$

$$HS-R-(S_y-R)_t-SH \quad (23a)$$

wherein,
t can be an integer from 1 to 60;
q can be an integer from 1 to 8;
p can be an integer from 1 to 10;
r can be an integer from 1 to 10;
y has an average value within a range from 1.0 to 1.5; and
each R can independently be selected from branched alkanediyl, branched arenediyl, and a moiety having the structure $-(CH_2)_p-O-(CH_2)_q-O-(CH_2)_r-$.

In thiol-terminated polysulfide prepolymers of Formula (23a) and moieties of Formula (23a), t can be, for example, an integer from 2 to 60, from 1 to 40, or from 1 to 20.

In thiol-terminated polysulfide prepolymers of Formula (23a) and moieties of Formula (23a), q can be, for example, an integer from 1 to 6, or an integer from 1 to 4. For example, q can be 1, 2, 3, 4, 5 or 6.

In thiol-terminated polysulfide prepolymers of Formula (23a) and moieties of Formula (23a), each p can be, for example, an integer from 1 to 6 or from 1 to 4. For example, each p can be 1, 2, 3, 4, 5, 6, 7, 8, 9, or 10.

In thiol-terminated polysulfide prepolymers of Formula (23a) and moieties of Formula (23a), each r can be, for example, an integer from 1 to 6 or from 1 to 4. For example, each p can be 1, 2, 3, 4, 5, 6, 7, 8, 9, or 10.

In thiol-terminated polysulfide prepolymers of Formula (23a) and moieties of Formula (23a), y can have a value of 1.

In thiol-terminated polysulfide prepolymers of Formula (23a) and moieties of Formula (23a), y can have an average value, for example, of 1, such as from 1.05 to 2, or from 1.1 to 1.8.

In thiol-terminated polysulfide prepolymers of Formula (23a) and moieties of Formula (23a), R can be $-(CH_2)_p-O-(CH_2)_q-O-(CH_2)_r-$.

In thiol-terminated polysulfide prepolymers of Formula (23a) and moieties of Formula (23a), R can be $-(CH_2)_p-O-(CH_2)_q-O-(CH_2)_r-$, each q can be 1, 2, 3, or 4, and each p and r can be 1 or 2.

In thiol-terminated polysulfide prepolymers of Formula (23a) and moieties of Formula (23a), 0% to 20% of the R groups can comprise branched alkanediyl or branched arenediyl, and 80% to 100% of the R groups can be $-(CH_2)_p-O-(CH_2)_q-O-(CH_2)_r-$.

In thiol-terminated polysulfide prepolymers of Formula (23a) and moieties of Formula (23a), a branched alkanediyl or a branched arenediyl can be $-R^1(-A)_n-$ where $R^1$ is a hydrocarbon group, n is 1 or 2, and A is a branching point. A branched alkanediyl can have the structure $-CH_2-CH(-CH_2-)-$.

Thiol-terminated polysulfide prepolymers of Formula (23a) and moieties of Formula (23a) can be prepared by reacting an α,ω-dihalo organic compounds, a metal hydrosulfide, a metal hydroxide, and an optional polyfunctionalizing agent. Examples of suitable α,ω-dihalo organic compounds include bis(2-chloroethyl)formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene.

Examples of thiol-terminated polysulfide prepolymers of Formula (23) and (23a) are disclosed, for example, in U.S. Application Publication No. 2016/0152775, in U.S. Pat. No. 9,079,833, and in U.S. Pat. No. 9,663,619.

A thiol-terminated polysulfide prepolymer can comprise a thiol-terminated polysulfide prepolymer of Formula (24a) and E in the thiol-terminated prepolymer of Formula (4) can be a moiety of Formula (24):

$$-(R-O-CH_2-O-R-S_m-)_{n-1}-R-O-CH_2-O-R- \quad (24)$$

$$HS-(R-O-CH_2-O-R-S_m-)_{n-1}-R-O-CH_2-O-R-SH \quad (24a)$$

where R is $C_{2-4}$ alkanediyl, m is an integer from 1 to 8, and n is an integer from 2 to 370.

In thiol-terminated polysulfide prepolymers of Formula (24) and (24a), m can have an average value, for example, greater than 1, such as from 1.05 to 2, or from 1.1 to 1.8.

In thiol-terminated polysulfide prepolymers of Formula (24) and (24a), m can be, for example, an integer from 1 to 6, and integer from 1 to 4, or the integer 1, 2, 3, 4, 5, 6, 7, or 8.

In thiol-terminated polysulfide prepolymers of Formula (24) and (24a), n can be, for example, an integer from 2 to 200 or an integer from 2 to 100.

In thiol-terminated polysulfide prepolymers of Formula (24) and (24a), each R can independently be selected from ethanediyl, 1,3-propanediyl, 1,1-propanediyl, 1,2-propanediyl, 1,4-butanediyl, 1,1-butanediyl, 1,2-butanediyl, and 1,3-butanediyl.

Examples of thiol-terminated polysulfide prepolymers of Formula (24) and (24a) are disclosed, for example, in JP 62-53354.

Thiol-terminated polysulfide prepolymers can be liquid at room temperature. Thiol-terminated monosulfide prepolymers can have a viscosity of no more than 1,500 poise (150 Pa-sec), such as 40 poise to 500 poise (4 Pa-sec to 50 Pa-sec), at a temperature of about 25° C. and a pressure of about 760 mm Hg (101 kPa) determined according to ASTM D-2849 § 79-90 using a Brookfield CAP 2000 viscometer with a No. 6 spindle, at speed of 300 rpm, and a temperature of 25° C.

Thiol-terminated polysulfide prepolymers can have a number average molecular weight within a range from 300 Da to 10,000 Da, such as within a range 1,000 Da to 8,000

Da, the number average molecular weight being determined by gel-permeation chromatography using a polystyrene standard.

Thiol-terminated polysulfide prepolymers can have a glass transition temperature $T_g$ less than −40° C., less than −55° C., or less than −60° C. The glass transition temperature $T_g$ is determined by Dynamic Mass Analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

A thiol-terminated sulfur-containing prepolymer can comprise a thiol-terminated sulfur-containing polyformal prepolymer or a combination of thiol-terminated sulfur-containing polyformal prepolymers. Sulfur-containing polyformal prepolymers useful in sealant applications are disclosed, for example, in U.S. Pat. No. 8,729,216 and in U.S. Pat. No. 8,541,513.

A thiol-terminated sulfur-containing prepolymer can comprise a thiol-terminated sulfur-containing polyformal prepolymer comprising a moiety of Formula (25):

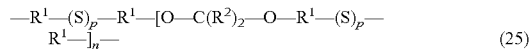
$$—R^1—(S)_p—R^1—[O—C(R^2)_2—O—R^1—(S)_p—R^1—]_n— \quad (25)$$

where n can be an integer from 1 to 50; each p can independently be selected from 1 and 2; each $R^1$ can be $C_{2-6}$ alkanediyl; and each $R^2$ can independently be selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl.

A thiol-terminated sulfur-containing polyformal prepolymer can have the structure of Formula (25a):

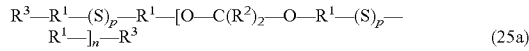
$$R^3—R^1—(S)_p—R^1—[O—C(R^2)_2—O—R^1—(S)_p—R^1—]_n—R^3 \quad (25a)$$

where n can be an integer from 1 to 50; each p can independently be selected from 1 and 2; each $R^1$ can be $C_{2-6}$ alkanediyl; each $R^2$ can independently be selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; and each $R^3$ comprises a thiol-terminated group.

In sulfur-containing polyformal moieties of Formula (25) and prepolymers of Formula (25a), each $R^1$ can independently be selected from $C_{2-6}$ alkanediyl, $C_{2-4}$ alkanediyl, $C_{2-3}$ alkanediyl, and ethane-1,2-diyl. In sulfur-containing polyformal moieties of Formula (25) and prepolymers of Formula (25a), each $R^1$ can be ethane-1,2-diyl.

In sulfur-containing polyformal moieties of Formula (25) and prepolymers of Formula (25a), each $R^2$ can independently be selected from hydrogen, $C_{1-6}$ alkyl, $C_{1-4}$ alkyl, $C_{1-3}$ alkyl, and $C_{1-2}$ alkyl. In sulfur-containing polyformal moieties of Formula (25) and prepolymers of Formula (25a), each $R^2$ can be selected from hydrogen, methyl, and ethyl.

In sulfur-containing polyformal moieties of Formula (25) and prepolymers of Formula (25a), each $R^1$ is the same and can be selected from $C_{2-3}$ alkanediyl such as ethane-1,2-diyl and propane-1,3-diyl; and each $R^2$ is the same and can be selected from hydrogen and $C_{1-3}$ alkyl such as methyl, ethyl, or propyl.

In sulfur-containing polyformal moieties of Formula (25) and prepolymers of Formula (25a), each $R^1$ can be ethane-1,2-diyl.

In sulfur-containing polyformal moieties of Formula (25) and prepolymers of Formula (25a), each $R^2$ can be hydrogen. In sulfur-containing polyformal moieties of Formula (25) and prepolymers Formula (25a), each $R^1$ can be ethane-1,2-diyl and each $R^2$ can be hydrogen.

In sulfur-containing polyformal moieties of Formula (25) and prepolymers of Formula (25a), n can be an integer selected from 1 to 50, an integer from 2 to 40, an integer from 4 to 30, or n can be an integer from 7 to 30.

In sulfur-containing polyformal moieties of Formula (25) and prepolymers of Formula (25a), each p is the same and can be 1, and each p is the same and can be 2.

In sulfur-containing polyformal moieties of Formula (25) and prepolymers of Formula (25a) can have a number average molecular weight from 200 Da to 6,000 Da, from 500 Da to 5,000 Da, from 1,000 Da to 5,000 Da, from 1,500 Da to 4000 Da, or from 2,000 Da to 3,600 Da.

In sulfur-containing polyformal prepolymers of Formula (25a), each $R^3$ can be a thiol-terminated group and can be a group of Formula (a), Formula (b), Formula (c), Formula (d), Formula (e), or Formula (f):

$$HS—R^7—R^6—O— \quad (a)$$

$$HS—R^7—O— \quad (b)$$

$$HS—R^7—NH—C(=O)—O— \quad (c)$$

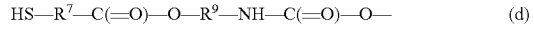
$$HS—R^7—C(=O)—O—R^9—NH—C(=O)—O— \quad (d)$$

$$HS—R^7—C(=O)—NH—R^9—NH—C(=O)—O— \quad (e)$$

$$HS—R^7—C(=O)—O— \quad (f)$$

where each $R^6$ comprises a moiety derived from a diisocyanate or a moiety derived from an ethylenically unsaturated monoisocyanate; each $R^7$ can be selected from $C_{2-14}$ alkanediyl and $C_{2-14}$ heteroalkanediyl; and each $R^9$ can be selected from $C_{2-6}$ alkanediyl, $C_{2-6}$ heteroalkanediyl, $C_{6-12}$ arenediyl, substituted $C_{6-12}$ arenediyl, $C_{6-12}$ heteroarenediyl, substituted $C_{6-12}$ heteroarenediyl, $C_{3-12}$ cycloalkanediyl, substituted $C_{3-12}$ cycloalkanediyl, $C_{3-12}$ heterocycloalkanediyl, substituted $C_{3-12}$ heterocycloalkanediyl, $C_{7-18}$ alkanearenediyl, substituted $C_{7-18}$ heteroalkanearenediyl, $C_{4\text{-}ix}$ alkanecycloalkanediyl, and substituted $C_{4-18}$ alkanecycloalkanediyl.

Sulfur-containing polyformal prepolymers can have the structure of Formula (25b):

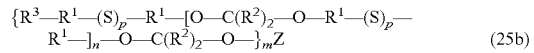
$$\{R^3—R^1—(S)_p—R^1—[O—C(R^2)_2—O—R^1—(S)_p—R^1—]_n—O—C(R^2)_2—O—\}_mZ \quad (25b)$$

where each n can be an integer selected from 1 to 50; m can be an integer selected from 3 to 6; p can independently be selected from 1 and 2; each $R^1$ can independently be $C_{2-6}$ alkanediyl; each $R^2$ can independently be selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; each $R^3$ comprises a thiol-terminated group; and Z can be derived from the core of an m-valent parent polyol $Z(OH)_m$.

In sulfur-containing polyformal prepolymers of Formula (25b), each $R^1$ can independently be selected from $C_{2-6}$ alkanediyl, $C_{2-4}$ alkanediyl, $C_{2-3}$ alkanediyl, and ethane-1,2-diyl. In sulfur-containing polyformal prepolymers of Formula (25b), each $R^1$ can be ethane-1,2-diyl.

In sulfur-containing polyformal prepolymers of Formula (25b), each $R^2$ can independently be selected from hydrogen, $C_{1-6}$ alkyl, $C_{1-4}$ alkyl, $C_{1-3}$ alkyl, and $C_{1-2}$ alkyl. In sulfur-containing polyformal prepolymers of Formula (25b), each $R^2$ can be selected from hydrogen, methyl, and ethyl.

In sulfur-containing polyformal prepolymers of Formula (25b), each $R^1$ can be the same and can be selected from $C_{2-3}$ alkanediyl such as ethane-1,2-diyl or propane-1,3-diyl; and each $R^2$ can be the same and can be selected from hydrogen and $C_{1-3}$ alkyl such as methyl, ethyl, or propyl. In sulfur-containing polyformal prepolymers of Formula (25b), each $R^1$ can be ethane-1,2-diyl. In sulfur-containing polyformal prepolymers of Formula (25b), each $R^2$ can be hydrogen. In sulfur-containing polyformal prepolymers of Formula (25b), each $R^1$ can be ethane-1,2-diyl and each $R^2$ can be hydrogen.

In sulfur-containing polyformal prepolymers of Formula (25b), m can be 3, m can be 4, m can be 5, or m can be 6.

In sulfur-containing polyformal prepolymers of Formula (25b) where m is 3, the parent polyol $Z(OH)_m$ is a triol of Formula (26):

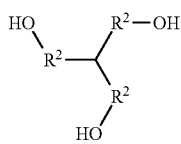

(26)

where each $R^2$ can independently be $C_{1-6}$ alkanediyl, or a triol of Formula (27):

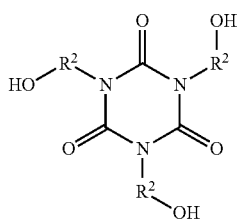

(27)

where each $R^2$ can independently be $C_{1-6}$ alkanediyl. Accordingly, in these embodiments Z can have the structure of Formula (26a) or Formula (27b):

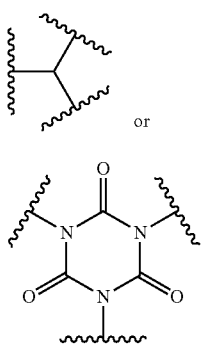

(26a)

or (27b)

respectively, where each $R^2$ can independently be $C_{1-6}$ alkanediyl.

In sulfur-containing polyformal prepolymers of Formula (25b), each n can be an integer selected from 1 to 50, an integer selected from 2 to 40, an integer selected from 4 to 30, or an integer selected from 7 to 30.

Sulfur-containing polyformal prepolymers of Formula (25b) can have a number average molecular weight, for example, from 200 Da to 6,000 Da, from 500 Da to 5,000 Da, from 1,000 Da to 5,000 Da, from 1,500 Da to 4000 Da, or from 2,000 Da to 3,600 Da.

In sulfur-containing polyformal prepolymers of Formula (25b), $R^3$ can be bonded to a polyfunctionalizing agent $B(V)_z$ through a moiety of Formula (25).

In sulfur-containing polyformal prepolymers of Formula (25b), each $R^3$ can be the same.

A thiol-terminated sulfur-containing prepolymer can comprise a thiol-terminated monosulfide prepolymer or a combination of thiol-terminated monosulfide prepolymers.

A thiol-terminated monosulfide prepolymer can comprise a thiol-terminated monosulfide prepolymer comprising a moiety of Formula (28):

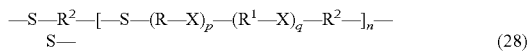

(28)

wherein, each R can independently be selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-4}$ alkylcycloalkyanediyl, such as $C_{6-10}$ alkylcycloalkanediyl; and $C_{8-10}$ alkylarenediyl;

each $R^1$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{8-10}$ alkylarenediyl; each $R^2$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as a $C_{6-10}$ alkylcycloalkanediyl; and $C_{8-10}$ alkylarenediyl; each X can independently be selected from O or S;

p can be an integer from 1 to 5;

q can be an integer from 0 to 5; and n can be an integer from 1 to 60, such as from 2 to 60, from 3 to 60, or from 25 to 35.

In moieties of Formula (28), each X can independently be selected from S, O, and $NR^3$, where $R^3$ comprises $C_{1-4}$ alkyl; p can be an integer from 1 to 5; q can be an integer from 0 to 5; n can be an integer from 1 to 60; each R can independently be selected from $C_{2-10}$ alkanediyl, $C_{6-8}$ cycloalkanediyl, $C_{1-4}$ alkylcycloalkanediyl, and $C_{8-10}$ alkylarenediyl; each $R^1$ can independently be selected from $C_{1-10}$ alkanediyl, $C_{6-8}$ cycloalkanediyl, $C_{1-4}$ alkylcycloalkanediyl, and $C_{8-10}$ alkylarenediyl; and each $R^2$ can independently be selected from $C_{2-10}$ alkanediyl, $C_{6-8}$ cycloalkanediyl, $C_{1-4}$ alkylcycloalkanediyl, and $C_{8-10}$ alkylarenediyl.

A thiol-terminated monosulfide prepolymer can comprise a thiol-terminated monosulfide prepolymer of Formula (28a), a thiol-terminated monosulfide prepolymer of Formula (28b), a thiol-terminated monosulfide prepolymer of Formula (28c), or a combination of any of the foregoing:

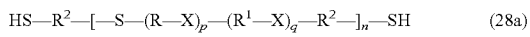

(28a)

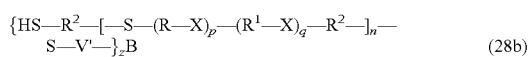

(28b)

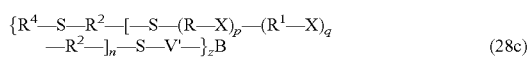

(28c)

wherein,
- each R can independently be selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{8-10}$ alkylarenediyl;
- each $R^1$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{8-10}$ alkylarenediyl;
- each $R^2$ can independently be selected from $C_{1-10}$ n-alkanediyl, such as $C_{1-6}$ n-alkanediyl, $C_2$ to branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as a $C_{6-10}$ alkylcycloalkanediyl; and $C_{8-10}$ alkylarenediyl;
- each X can independently be selected from O and S;
- p can be an integer from 1 to 5;
- q can be an integer from 0 to 5; and
- n can be an integer from 1 to 60, such as from 2 to 60, from 3 to 60, or from 25 to 35 and
- B represents a core of a z-valent polyfunctionalizing agent $B(-V)_z$ wherein:
  - z can be an integer from 3 to 6; and
  - each V can be a moiety comprising a terminal group reactive with a thiol group;
- each —V'— can be derived from the reaction of —V with a thiol; and
- each $R^4$ can independently be selected from hydrogen and a bond to a polyfunctionalizing
- agent $B(-V)_z$ through a moiety of Formula (28).

In thiol-terminated monosulfide prepolymers of Formula (28)-(28c):
- each X can independently be selected from S, O, and $NR^3$, where $R^3$ be selected from $C_{1-4}$ alkyl;
- p can be an integer from 1 to 5;
- q can be an integer from 0 to 5;
- n can be an integer from 1 to 60;
- each R can independently be selected from $C_{2-10}$ alkanediyl, $C_{6-8}$ cycloalkanediyl, $C_{1-4}$ alkylcycloalkanediyl, and $C_{8-10}$ alkylarenediyl;
- each $R^1$ can independently be selected from $C_{1-10}$ alkanediyl, $C_{6-8}$ cycloalkanediyl, $C_{1-4}$ alkylcycloalkanediyl, and $C_{8-10}$ alkylarenediyl;
- each $R^2$ can independently be selected from $C_{2-10}$ alkanediyl, $C_{6-8}$ cycloalkanediyl, $C_{1-4}$ alkylcycloalkanediyl, and $C_{8-10}$ alkylarenediyl;
- B represents a core of a z-valent polyfunctionalizing agent $B(-V)_z$ wherein:
  - z can be an integer from 3 to 6; and
  - each V can be a moiety comprising a terminal group reactive with a thiol group;
- each —V'— can be derived from the reaction of —V with a thiol; and
- each $R^4$ can independently be selected from hydrogen and a bond to a polyfunctionalizing agent $B(-V)_z$ through a moiety of Formula (28).

In thiol-terminated monosulfide moieties or prepolymers of Formula (28)-(28c), each X can independently be S or O, each X can be S, or each X can be O.

In thiol-terminated monosulfide moieties or prepolymers of Formula (28)-(28c), p can be an integer from 2 to 6, or p can be 1, 2, 3, 4, 5, or 6.

In thiol-terminated monosulfide moieties or prepolymers of Formula (28)-(28c), q can be an integer from 1 to 5, q can be an integer from 2 to 5, or q can be 0, 1, 2, 3, 4, or 5.

In thiol-terminated monosulfide moieties or prepolymers of Formula (28)-(28c), n can be an integer from 2 to 60, from 3 to 60, or from 25 to 35.

In thiol-terminated monosulfide moieties or prepolymers of Formula (28)-(28c), each R can independently be selected from $C_{2-10}$ alkanediyl and $C_{6-8}$ cycloalkanediyl, each R can be $C_{2-10}$ alkanediyl, or each R can be $C_{6-8}$ cycloalkanediyl.

In thiol-terminated monosulfide moieties or prepolymers of Formula (28)-(28c), each R can be selected from $C_{2-6}$ alkanediyl, $C_{2-4}$ alkanediyl, $C_{2-10}$ alkanediyl, and $C_{3-6}$ alkanediyl.

In thiol-terminated monosulfide moieties or prepolymers of Formula (28)-(28c), each R can be selected from ethanediyl, 1,3-propanediyl, 1,2-propanediyl, 1,4-butanediyl, and 1,3-butanediyl.

In thiol-terminated monosulfide moieties or prepolymers of Formula (28)-(28c), each $R^1$ can independently be selected from $C_{1-10}$ alkanediyl and $C_{6-8}$ cycloalkanediyl, each R can be $C_{1-10}$ alkanediyl, or each $R^1$ can be $C_{6-8}$ cycloalkanediyl.

In thiol-terminated monosulfide moieties or prepolymers of Formula (28)-(28c), each $R^1$ can be selected from $C_{1-6}$ alkanediyl, $C_{1-4}$ alkanediyl, $C_{2-10}$ alkanediyl, and $C_{2-6}$ alkanediyl.

In thiol-terminated monosulfide moieties or prepolymers of Formula (28)-(28c), each $R^1$ can be selected from methanediyl, ethanediyl, 1,3-propanediyl, 1,2-propanediyl, 1,4-butanediyl, and 1,3-butanediyl.

In thiol-terminated monosulfide moieties or prepolymers of Formula (28)-(28c), each $R^2$ can independently be selected from $C_{2-10}$ alkanediyl and $C_{6-8}$ cycloalkanediyl, each $R^2$ can be $C_{2-10}$ alkanediyl, or each $R^2$ can be $C_{6-8}$ cycloalkanediyl.

In thiol-terminated monosulfide moieties or prepolymers of Formula (28)-(28c), each $R^2$ can be selected from $C_{2-6}$ alkanediyl, $C_{2-4}$ alkanediyl, $C_{3-10}$ alkanediyl, and $C_{3-6}$ alkanediyl.

In thiol-terminated monosulfide moieties or prepolymers of Formula (28)-(28c), each $R^2$ can be selected from ethanediyl, 1,3-propanediyl, 1,2-propanediyl, 1,4-butanediyl, and 1,3-butanediyl.

In thiol-terminated monosulfide moieties or prepolymers of Formula (28)-(28c), p can be 1 or 2, q can be 1 or 2, n can be an integer from 1 to 60 or an integer from 25 to 35, each X can be O or S, each R can be $C_{2-4}$ alkanediyl, each $R^1$ can be $C_{1-4}$ alkanediyl, and each $R^2$ can be $C_{2-4}$ alkanediyl.

In thiol-terminated monosulfide moieties or prepolymers of Formula (28)-(28c), p can be 1 or 2, q can be 1 or 2, n can be an integer from 1 to 60 or an integer from 25 to 35, each X can be O or S, each R can be $C_2$ alkanediyl, each $R^1$ can be $C_1$ alkanediyl, and each $R^2$ can be $C_2$ alkanediyl.

In thiol-terminated monosulfide moieties or prepolymers of Formula (28)-(28c), p can be 1 or 2, q can be 1 or 2, n can be an integer from 1 to 60 or an integer from 25 to 35, each X can be O, each R can be $C_2$ alkanediyl, each $R^1$ can be $C_1$ alkanediyl, and each $R^2$ can be $C_2$ alkanediyl.

In thiol-terminated monosulfide moieties or prepolymers of Formula (28)-(28c), $B(-V)_z$ can be selected from 1,2,3- trichloropropane, 1,1,1-tris(chloromethyl)propane, 1,1,1-tris(chloromethyl)ethane, 1,3,5-tris(chloromethyl)benzene, and a combination of any of the foregoing.

In thiol-terminated monosulfide moieties or prepolymers of Formula (28c) each $R^4$ can independently be selected from hydrogen and a bond to a polyfunctionalizing agent $B(V)_z$ through a moiety of Formula (28). A thiol-terminated monosulfide moiety or prepolymer can have an average thiol functionality, for example, from 2.05 to 2.9, such as from 2.1 to 2.8, or from 2.2 to 2.6.

Thiol-terminated monosulfide moieties or prepolymers of Formula (28)-(28c) can be prepared, for example, by reacting an α,ω-dihalo organic compounds, a metal hydrosulfide, a metal hydroxide, and an optional polyfunctionalizing agent. Examples of suitable α,ω-dihalo organic compounds include bis(2-chloroethyl)formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene. Methods of synthesizing thiol-terminated monosulfide moieties or prepolymers of Formula (28)-(28c) are disclosed, for example, in U.S. Pat. No. 7,875,666.

A thiol-terminated monosulfide prepolymer can comprise a thiol-terminated monosulfide prepolymer comprising a moiety of Formula (29) and E in the thiol-terminated prepolymer of Formula (4) can be a moiety of Formula (29a):

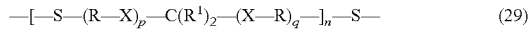   (29)

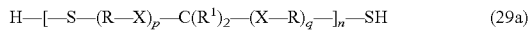   (29a)

wherein,
each R can independently be selected from $C_{2-10}$ alkanediyl, such as $C_{2-6}$ alkanediyl; a $C_3$ to branched alkanediyl, such as a $C_{3-6}$ branched alkanediyl or a $C_{3-6}$ branched alkanediyl having one or more pendant groups which can be, for example, alkyl groups, such as methyl or ethyl groups; a $C_{6-8}$ cycloalkanediyl; a $C_{6-14}$ alkylcycloalkyanediyl, such as a $C_{6-10}$ alkyleycloalkanediyl; and a $C_{8-10}$ alkylarenediyl;

each $R^1$ can independently be selected from hydrogen, $C_{1-10}$ n-alkyl, such as a $C_{1-6}$ n-alkyl, $C_{3-10}$ branched alkyl, such as a $C_{3-6}$ branched alkyl having one or more pendant groups which can be, for example, alkyl groups, such as methyl or ethyl groups; a $C_{6-8}$ cycloalkyl group; a $C_{6-14}$ alkylcycloalkyl, such as a $C_{6-10}$ alkylcycloalkyl; and a $C_{8-10}$ alkylaryl;

each X can independently be selected from O and S;
p can be an integer from 1 to 5;
q can be an integer from 1 to 5; and
n can be an integer from 1 to 60, such as from 2 to 60, from 3 to 60, or from 25 to 35.

A thiol-terminated monosulfide prepolymer can comprise a thiol-terminated monosulfide prepolymer of Formula (29a), a thiol-terminated monosulfide prepolymer of Formula (29b), a thiol-terminated monosulfide prepolymer of Formula (29c), or a combination of any of the foregoing:

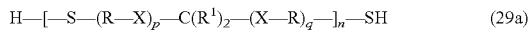   (29a)

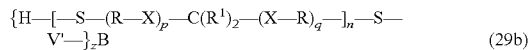   (29b)

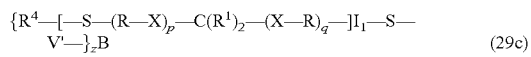   (29c)

wherein,
each R can independently be selected from $C_{2-10}$ alkanediyl, such as $C_{2-6}$ alkanediyl; a $C_{3-10}$ branched alkanediyl, such as a $C_{3-6}$ branched alkanediyl or a $C_{3-6}$ branched alkanediyl having one or more pendant groups which can be, for example, alkyl groups, such as methyl or ethyl groups; a $C_{6-8}$ cycloalkanediyl; a $C_{6-14}$ alkylcycloalkyanediyl, such as a $C_{6-10}$ alkyleycloalkanediyl; and a $C_{8-10}$ alkylarenediyl;

each $R^1$ can independently be selected from hydrogen, $C_{1-10}$ n-alkyl, such as a $C_{1-6}$ n-alkyl, $C_{3-10}$ branched alkyl, such as a $C_{3-6}$ branched alkyl having one or more pendant groups which can be, for example, alkyl groups, such as methyl or ethyl groups; a $C_{6-8}$ cycloalkyl group; a $C_{6-14}$ alkylcycloalkyl, such as a $C_{6-10}$ alkylcycloalkyl; and a $C_{8-10}$ alkylaryl;

each X can independently be selected from O and S;
p can be an integer from 1 to 5;
q can be an integer from 1 to 5;
n can be an integer from 1 to 60, such as from 2 to 60, from 3 to 60, or from 25 to 35;
B represents a core of a z-valent polyfunctionalizing agent $B(-V)_z$ wherein:
z can be an integer from 3 to 6; and
each V can be a moiety comprising a terminal group reactive with a thiol group;
each —V'— can be derived from the reaction of —V with a thiol; and
each $R^4$ can independently be selected from hydrogen and a bond to a polyfunctionalizing agent $B(-V)_z$ through a moiety of Formula (29).

In thiol-terminated monosulfide moieties or prepolymers of Formula (29)-(29c), each X can independently be selected from S and O; p can be an integer from 1 to 5; q can be an integer from 1 to 5; n can be an integer from 1 to 60; each R can independently be $C_{2-10}$ alkanediyl; each $R^1$ can independently be selected from hydrogen and CHO alkanediyl; B represents a core of a z-valent polyfunctionalizing agent $B(-V)_z$ wherein: z can be an integer from 3 to 6; and each V can be a moiety comprising a terminal group reactive with a thiol group; each —V'— can be derived from the reaction of —V with a thiol; and each $R^4$ can independently be hydrogen or can be bonded to a polyfunctionalizing agent $B(-V)_z$ through a moiety of Formula (29).

In thiol-terminated monosulfide moieties or prepolymers of Formula (29)-(29c), each X can be S, or each X can be O.

In thiol-terminated monosulfide moieties or prepolymers of Formula (29)-(29c), p can be an integer from 2 to 5, or q can be 1, 2, 3, 4, or 5.

In thiol-terminated monosulfide moieties or prepolymers of Formula (29)-(29c), p can be an integer from 2 to 5, or q can be 1, 2, 3, 4, or 5.

In thiol-terminated monosulfide moieties or prepolymers of Formula (29)-(29c), n can be an integer from 2 to 60, from 3 to 60, or from 25 to 35.

In thiol-terminated monosulfide moieties or prepolymers of Formula (29)-(29c), each R can independently be selected from $C_{2-6}$ alkanediyl and $C_{2-4}$ alkanediyl.

In thiol-terminated monosulfide moieties or prepolymers of Formula (29)-(29c), each R can be selected from ethanediyl, 1,3-propanediyl, 1,2-propanediyl, 1,4-butanediyl, and 1,3-butanediyl.

In thiol-terminated monosulfide moieties or prepolymers of Formula (29)-(29c), each R can be selected from $C_{2-10}$ n-alkanediyl, $C_{2-10}$ branched alkanediyl, and a combination thereof.

In thiol-terminated monosulfide moieties or prepolymers of Formula (29)-(29c), each $R^1$ can independently be selected from hydrogen and $C_{2-6}$ alkyl.

In thiol-terminated monosulfide moieties or prepolymers of Formula (29)-(29c), each $R^1$ can independently be selected from hydrogen, ethanediyl, 1,3-propyl, 1,2-propyl, 1,4-butyl, and 1,3-butyl.

In thiol-terminated monosulfide moieties or prepolymers of Formula (29)-(29c), each $R^1$ can be selected from $C_{1-10}$ n-alkyl, $C_{1-10}$ branched alkyl, and a combination thereof.

In thiol-terminated monosulfide moieties or prepolymers of Formula (29)-(29c), each X can be O, p can be 1 or 2, q can be 1 or 2, n can be 1 to 60 such as 2 to 60, each R can be $C_{2-4}$ alkanediyl such as ethanediyl, and each $R^1$ can be hydrogen.

In thiol-terminated monosulfide moieties or prepolymers of Formula (29)-(29c), each X can be O, p can be 1, q can be 1, n can be 1 to 60 such as 2 to 60, each R can be $C_{2-4}$ alkanediyl such as ethanediyl, and each $R^1$ can be hydrogen.

In thiol-terminated monosulfide moieties or prepolymers of Formula (29)-(29c), each X can be O, p can be 2, q can be 2, n can be 1 to 60 such as 2 to 60, each R can be $C_{2-4}$ alkanediyl such as ethanediyl, and each $R^1$ can be hydrogen.

In thiol-terminated monosulfide moieties or prepolymers of Formula (29)-(29c), B(—V)$_z$ can be selected from 1,2,3-trichloropropane, 1,1,1-tris(chloromethyl)propane, 1,1,1-tris(chloromethyl)ethane, 1,3,5-tris(chloromethyl)benzene, and a combination of any of the foregoing.

Thiol-terminated monosulfide moieties or prepolymers of Formula (29)-(29c) can be prepared by reacting an α,ω-dihalo organic compounds, a metal hydrosulfide, a metal hydroxide, and an optional polyfunctionalizing agent. Examples of suitable α,ω-dihalo organic compounds include bis(2-chloroethyl)formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene. Methods of synthesizing thiol-terminated monosulfides of Formula (29)-(29c) are disclosed, for example, in U.S. Pat. No. 8,466,220.

Thiol-terminated monosulfide moieties and prepolymers can have a number average molecular weight within a range from 300 Da to 10,000 Da, such as within a range 1,000 Da to 8,000 Da, where the number average molecular weight is determined by gel-permeation chromatography using a polystyrene standard. Thiol-terminated monosulfide prepolymers can have a glass transition temperature $T_g$ less than −40° C., less than −55° C., or less than −60° C. The glass transition temperature $T_g$ is determined by Dynamic Mass Analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

A sulfur-containing prepolymer can comprise a sulfur-containing perfluoroether prepolymer, a perfluorosilicone prepolymer, or a combination thereof.

A sulfur-containing sealant overlying an adhesion-promoting layer provided by the present disclosure can be a free radical polymerizable sulfur-containing sealant including actinic radiation-curable sulfur-containing sealants such as UV-curable sulfur-containing sealants.

Actinic radiation can be used to initiate free radical polymerization mechanisms. Free radical polymerization can proceed via the absorption by a photoinitiator of actinic radiation such as ultraviolet (UV) light to generate free radicals, which react with double bonds to cause chain reaction and polymerization. For example, in a thiol/ene reaction, a free radical generated by the photoinitiator abstracts a hydrogen from a thiol group creating a thienyl radical that can add to an alkylene group or an alkynyl group, creating a sulfur-carbon bond and a β-carbon radical, which initiates chain propagation.

Cationic polymerization proceeds the absorption of a photoinitiator of actinic radiation to generate a Lewis acid which reacts with functional groups such as epoxy groups resulting in polymerization.

In free radical e-beam curing; electrons open double bonds initiating polymerization, and in cationic e-beam curing electrons decompose photoinitiator to form an acid.

Energy curable chemistries include reactions through double bonds including groups such as acryloyl groups (R—O—C(=O)—CH=CH$_2$), methacryloyl groups (R—O—C(=O)—C(—CH$_3$)=CH$_2$), allyl groups (R—CH=CHR), alkenyl groups (R—CH$_2$—CH=CH$_2$), and alkynyl groups (R—CH$_2$—C≡CH).

An overlying sealant can comprise a polythiol and a polyalkenyl and/or a polyalkynyl. The polythiol, polyalkenyl, and polyalkynyl can independently comprise a monomer, an oligomer, a prepolymer, or a combination of any of the foregoing.

For example, a polythiol can comprise a thiol-terminated sulfur-containing prepolymer and the polyalkenyl and/or polyalkynyl can comprise a monomer.

A thiol-terminated sulfur-containing prepolymer can comprise a thiol-terminated polythioether, a thiol-terminated polysulfide, a thiol-terminated sulfur-containing polyformal prepolymer, a thiol-terminated monosulfide, or a combination of any of the foregoing.

Examples of free radical polymerizable sulfur-containing sealant compositions are disclosed, for example, in U.S. Application Publication No. 2015/0086726, and U.S. Pat. No. 10,280,348.

Free radical polymerizable sealant compositions can comprise a polythiol or combination of polythiols. A polythiol can be a polythiol prepolymer, a small molecule polythiol, a thiol-terminated polyfunctionalizing agent, or a combination of any of the foregoing.

A polythiol prepolymer can comprise, for example, any suitable thiol-terminated prepolymer.

A polythiol prepolymer can comprise, for example, a thiol-terminated sulfur-containing prepolymer.

Free radical polymerizable sealant compositions can comprise a thiol-terminated sulfur-containing prepolymer such as a thiol-terminated polythioether prepolymer, a thiol-terminated polysulfide prepolymer, a thiol-terminated sulfur-containing polyformal prepolymer, a thiol-terminated monosulfide prepolymer, or a combination of any of the foregoing. A sulfur-containing prepolymer refers to a prepolymer that has one or more thioether —S$_n$— groups, where n can be, for example, 1 to 6, in the backbone of the prepolymer. Prepolymers that contain only thiol or other sulfur-containing groups either as terminal groups or as pendent groups of the prepolymer are not intended to be encompassed by sulfur-containing prepolymers. The prepolymer backbone refers to the portion of the prepolymer having repeating segments. Thus, a prepolymer having the structure HS—R—R(—CH$_2$—SH)—[—R—(CH$_2$)$_2$—S(O)$_2$—(CH$_2$)—S(O)$_2$]$_n$—CH=CH$_2$ where each R is a moiety that does not contain a thioether, is not encompassed by a sulfur-containing prepolymer. A prepolymer having the structure HS—R—R(—CH$_2$—SH)—[—R—(CH$_2$)$_2$—S(O)$_2$—(CH$_2$)—S(O)$_2$]—CH=CH$_2$ where at least one R is a moiety that contains a thioether group, is encompassed by a sulfur-containing prepolymer.

A thiol-terminated sulfur-containing prepolymer can comprise a thiol-terminated sulfur-containing prepolymer or a combination of thiol-terminated sulfur-containing prepolymers. The thiol-terminated sulfur-containing prepolymers may have the same or different functionality. A thiol-terminated sulfur-containing prepolymer can have an average functionality, for example, from 2 to 6, from 2 to 4, from 2 to 3, from 2.3 to 2.8, or from 2.05 to 2.5. For example, a thiol-terminated sulfur-containing prepolymer can comprise a difunctional thiol-terminated sulfur-containing prepolymer, a trifunctional thiol-terminated sulfur-containing prepolymer, or a combination thereof.

Free radical polymerizable sealant compositions can comprise, for example, from 40 wt % to 80 wt %, from 40 wt % to 75 wt %, from 45 wt % to 70 wt %, or from 50 wt % to 70 wt % of a thiol-terminated sulfur-containing prepolymer or combination of thiol-terminated sulfur-containing prepolymers, such as a thiol-terminated polythioether prepolymer, a thiol-terminated polysulfide prepolymer, a thiol-terminated sulfur-containing polyformal prepolymer, a thiol-terminated monosulfide prepolymer, or a combination of any of the foregoing, where wt % is based on the total weight of the sealant composition.

A sulfur-containing prepolymer can comprise a thiol-terminated polythioether prepolymer or combinations of thiol-terminated polythioether prepolymers. Examples of suitable thiol-terminated polythioether prepolymers are disclosed, for example, in U.S. Pat. No. 6,172,179. A thiol-terminated polythioether prepolymer can comprise Permapol® P3.1E, Permapol® P3.1E-2.8, Permapol® L56086, or a combination of any of the foregoing, each of which is available from PPG Aerospace. These Permapol® products are encompassed by the thiol-terminated polythioether prepolymers of Formula (3)-(3c). Thiol-terminated polythioethers include prepolymers described in U.S. Pat. No. 7,390,859, and urethane-containing polythiols described in U.S. Application Publication Nos. 2017/0369757 and 2016/0090507.

A thiol-terminated polythioether prepolymer can comprise a thiol-terminated polythioether prepolymer comprising at least one moiety having the structure of Formula (3):

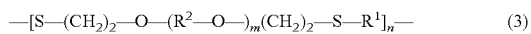

where,
each $R^1$ can independently be selected from $C_{2-10}$ n-alkanediyl, $C_{3-6}$ branched alkanediyl, $C_{6-8}$ cycloalkanediyl, $C_{6-10}$ alkanecycloalkanediyl, and $-[(CHR^3)_p-X-]_q(CHR^3)_r-$, wherein each $R^3$ can be selected from hydrogen and methyl;
each $R^2$ can independently be selected from $C_{2-10}$ n-alkanediyl, $C_{3-6}$ branched alkanediyl, $C_{6-8}$ cycloalkanediyl, $C_{6-14}$ alkanecycloalkanediyl, and $-[(CH_2)_p-X-]_q(CH_2)_r-$;
each X can independently be selected from O, S, and NR, wherein R can be selected from hydrogen and methyl;
m ranges from 0 to 50;
n can be an integer ranging from 1 to 60;
p can be an integer ranging from 2 to 6;
q can be an integer ranging from 1 to 5; and
r can be an integer ranging from 2 to 10.

Free radical polymerizable sealants can comprise a polyalkenyl or a combination of polyalkenyls.

Suitable polyalkenyls can comprise two or more polythiols groups. For example, a polyalkenyl can have an alkenyl functionality from 2 to 10, from 2 to 8, from 2 to 6, or from 2 to 4. Polyalkenyls can have an alkenyl functionality greater than 2, greater than 4, greater than 6, or greater than 8.

Suitable polyalkenyls can have a molecular weight or a number average molecular weight, for example, from 150 Da to 2,000 Da, from 200 Da to 1,500 Da, from 300 Da to 1,000 Da, or from 400 Da to 800 Da. Polyalkenyls can have a molecular weight, for example, less than 2,000 Da, less than 1,500 Da, less than 1,000 Da, less than 800 Da, less than 700 Da, less than 600 Da, or less than 500 Da. A polyalkenyl can have a molecular weight, for example, greater than 2,000 Da, greater than 1,500 Da, greater than 1,000 Da, greater than 800 Da, greater than 700 Da, greater than 600 Da, greater than 500 Da, or greater than 150 Da.

A polyalkenyl can be a polyalkenyl prepolymer, a monomeric polyalkenyl, an oligomeric polyalkenyl, or a combination of any of the foregoing.

A polyalkenyl can have, for example, a sulfur content from 0 wt % to 50 wt %, from 5 wt % to 40 wt %, from 10 wt % to 40 wt % or from 20 wt % to 40 wt %, where wt % is based on the total weight of the polyalkenyl. A polyalkenyl can be selected such that when reacted with a polythiol, the product can have a sulfur content, for example, greater than 5 wt %, greater than 10 wt %, greater than 15 wt %, greater than 20 wt %, or greater than 25 wt %. For example, the product can have a sulfur content from 5 wt % to 50 wt %, from 10 wt % to 40 wt %, from 15 wt % to 30 wt %, or from 10 wt % to 20 wt %, where wt % is based on the total weight of the reaction product.

A poly alkenyl may or may not be a sulfur-containing poly alkenyl and contain sulfur atoms.

Examples of suitable polyalkenyl monomers include divinyl ethers such as divinyl ethers having the structure of Formula (30):

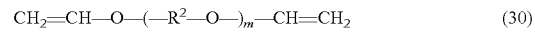

where m can be from 0 to 50 and $R^2$ in Formula (30) can be selected from $C_{2-6}$ n-alkanediyl, $C_{3-6}$ branched alkanediyl, $C_{6-8}$ cycloalkanediyl, $C_{6-10}$ alkanecycloalkanediyl, and $-[-(CH_2)_p-X-]_q-(CH_2)_r-$, where p can be an integer ranging from 2 to 6, q can be an integer from 1 to 5, r can be an integer from 2 to 10, and X can be O or S. In a divinyl ether of Formula (30), $R^2$ can be, for example, $C_{2-6}$ n-alkanediyl, $C_{3-6}$ branched alkanediyl, $C_{6-8}$ cycloalkanediyl, $C_{6-10}$ alkanecycloalkanediyl, $-[(CH_2)_p-O-]_q-(CH_2)_r-$, or $-[(CH_2)_p-S-]_q-(CH_2)_r-$.

In divinyl ethers of Formula (30), m can be an integer from 0 to 50, such as an integer from 1 to 6, from 1 to 4, or from 1 to 3.

In divinyl ethers of Formula (30), m can be 1, 2, 3, 4, 5, or 6.

In divinyl ethers of Formula (30), each $R^2$ can independently be $C_{2-6}$ alkanediyl such as 1,2-ethane-diyl, 1,3-propane-diyl, 1,4-butane-diyl, 1,5-pentane-diyl, or 1,6-hexanediyl.

In divinyl ethers of Formula (30), each $R^2$ can be $-[-(CH_2)_p-X-]_q-(CH_2)_r-$.

In divinyl ethers of Formula (30), each $R^2$ can be $-[-(CH_2)_p-X-]_q-(CH_2)_r-$, where each p can be 2, each r can be 2, and q can be 1, 2, 3, 4, or 5.

Suitable divinyl ethers include, for example, compounds having at least one oxyalkanediyl group, such as from 1 to 4 oxyalkanediyl groups, i.e., compounds in which m in Formula (30) can be an integer ranging from 1 to 4. In a divinyl ether of Formula (30), m can be an integer ranging from 2 to 4. It is also possible to employ commercially available divinyl ether mixtures that are characterized by a non-integral average value for the number of oxyalkanediyl units per molecule. Thus, m in Formula (30) can also be a rational number from 0 to 10.0, such as from 1.0 to 10.0, from 1.0 to 4.0, or from 2.0 to 4.0, such as 2.5, which represents an average functionality.

Examples of suitable vinyl ethers include, divinyl ether, ethylene glycol divinyl ether (EG-DVE) ($R^2$ in Formula (30) is ethanediyl and m is 1), butanediol divinyl ether (BD-DVE) ($R^2$ in Formula (30) is butanediyl and m is 1), hexanediol divinyl ether (HD-DVE) ($R^2$ in Formula (30) is hexanediyl and m is 1), diethylene glycol divinyl ether (DEG-DVE; $R^2$ in Formula (30) is ethanediyl and m is 2), triethylene glycol divinyl ether (TEG-DVE; $R^2$ in Formula (30) is ethanediyl and m is 3), tetraethylene glycol divinyl ether ($R^2$ in Formula (30) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendent groups selected from alkyl groups, hydroxyl groups, alkoxy groups, and amine groups.

Divinyl ethers in which $R^2$ in Formula (30) is $C_{3-6}$ branched alkanediyl may be prepared by reacting a polyhydroxyl compound with acetylene. Examples of branched divinyl ethers include compounds in which $R^2$ in Formula (30) is an alkyl-substituted methanediyl group such as —CH(—CH$_3$)—, for which $R^2$ in Formula (30) is ethanediyl and m is 3 or an alkyl-substituted ethanediyl.

Other useful divinyl ethers include compounds in which $R^2$ in Formula (30) is polytetrahydrofuryl (poly-THF) or polyoxyalkanediyl, such as those having an average of about 3 monomer units.

A polyalkenyl can have the structure of Formula (1c):

B(—V)$_z$ (1c)

wherein,
B comprises a core of a z-valent polyfunctionalizing agent B(—V)$_z$;
z is an integer from 3 to 6; and
each —V is independently a moiety comprising a terminal alkenyl group.

In polyalkenyls of Formula (1c), z can be, for example, 3, 4, 5, or 6.

A polyalkenyl of Formula (1c) can be trifunctional, that is, compounds where z is 3. Suitable trifunctionalizing polyalkenyls include, for example, triallyl cyanurate (TAC), and trimethylolpropane trivinyl ether. Combinations of polyalkenyl compounds may also be used.

Examples of suitable polyalkenyl monomers having an alkenyl functionality greater than two include, for example, triallyl cyanurate (TAC), triallyl isocyanurate (TAIC), trimethylolpropane trivinyl ether, 2,4,6-triallyloxy-1,3,5-triazine, 1,3,5-triacryloylhexahydro-1,3,5-triazine, and tris[2-(acryloyloxy)ethyl] isocyanurate.

A divinyl ether can comprise a sulfur-containing bis (alkenyl) ether. An example of a suitable sulfur-containing divinyl ether is allyl sulfide.

A sulfur-containing bis(alkenyl) ether can have the structure of Formula (31):

—(CH$_2$)$_n$O—
    CH═CH$_2$ (31)

wherein,
each n is independently an integer from 1 to 4;
each Y' is independently selected from —O— and —S—; and $R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and —X—]$_q$—(CH$_2$)$_r$—, wherein,
each X is independently selected from —O—, —S—, and —S—S—;
p is an integer from 2 to 6;
q is an integer from 1 to 5; and
r is an integer from 2 to 6; and
at least one Y' is —S—, or $R^4$ is —[—(CH$_2$)$_p$—X—]$_q$—(CH$_2$)$_r$— and at least one X is —S— or —S—S—.

In sulfur-containing bis(alkenyl) ethers of Formula (31), each n can be 1, 2, 3, or 4.

In sulfur-containing bis(alkenyl) ethers of Formula (31), each Y' can be —O— or each Y' can be —S—.

In sulfur-containing bis(alkenyl) ethers of Formula (31), $R^4$ can be $C_{2-6}$ n-alkanediyl, such as ethane-diyl, n-propane-diyl, n-butane-diyl, n-pentane-diyl, or n-hexanediyl.

In sulfur-containing bis(alkenyl) ethers of Formula (31), $R^4$ can be $C_{2-6}$ n-alkanediyl; both Y' can be —S— or one Y' can be —S— and the other Y' can be —O—.

In sulfur-containing bis(alkenyl) ethers of Formula (31), $R^4$ can be —[—(CH$_2$)$_p$—X—]$_q$—(CH$_2$)$_r$—.

In sulfur-containing bis(alkenyl) ethers of Formula (31), $R^4$ can be —[—(CH$_2$)$_p$—X—]$_q$—(CH$_2$)$_r$—, where each X can be —O— or each X can be —S—S— or at least one X can be —O— or at least one X can be —S—S—.

In sulfur-containing bis(alkenyl) ethers of Formula (31), $R^4$ can be —[—(CH$_2$)$_p$—X—]$_q$—(CH$_2$)$_r$—, where each X can be —S— or at least one X can be —S—.

In sulfur-containing bis(alkenyl) ethers of Formula (31), $R^4$ can be —[—(CH$_2$)$_p$—X—]$_q$—(CH$_2$)$_r$—, where each p can be 2 and r can be 2.

In sulfur-containing bis(alkenyl) ethers of Formula (31), $R^4$ can be —[—(CH$_2$)$_p$—X—]$_q$—(CH$_2$)$_r$—, where q can be 1, 2, 3, 4, or 5.

In sulfur-containing bis(alkenyl) ethers of Formula (31), $R^4$ can be —[—(CH$_2$)$_p$—X—]$_q$—(CH$_2$)$_r$—, where each p can be 2, r can be 2, and q can be 1, 2, 3, 4, or 5.

In sulfur-containing bis(alkenyl) ethers of Formula (31), $R^4$ can be —[—(CH$_2$)$_p$—X—]$_q$—(CH$_2$)$_r$—, where each X can be —S—; each p can be 2, r can be 2, and q can be 1, 2, 3, 4, or 5.

In sulfur-containing bis(alkenyl) ethers of Formula (31), $R^4$ can be —[—(CH$_2$)$_p$—X—]$_q$—(CH$_2$)$_r$—, where each X can be —O—; each p can be 2, r can be 2, and q can be 1, 2, 3, 4, or 5.

In sulfur-containing bis(alkenyl) ethers of Formula (31), $R^4$ can be —[—(CH$_2$)$_p$—X—]$_q$—(CH$_2$)$_r$—, where each X can be —O—; and each Y' can be —S—.

In sulfur-containing bis(alkenyl) ethers of Formula (31), $R^4$ can be —[—(CH$_2$)$_p$—X—]$_q$—(CH$_2$)$_r$—, where each X can be —S—; and each Y' can be —O—.

In sulfur-containing bis(alkenyl) ethers of Formula (31), each n can be 2, each Y' can be independently selected from —O— and —S—, and $R^4$ can be —[—(CH$_2$)$_p$—X—]$_q$—(CH$_2$)$_r$—, where each X can be independently selected from —O—, —S—, and —S—S—, p can be 2, q can be selected from 1 and 2, and r can be 2.

In sulfur-containing bis(alkenyl) ethers of Formula (31), each n can be 2, each Y' can be independently selected from —O— and —S—, and $R^4$ can be $C_{2-4}$ alkanediyl, such as ethanediyl, n-propanediyl, or n-butanediyl.

Sulfur-containing bis(alkenyl) ethers can comprise sulfur-containing bis(alkenyl) ethers of Formula (31a), Formula (31b), Formula (31c), Formula (31d), Formula (31e), Formula (31f), Formula (31g), Formula (31h), or a combination of any of the foregoing:

$$CH_2=CH-O-(CH_2)_2-S-(-(CH_2)_2-O-)_2-(CH_2)_2-S-(CH_2)_2-O-CH=CH_2 \quad (31a)$$

$$CH_2=CH-O-(CH_2)_2-S-(CH_2)_2-S-(CH_2)_2-S-(CH_2)_2-O-CH=CH_2 \quad (31b)$$

$$CH_2=CH-O-(CH_2)_2-S-(CH_2)_2-O-(CH_2)_2-S-(CH_2)_2-O-CH=CH_2 \quad (31d)$$

$$CH_2=CH-O-(CH_2)_2-S-(CH_2)_2-S-(CH_2)_2-O-CH=CH_2 \quad (31d)$$

$$CH_2=CH-O-(CH_2)_2-S-(CH_2)_2-O-(CH_2)_2-O-CH=CH_2 \quad (31e)$$

$$CH_2=CH-O-(CH_2)_2-O-(CH_2)_2-S-(CH_2)_2-O-(CH_2)_2-O-CH=CH_2 \quad (31f)$$

$$CH_2=CH-O-(CH_2)_2-O-(CH_2)_2-S-(CH_2)_2-S-(CH_2)_2-O-(CH_2)_2-O-CH=CH_2 \quad (31g)$$

$$CH_2=CH-O-(CH_2)_2-O-(CH_2)_2-S-S-(CH_2)_2-O-(CH_2)_2-O-CH=CH_2 \quad (31h)$$

Examples of suitable sulfur-containing bis(alkenyl) ethers include 3,9,12,18-tetraoxa-6,15-dithiaicosa-1,19-diene, 3,6,15,18-tetraoxa-9,12-dithiaicosa-1,19-diene, 3,15-dioxa-6,9,12-trithiaheptadeca-1,16-diene, 3,9,15-trioxa-6,12-dithiaheptadeca-1,16-diene, 3,6,12,15-tetraoxa-9-thiaheptadeca-1,16-diene, 3,12-dioxa-6,9-dithiatetradeca-1,13-diene, 3,6,12-trioxa-9-thiatetradeca-1,13-diene, 3,6,13,16-tetraoxa-9,10-dithiaoctadeca-1,17-diene, and combinations of any of the foregoing.

Sulfur-containing bis(alkenyl) ethers can be prepared by reacting a dithiol, a diol, or a compound comprising both terminal thiol and hydroxyl groups with a chlorovinyl ether.

For example, a sulfur-containing bis(alkenyl) ether can comprise reaction products of reactants comprising:
(a) a compound of Formula (32):

$$Y-R^4-Y \quad (32)$$

wherein,
each Y is independently selected from —OH and —SH;
$R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and $-[-(CH_2)_p-X-]_q-(CH_2)_r-$, wherein,
each X is independently selected from —O—, —S—, and —S—S—;
each p is independently an integer from 2 to 6;
q is an integer from 1 to 5; and
r is an integer from 2 to 6; and
at least one Y is —SH, or $R^4$ is $-[-(CH_2)_p-X-]_q-(CH_2)_r-$ and at least one X is —S—; and
(b) a compound having the structure of Formula (33):

$$CH_2=CH-O-(CH_2)_t-Cl \quad (33)$$

wherein t is an integer from 1 to 6.

Compounds of Formula (32) can be dithiols in which each Y is —SH

Compounds of Formula (32) can be diols in which each Y is —OH

In compounds of Formula (32), one Y can be —SH and the other Y can be —OH.

In compounds of Formula (32), $R^4$ can be $C_{2-6}$ n-alkanediyl, such as ethane-diyl, n-propane-diyl, n-butane-diyl, n-pentane-diyl, or n-hexanediyl.

In compounds of Formula (32), $R^4$ can be $-[-(CH_2)_p-X-]_q-(CH_2)_r-$.

In compounds of Formula (32), $R^4$ can be $-[-(CH_2)_p-X-]_q-(CH_2)_r-$, where each X can be —O— or each X can be —S—S—.

In compounds of Formula (32), $R^4$ can be $-[-(CH_2)_p-X-]_q-(CH_2)_r-$, where each X can be —S—.

In compounds of Formula (32), $R^4$ can be $-[-(CH_2)_p-X-]_q-(CH_2)_r-$, where each p can be 2 and r can be 2.

In compounds of Formula (32), $R^4$ can be $-[-(CH_2)_p-X-]_q-(CH_2)_r-$, where q can be 1, 2, 3, 4, or 5.

In compounds of Formula (32), $R^4$ can be $-[-(CH_2)_p-X-]_q-(CH_2)_r-$, where each p can be 2 and r can be 2; and q can be 1, 2, 3, 4, or 5.

In compounds of Formula (32), $R^4$ can be $-[-(CH_2)_p-X-]_q-(CH_2)_r-$, where each X can be —S—; each p can be 2, r can be 2, and q can be 1, 2, 3, 4, or 5.

In compounds of Formula (32), $R^4$ can be $-[-(CH_2)_p-X-]_q-(CH_2)_r-$, where each X can be —O—; each p can be 2, r can be 2, and q can be 1, 2, 3, 4, or 5.

In compounds of Formula (32), $R^4$ can be $-[-(CH_2)_p-X-]_q-(CH_2)_r-$, at least one X can be —O— and at least one X can be —S—.

A compound of Formula (32) can comprise dimercaptodioxaoctane (DMDO), dimercaptodiethylsulfide (DMDS), 2,2-thiodiethanethiol, 2-mercaptoethyl ether, 1,2-ethanedithiol, mercaptoethanol, thiodiglycol, 3,6-dithia-1,8-octanediol, 2-hydroxyethyldisulfide, or a combination of any of the foregoing.

A compound of Formula (32) can comprise a compound of Formula (32a), Formula (32b), Formula (32c), Formula (32d), Formula (32e), Formula (32f), Formula (32g), Formula (32h), or a combination of any of the foregoing:

$$HS-(CH_2)_2-O-(CH_2)_2-O-(CH_2)_2-SH \quad (32a)$$

$$HS-(CH_2)_2-S-(CH_2)_2-SH \quad (32b)$$

$$HS-(CH_2)_2-O-(CH_2)_2-SH \quad (32C)$$

$$HS-(CH_2)_2-SH \quad (32d)$$

$$HS-(CH_2)_2-OH \quad (32e)$$

$$HO-(CH_2)_2-S-(CH_2)_2-OH \quad (32f)$$

$$HO-(CH_2)_2-S-(CH_2)_2-S-(CH_2)_2-OH \quad (32g)$$

$$HO-(CH_2)_2-S-S-(CH_2)_2-OH \quad (32h)$$

In chlorovinyl ethers of Formula (33), t can be 1, 2, 3, 4, 5, or 6. For example, a chlorovinyl ether of Formula (33) can comprise (chloromethoxy)ethane, (2-chloroethoxy) ethane, 1-chloro-3-(vinyloxy)propane, 1-chloro-4-(vinyloxy)butane, 1-chloro-5-(vinyloxy)pentane, 1-chloro-6-(vinyloxy)hexane, or a combination of any of the foregoing.

Sulfur-containing bis(alkenyl) ethers can be prepared by reacting a dithiol, a diol, or a compound comprising both terminal thiol and hydroxyl groups with a chlorovinyl ether in the presence of a catalyst such as potassium hydroxide at an elevated temperature such as 80° C.

Sulfur-containing bis(alkenyl) ethers of Formula (31) are difunctional. Sulfur-containing alkenyl ethers provided by the present disclosure can also include sulfur-containing polyalkenyl ethers having a functionality greater than two, such as a functionality from 3 to 6.

For example, a sulfur-containing poly(alkenyl) ether can have the structure of Formula (1d):

$$B(-V)_z \quad (1d)$$

wherein,

B comprises a core of a z-valent polyfunctionalizing agent $B(-V)_z$;

z is an integer from 3 to 6; and each —V is a moiety comprising a sulfur-containing alkenyl ether moiety having a terminal alkenyl group.

A sulfur-containing multifunctional(alkenyl) ether can be derived from a sulfur-containing bis(alkenyl) ether of Formula (31), by reacting a sulfur-containing bis(alkenyl) ether of Formula (31) with a polyfunctionalizing agent of Formula (1d), where the polyfunctionalizing agent of Formula (1d) comprises terminal groups reactive with alkenyl groups such as thiol groups.

For example, a polyfunctional sulfur-containing poly(alkenyl) ether can have the structure of Formula (34):

$$\{CH_2=CH-O-(CH_2)_2-Y'-R^4-Y'-(CH_2)_n-O-(CH_2)_2-V'-\}_z B \quad (34)$$

where n, Y', and $R^4$ are defined as in Formula (31), z and B are defined as in Formula (1), and —V'— can be derived from the reaction of —V with an alkenyl group.

In sulfur-containing multifunctional (alkenyl) ethers of Formula (34), $B(-V)_z$ can be a polythiol such as any of those disclosed herein, such as 1,2,3-propane trithiol and isocyanurate-containing trithiols.

Sulfur-containing multifunctional (alkenyl) ethers of Formula (34) can be prepared by reacting a sulfur-containing bis(alkenyl) ether of Formula (31) with a thiol-terminated polyfunctionalizing agent $B(-V)_z$ of Formula (1d) in the presence of a suitable catalyst such as an amine catalyst.

Multifunctional sulfur-containing (alkenyl) ethers can be used to prepare multifunctional sulfur-containing (alkenyl) ether-containing polythioether prepolymers provided by the present disclosure. For example, the reactants can include sulfur-containing multifunctional (alkenyl) ethers as part of the alkenyl component. Sulfur-containing multifunctional (alkenyl) ethers can be the only polyfunctional reactant having a functionality greater than 2 or may be used in combination with an alkenyl-terminated polyfunctionalizing agent such as triallyl cyanurate or triallylisocyanurate.

Similarly, multifunctional polyalkenyl ethers can have the structure of Formula (35):

$$\{CH_2=CH-O-(-R^2-O-)_m-(CH_2)_2-V'-\}_z B \quad (35)$$

where m, z, $R^2$, and B are defined as in Formula (30) and Formula (1), and V' is derived from the reaction of an alkenyl group an V.

A polyalkenyl can have an alkenyl functionality greater than 2, such as 3, 4, 5, or 6. Examples of suitable polyalkenyls include 1,3,5-triallyl-1,3,5-triazine-2,4,6(1H,3H,5H)-trione, and triallyl cyanurate (2,4,6-triallyloxy-1,3,5-triazine).

Polythioethers comprising a moiety derived from a sulfur-containing polyalkenyl ether and methods of preparing polythioether prepolymers are disclosed, for example, in PCT International Publication No. WO 2018/085650.

Free radical polymerizable sealants can comprise a polyalkynyl or a combination of polyalkynyls.

Suitable polyalkynyl can comprise two or more alkynyl groups. For example, a polyalkynyl can have an alkynyl functionality from 2 to 10, from 2 to 8, from 2 to 6, or from 2 to 4. A polyalkynyl can have an alkynyl functionality greater than 2, greater than 4, greater than 6, or greater than 8.

Suitable polyalkynyls can have a molecular weight or a number average molecular weight, for example, from 150 Da to 2,000 Da, from 200 Da to 1,500 Da, from 300 Da to 1,000 Da, or from 400 Da to 800 Da. Polyalkynyls can have a molecular weight, for example, less than 2,000 Da, less than 1,500 Da, less than 1,000 Da, less than 800 Da, less than 700 Da, less than 600 Da, or less than 500 Da. A polyalkynyl can have a molecular weight, for example, greater than 2,000 Da, greater than 1,500 Da, greater than 1,000 Da, greater than 800 Da, greater than 700 Da, greater than 600 Da, greater than 500 Da, or greater than 150 Da.

Polyalkynyls can be polyalkynyl prepolymers, monomeric polyalkynyls, oligomeric polyalkynyls, or a combination of any of the foregoing.

Polyalkynyls may or may not be a sulfur-containing polyalkynyls, which include sulfur atoms.

Examples of suitable polyalkynyls include 1,7-octadiyne, 1,6-heptadiyne, 1,4-diethynylbenzene, 1,4-diethynylbenzene, 1,8-decadiyne, ethylene glycol 1,2-bis(2-propynyl) ether, and combinations of any of the foregoing.

Sealants can include a free radical initiator or combination of free radical initiators.

Sealants provided by the present disclosure are polymerizable by free-radical mechanisms.

Sealants can comprise a free radical initiator such as, for example, a radiation-activated free radical initiator, a thermally-activated free radical initiator, a chemically-activated free radically initiator, or a combination of any of the foregoing. A free radical initiator can be activated by exposure to radiation, heat, or at ambient conditions (25° C./50% RH) without exposing the composition to electromagnetic or thermal energy.

A sealant can include, for example, both a radiation-activated free radical initiator and a chemically-activated free radical initiator. In such compositions, all or a portion of the sealant can be exposed to radiation to at least partially cure the sealant, and chemically-activated free radicals can complete or fully cure the adhesion-promoting composition.

Sealants can include a radiation-activated free radical initiator or combination of radiation-activated free radical initiators.

A radiation-activated free radical initiator can generate free radicals upon exposure to actinic radiation.

Actinic radiation includes α-rays, γ-rays, X-rays, ultraviolet (UV) light (200 nm to 400 nm) including UV-A (320 nm to 400 nm), UV-B (280 nm to 320 nm), and UV-C (200 nm to 280 nm), visible light (400 nm to 770 nm), blue light (450 nm to 490 nm), infrared (>700 nm), near-infrared (0.75 μm to 1.4 μm), or an electron beam. For example, a radiation-activated free radical initiator can be a photoinitiator such as a visible photoinitiator or a UV photoinitiator.

The free radical photopolymerization reaction can be initiated by exposing a sealant to actinic radiation such as UV radiation, for example, for less than 180 seconds, less than 120 seconds, less than 90 seconds, less than 60 seconds, less than 30 seconds, less than 15 seconds, or less than 5 seconds.

The free radical photopolymerization reaction can be initiated by exposing a sealant to actinic radiation such as UV radiation, for example, for from 5 seconds to 180 seconds, from 5 seconds to 120 seconds, from 10 seconds to 90 seconds, from 15 seconds to 60 seconds, or from 20 seconds to 40 seconds.

The UV radiation can include radiation at a wavelength of 394 nm.

The total power of the UV exposure can be, for example, from 50 mW/cm² to 500 mW/cm², from 50 mW/cm² to 400 mW/cm², from 50 mW/cm² to 300 mW/cm², from 100 mW/cm² to 300 mW/cm², or from 150 mW/cm² to 250 mW/cm².

Actinic radiation-curable sealants can be exposed to a UV dose, for example from 1 J/cm² to 4 J/cm² to cure the composition. The UV source can be an 8 W lamp with a UVA spectrum. Other doses and/or other UV sources can be used. A UV dose for curing a sealant composition can be, for example, from 0.5 J/cm² to 4 J/cm², from 0.5 J/cm² to 3 J/cm², from 1 J/cm² to 2 J/cm², or from 1 J/cm² to 1.5 J/cm².

Actinic radiation-curable sealants can also be cured with radiation at blue wavelength ranges such as using a light-emitting diode.

Actinic radiation-curable sealants can be substantially transmissive to actinic radiation, partially transmissive to actinic radiation, or substantially opaque to actinic radiation.

Actinic radiation-curable sealants can comprise a photopolymerization initiator or a combination of photopolymerization initiators.

A photopolymerization initiator can comprise a free radical photoinitiator, a cationic photoinitiator, a photolatent base generator, a photolatent metal catalyst, or a combination of any of the foregoing. Exposure of the photopolymerization initiator to suitable actinic radiation can activate the polymerization initiator, for example, by generating free radicals, producing cations, producing Lewis acids, or releasing activated catalysts.

Suitable photoinitiators include, for example, aromatic ketones and synergistic amines, alkyl benzoin ethers, thioxanthones and derivatives, benzyl ketals, acylphosphine oxide, ketoxime ester or α-acyloxime esters, cationic quaternary ammonium salts, acetophenone derivatives, and combinations of any of the foregoing.

Examples of suitable UV photoinitiators include α-hydroxyketones, benzophenone, α,α-diethoxyacetophenone, 4,4-diethylaminobenzophenone, 2,2-dimethoxy-2-phenylacetophenone, 4-isopropylphenyl 2-hydroxy-2-propyl ketone, 1-hydroxycyclohexyl phenyl ketone, isoamyl p-dimethylaminobenzoate, methyl 4-dimethylaminobenzoate, methyl O-benzoylbenzoate, benzoin, benzoin ethyl ether, benzoin isopropyl ether, benzoin isobutyl ether, 2-hydroxy-2-methyl-1-phenylpropan-1-one, 2-isopropylthioxanthone, dibenzosuberone, 2,4,6-trimethylbenzoyldiphenylphosphine oxide, and bisacyclophosphine oxide.

Examples of suitable benzophenone photoinitiators include 2-hydroxy-2-methyl-1-phenyl-1-propanone, 2-hydroxy-1,4,4-(2-hydroxyethoxy)phenyl]-2-methyl-1-propanone, α-dimethoxy-α-phenylacetophenone, 2-benzyl-2-(dimethylamino)-1-[4-(4-morpholinyl) phenyl]-1-butanone, and 2-methyl-1-[4-(methylthio)phenyl]-2-(4-morpholinyl)-1-propanone.

Examples of suitable oxime photoinitiators include (hydroxyimino)cyclohexane, 1-[4-(phenylthio)phenyl]-octane-1,2-dione-2-(0-benzoyloxime), 1-[9-ethyl-6-(2-methylbenzoyl)-9H-carbazol-3-yl]-ethanone-1-(O-acetyloxime), trichloromethyl-triazine derivatives), 4-(4-methoxystyryl)-2,6-trichloromethyl-1,3,5-triazinc), 4-(4-methoxyphenyl)-2,6-trichloromethyl-1,3,5-triazine, and 01-aminoketone (l-(4-morpholinophenyl)-2-dimethylamino-2-benzyl-butan-1-one).

Examples of suitable phosphine oxide photoinitiators include diphenyl (2,4,6-trimethylbenzoyl)-phosphine oxide (TPO) and phenylbis(2,4,6-trimethyl benzoyl) phosphine oxide (BAPO).

Other examples of suitable UV photoinitiators include the Irgacure® products from BASF or Ciba, such as Irgacure® 184, Irgacure® 500, Irgacure® 1173, Irgacure® 2959, Irgacure® 745, Irgacure®651, Irgacure® 369, Irgacure® 907, Irgacure® 1000, Irgacure® 1300, Irgacure® 819, Irgacure® 819DW, Irgacure® 2022, Irgacure® 2100, Irgacure® 784, Irgacure® 250; Irgacure® MBF, Darocur® 1173, Darocur® TPO, Darocur® 4265, and combinations of any of the foregoing.

A UV photoinitiator can comprise, for example, 2,2-dimethoxy-1,2-diphenylethan-1-one (Irgacure® 651, Ciba Specialty Chemicals), 2,4,6-trimethylbenzoyl-diphenyl-phosphineoxide (Darocur® TPO, Ciba Specialty Chemicals), or a combination thereof.

Other examples of suitable photoinitiators include Darocur® TPO (available from Ciba Specialty Chemicals), Fucirin® TPO (available from BASF), Speedcure® TPO (available from Fambson), Irgacure® TPO (available from Ciba Specialty Chemicals, and Omnirad® (available from IGM Resins), and combinations of any of the foregoing.

A photopolymerization initiator can comprise a cationic photoinitiator or a combination of cationic photoinitiators.

Examples of suitable cationic photoinitiators include hexafluoroantimonates, sulfonium salts, perfluorobutane sulfonates, and iodium salts.

Sealants can comprise one or more free radial initiators such as thermally-activated free radical initiators. A thermally-activated free radical initiator can become active at elevated temperature, such as at a temperature greater than 25° C.

Examples of suitable thermally-activated free radical initiators include organic peroxy compounds, azobis(organonitrile) compounds, N-acyloxyamine compounds, O-iminoisourea compounds, and combinations of any of the foregoing. Examples of suitable organic peroxy compounds, that may be used as thermal polymerization initiators include peroxymonocarbonate esters, such as tertiarybutylperoxy 2-ethylhexyl carbonate and tertiarybutylperoxy isopropyl carbonate; peroxyketals, such as 1,1-di-(tert-butyl peroxy)-3,3,5-trimethylcyclohexane; peroxydicarbonate esters, such as di(2-ethylhexyl)peroxydicarbonate, di(secondary butyl)peroxydicarbonate and diisopropylperoxydicarbonate; diacyperoxides such as 2,4-dichlorobenzoyl peroxide, isobutyryl peroxide, decanoyl peroxide, lauryl peroxide, propionyl peroxide, acetyl peroxide, benzoyl peroxide, and p-chlorobenzoyl peroxide; peroxyesters such as tert-butylperoxy pivalate, tert-butylperoxy octylate, and tot-butylperoxyisobutyrate; methylethylketone peroxide, acetylcyclohexane sulfonyl peroxide, and combinations of any of the foregoing. Other examples of suitable peroxy compounds include 2,5-dimethyl-2,5-di(2-ethylhexanoylperoxy)hexane, and/or 1,1-bis(tert-butylperoxy)-3,3,5-trimethylcyclohexane. Examples of suitable azobis(organonitrile) compounds that may be used as thermal polymerization initiators include azobis(isobutyronitrile), 2,2'-azobis(2-methyl-butanenitrile), and/or azobis(2/l-dimethylvaleronitrile). A thermally-activated free radical initiator can comprise 1-acetoxy-2,2,6,6-tetramethylpiperidine and/or 1,3-dicyclohexyl-O—(N-cyclohexylideneamino)-isourea.

Sealants can be exposed to actinic radiation for a sufficient time to fully or partially cure the surface of the sealant. The full depth of the composition can then cure with time via dark cure mechanisms, for example, in which free radicals are generated by chemical mechanisms. Providing a fully or partially cured surface can facilitate handling of the article comprising the sealant and can provide structural strength and integrity while the article is being fabricated and fully cures.

Sealants can comprise a chemically-activated free radical initiator or a combination of chemically-activated free radical initiators. Chemically-activated free radical initiators refer to compounds and complexes capable of generating free radicals without being activated by actinic radiation and/or by exposure to heat.

Chemically-activated free radical initiators can facilitate curing of portions of a sealant not exposed to actinic radiation and can effectively extend the depth of cure. For example, sealants can be at least partly curable upon exposure to actinic radiation and such compositions can include a photopolymerization initiator. The actinic radiation can be applied to at least a portion of a sealant. A sealant can be accessible to the actinic radiation and the portion of the sealant exposed to the actinic radiation can be cured to a certain surface depth and/or to a certain radiation does. A portion of a sealant may not be accessible or may be incompletely accessible to actinic radiation either because of absorption or scattering of the actinic radiation such that the sealant prevents the actinic radiation from interacting with the full thickness of the sealant.

Chemically-activated free radical initiators can also be included in sealants that are not curable upon exposure to actinic radiation. For example, an overlying layer of a sulfur-containing sealant may not be transmissive or may be only partially transmissive to actinic radiation such as UV radiation.

In dark cure mode, i.e., when actinic radiation such as UV radiation is not used to generate free radicals, chemically-activated free radical initiators provide an alternate radical initiation mechanism that takes place in absence of actinic radiation.

Examples of suitable chemically-activated free radical initiators include combinations of metal complexes and organic peroxides, trialkylborane complexes, and peroxide-amine redox initiators. Examples of suitable chemically-activated free radical initiators are disclosed, for example, in U.S. application Ser. No. 16/373,668 filed on Apr. 3, 2019, and in PCT International Publication No. WO 2018/227149.

In addition to free radical polymerizable compounds, a sealant composition can include, for example, filler, reactive diluents, rheology agents, plasticizers, antioxidants, thermal stabilizers, adhesion promoters, colorants, photochromic materials, and combinations of any of the foregoing.

Sealant compositions can comprise an adhesion promoter or combination of adhesion promoters.

Adhesion promoters can enhance the adhesion of a sealant to an underlying substrate such as a metal, composite, polymeric, or a ceramic surface, or to a coating such as a primer coating or other coating layer.

Adhesion promoters can enhance adhesion to filler and to other layers of a multilayer sealant.

An adhesion promoter can include a phenolic adhesion promoter, a combination of phenolic adhesion promoters, an organo-functional silane, a combination of organo-functional silanes, or a combination of any of the foregoing. An organo-functional alkoxysilane can be an amine-functional alkoxysilane. The organo group can be selected from, for example, a thiol group, an amine group, an epoxy group, an alkenyl group, an isocyanate group, or a Michael acceptor group.

A phenolic adhesion promoter can comprise a cooked phenolic resin, an un-cooked phenolic resin, or a combination thereof. Examples of suitable adhesion promoters include phenolic resins such as Methylon® phenolic resin, and organosilanes, such as epoxy-, mercapto- or amine-functional silanes, such as Silquest® organosilanes. A cooked phenolic resin refers to a phenolic resin that has been co-reacted with a monomer, oligomer, or prepolymer such as co-reacted with a polythiol.

Phenolic adhesion promoters can comprise the reaction product of a condensation reaction of a phenolic resin with one or more thiol-terminated polysulfides. Phenolic adhesion promoters can be thiol-terminated.

Examples of suitable phenolic resins include 2-(hydroxymethyl)phenol, (4-hydroxy-1,3-phenylene)dimethanol, (2-hydroxybenzene-1,3,4-triyl) trimethanol, 2-benzyl-6-(hydroxymethyl)phenol, (4-hydroxy-5-((2-hydroxy-5-(hydroxymethyl)cyclohexa-2,4-dien-1-yl)methyl)-1,3-phenylene)dimethanol, (4-hydroxy-5-((2-hydroxy-3,5-bis(hydroxymethyl)cyclohexa-2,4-dien-1-yl)methyl)-1,3-phenylene)dimethanol, and a combination of any of the foregoing.

Suitable phenolic resins can be synthesized by the base-catalyzed reaction of phenol with formaldehyde.

Phenolic adhesion promoters can comprise the reaction product of a condensation reaction of a Methylon® resin, a Varcum® resin, or a Durez® resin available from Durez Corporation with a thiol-terminated polysulfide such as a Thioplast® resin.

Examples of suitable Methylon® resins include Methylon® 75108 (allyl ether of methylol phenol, see U.S. Pat. No. 3,517,082) and Methylon® 75202.

Examples of suitable Varcum® resins include Varcum® 29101, Varcum® 29108, Varcum®29112, Varcum® 29116, Varcum® 29008, Varcum® 29202, Varcum® 29401, Varcum® 29159, Varcum® 29181, Varcum® 92600, Varcum® 94635, Varcum® 94879, and Varcum® 94917.

An example of a Durez® resin is Durez® 34071.

Sealant compositions can comprise an organo-functional alkoxysilane adhesion promoter such as an organo-functional alkoxysilane. An organo-functional alkoxysilane can comprise hydrolysable groups bonded to a silicon atom and at least one organofunctional group. An organo-functional alkoxysilane can have the structure $R^{12}$—$(CH_2)_n$—Si(—OR)$_{3-n}$R$_n$, where $R^{12}$ is an organo-functional group, n is 0, 1, or 2, and R is alkyl such as methyl or ethyl. Examples of organofunctional groups include epoxy, amine, (meth)acryloyl, or sulfide groups. An organo-functional alkoxysilane can be a dipodal alkoxysilane having two or more alkoxysilane groups, a functional dipodal alkoxysilane, a non-functional dipodal alkoxysilane or a combination of any of the foregoing. An organo-functional alkoxysilane can be a combination of a monoalkoxysilane and a dipodal alkoxysilane. For amine-functional alkoxysilanes, $R^{12}$ can be —$NH_2$, Examples of suitable amine-functional alkoxysilanes under the Silquest® tradename include Silquest® A-1100 (γ-aminopropyltriethoxysilane), Silquest® A-1108 (γ-aminopropylsilsesquioxane), Silquest® A-1110 (γ-aminopropyltrimethoxysilane), Silquest® 1120 (N-β-(aminoethyl)-γ-aminopropyltrimethoxysilane), Silquest® 1128 (benzylamino-silane), Silquest® A-1130 (triaminofunctional silane), Silquest® Y-11699 (bis-(γ-triethoxysilylpropyl)amine), Silquest® A-1170 (bis-(γ-trimethoxysilylpropyl)amine), Silquest® A-1387 (polyazamide), Silquest® Y-19139 (ethoxy based polyazamide), and Silquest® A-2120 (N-β-(aminoethyl)-γ-aminopropylmethyldimethoxysilane).

Suitable amine-functional alkoxysilanes are commercially available, for example, from Gelest Inc, from Dow Corning Corporation, and from Momentive.

Sealant compositions can comprise, for example, from 1 wt % to 16 wt % of an adhesion promoter, from 3 wt % to 14 wt %, from 5 wt % to 12 wt %, or from 7 wt % to 10 wt % of an adhesion promoter or combination of adhesion promoters, where wt % is based on the total weight of the composition.

Sealant compositions can comprise, for example, less than 16 wt % of an adhesion promoter, less than 14 wt %, less than 12 wt %, less than 10 wt %, less than 8 wt %, less than 6 wt %, less than 4 wt % or less than 2 wt % of an adhesion promoter or combination of adhesion promoters.

A sealant can comprise a filler or combination of filler. A filler can comprise, for example, inorganic filler, organic filler, low-density filler, conductive filler, or a combination of any of the foregoing.

A sealant can comprise an inorganic filler or combination of inorganic filler.

An inorganic filler can be included to provide mechanical reinforcement and to control the rheological properties of the composition. Inorganic filler may be added to compositions to impart desirable physical properties such as, for example, to increase the impact strength, to control the viscosity, or to modify the electrical properties of a cured composition.

Inorganic filler useful in sealant compositions include carbon black, calcium carbonate, precipitated calcium carbonate, calcium hydroxide, hydrated alumina (aluminum hydroxide), talc, mica, titanium dioxide, alumina silicate, carbonates, chalk, silicates, glass, metal oxides, graphite, and combinations of any of the foregoing.

Suitable calcium carbonate filler include products such as Socal® 31, Socal® 312, Socal® U1S1, Socal® UaS2, Socal® N2R, Winnofil® SPM, and Winnofil® SPT available from Solvay Special Chemicals. A calcium carbonate filler can include a combination of precipitated calcium carbonates.

Inorganic filler can be surface treated to provide hydrophobic or hydrophilic surfaces that can facilitate dispersion and compatibility of the inorganic filler with other components of a sealant. An inorganic filler can include surface-modified particles such as, for example, surface modified silica. The surface of silica particles can be modified, for example, to be tailor the hydrophobicity or hydrophilicity of the surface of the silica particle. The surface modification can affect the dispensability of the particles, the viscosity, the curing rate, and/or the adhesion.

Sealant compositions can comprise an organic filler or a combination of organic filler.

Organic filler can be selected to have a low specific gravity and to be resistant to solvents such as JRF Type I and/or to reduce the density of a sealant layer. Suitable organic filler can also have acceptable adhesion to the sulfur-containing polymer matrix. An organic filler can include solid powders or particles, hollow powders or particles, or a combination thereof.

An organic filler can have a specific gravity, for example, less than 1.15, less than 1.1, less than 1.05, less than 1, less than 0.95, less than 0.9, less than 0.8, or less than 0.7. Organic filler can have a specific gravity, for example, within a range from 0.85 to 1.15, within a range from 0.9 to 1.1, within a range from 0.9 to 1.05, or from 0.85 to 1.05.

Organic filler can comprise thermoplastics, thermosets, or a combination thereof. Examples of suitable thermoplastics and thermosets include epoxies, epoxy-amides, ETFE copolymers, nylons, polyethylenes, polypropylenes, polyethylene oxides, polypropylene oxides, polyvinylidene chlorides, polyvinylfluorides, TFE, polyamides, polyimides, ethylene propylenes, perfluorohydrocarbons, fluoroethylenes, polycarbonates, polyetheretherketones, polyetherketones, polyphenylene oxides, polyphenylene sulfides, polystyrenes, polyvinyl chlorides, melamines, polyesters, phenolics, epichlorohydrins, fluorinated hydrocarbons, polycyclics, polybutadienes, polychloroprenes, polyisoprenes, polysulfides, polyurethanes, isobutylene isoprenes, silicones, styrene butadienes, liquid crystal polymers, and combinations of any of the foregoing.

Examples of suitable polyamide 6 and polyamide 12 particles are available from Toray Plastics as grades SP-500, SP-10, TR-1, and TR-2. Suitable polyamide powders are also available from the Arkema Group under the tradename Orgasol®, and from Evonik Industries under the tradename Vestosin®.

An organic filler can have any suitable shape. For example, an organic filler can comprise fractions of crushed polymer that has been filtered to select a desired size range. An organic filler can comprise substantially spherical particles. Particles can be solid or can be porous.

An organic filler can have an average particle size, for example, within a range from 1 μm to 100 μm, 2 μm to 40 μm, from 2 μm to 30 μm, from 4 μm to 25 μm, from 4 μm to 20 μm, from 2 μm to 12 μm, or from 5 μm to 15 μm. An organic filler can have an average particle size, for example, less than 100 μm, less than 75 μm, less than 50 μm, less than 40 μm, or less than 20 μm. Particle size distribution can be determined using a Fischer Sub-Sieve Sizer or by optical inspection.

An organic filler can include a low density such as a modified, expanded thermoplastic microcapsules. Suitable modified expanded thermoplastic microcapsules can include an exterior coating of a melamine or urea/formaldehyde resin.

Sealant compositions can comprise low density microcapsules. A low-density microcapsule can comprise a thermally expandable microcapsule.

A thermally expandable microcapsule refers to a hollow shell comprising a volatile material that expands at a pre-determined temperature. Thermally expandable thermoplastic microcapsules can have an average initial particle size of 5 μm to 70 μm, in some cases 10 μm to 24 μm, or from 10 μm to 17 μm.

The term "average initial particle size" refers to the average particle size (numerical weighted average of the particle size distribution) of the microcapsules prior to any expansion. The particle size distribution can be determined using a Fischer Sub-Sieve Sizer or by optical inspection.

Examples of materials suitable for forming the wall of a thermally expandable microcapsule include polymers of vinylidene chloride, acrylonitrile, styrene, polycarbonate, methyl methacrylate, ethyl acrylate, and vinyl acetate, copolymers of these monomers, and combinations of the polymers and copolymers. A crosslinking agent may be included with the materials forming the wall of a thermally expandable microcapsule.

Examples of suitable thermoplastic microcapsules include Expancel™ microcapsules such as Expancel™ DE microspheres available from AkzoNobel. Examples of suitable Expancel™ DE microspheres include Expancel™ 920 DE 40 and Expancel™ 920 DE 80. Suitable low-density microcapsules are also available from Kureha Corporation.

Low density filler such as low density microcapsules can be characterized by a specific gravity within a range from 0.01 to 0.09, from 0.04 to 0.09, within a range from 0.04 to 0.08, within a range from 0.01 to 0.07, within a range from 0.02 to 0.06, within a range from 0.03 to 0.05, within a range from 0.05 to 0.09, from 0.06 to 0.09, or within a range from 0.07 to 0.09, wherein the specific gravity is determined according to ASTM D1475. Low density filler such as low-density microcapsules can be characterized by a specific gravity less than 0.1, less than 0.09, less than 0.08, less than 0.07, less than 0.06, less than 0.05, less than 0.04, less than 0.03, or less than 0.02, wherein the specific gravity is determined according to ASTM D1475.

Low density filler such as low microcapsules can be characterized by a mean particle diameter from 1 µm to 100 µm and can have a substantially spherical shape. Low density filler such as low-density microcapsules can be characterized, for example, by a mean particle diameter from 10 µm to 100 µm, from 10 µm to 60 µm, from 10 µm to 40 µm, or from 10 µm to 30 µm, as determined according to ASTM D1475.

Low density filler such as low-density microcapsules can comprise expanded microcapsules or micro-balloons having a coating of an aminoplast resin such as a melamine resin. Aminoplast resin-coated particles are described, for example, in U.S. Pat. No. 8,993,691. Such microcapsules can be formed by heating a microcapsule comprising a blowing agent surrounded by a thermoplastic shell.

Uncoated low-density microcapsules can be reacted with an aminoplast resin such as a urea/formaldehyde resin to provide a coating of a thermoset resin on the outer surface of the particle.

With the coating of an aminoplast resin, an aminoplast-coated microcapsule can be characterized by a specific gravity, for example, within a range from 0.02 to 0.08, within a range from 0.02 to 0.07, within a range from 0.02 to 0.06, within a range from 0.03 to 0.07, within a range from 0.03 to 0.065, within a range from 0.04 to 0.065, within a range from 0.045 to 0.06, or within a range from 0.05 to 0.06, wherein the specific gravity is determined according to ASTM D1475.

Sealant compositions provided by the present disclose can comprise micronized oxidized polyethylene homopolymer. An organic filler can include a polyethylenes, such as an oxidized polyethylene powder. Suitable polyethylenes are available, for example, from Honeywell International, Inc. under the tradename ACumist®, from INEOS under the tradename Eltrex®, and Mitsui Chemicals America, Inc. under the tradename Mipelon™.

Sealant compositions can comprise, for example, from 1 wt % to 90 wt % of low-density filler, from 1 wt % to 60 wt %, from 1 wt % to 40 wt %, from 1 wt % to 20 wt %, from 1 wt % to 10 wt %, or from 1 wt % to 5 wt % of low-density filler, where wt % is based on the total weight of the composition.

Sealant compositions can comprise greater than 1 wt % low density filler, greater than 1 wt %, greater than 2 wt %, greater than 3 wt %, greater than 4 wt %, greater than 1 wt %, or greater than 10 wt % low-density filler, where wt % is based on the total weight of the composition.

Sealant compositions can comprise from 1 vol % to 90 vol % low-density filler, from 5 vol % to 70 vol %, from 10 vol % to 60 vol %, from 20 vol % to 50 vol %, or from 30 vol % to 40 vol % low density filler, where vol % is based on the total volume of the coreactive composition.

Sealant compositions can comprise greater than 1 vol % low-density filler, greater than 5 vol %, greater than 10 vol %, greater than 20 vol %, greater than 30 vol %, greater than 40 vol %, greater than 50 vol %, greater than 60 vol %, greater than 70 vol %, or greater than 80 vol % low-density filler, where vol % is based on the total volume of the sealant composition.

Coreactive sealant conductive compositions can include a conductive filler or a combination of conductive filler. A conductive filler can include electrically conductive filler, semiconductive filler, thermally conductive filler, magnetic filler, EMI/RFI shielding filler, static dissipative filler, electroactive filler, or a combination of any of the foregoing.

Sealant compositions can comprise an electrically conductive filler or combination of electrically conductive filler.

To render a part electrically conductive, the concentration of an electrically conductive filler can be above the electrical percolation threshold, where a conductive network of electrically conductive particles is formed. Once the electrical percolation threshold is achieved, the increase in conductivity as function of filler loading can be modeled by a simple power-law expression:

$$\sigma_c = \sigma_f (\varphi - \varphi_c)_t$$

where $\varphi$ is the filler volume fraction, $\varphi_c$ is the percolation threshold, $\sigma_f$ is the filler conductivity, $\varphi$ is the composite conductivity, and t is a scaling component. The filler need not be in direct contact for current flow and conduction can take place via tunneling between thin layers of binder surrounding the electrically conductive filler particles, and this tunneling resistance can be the limiting factor in the conductivity of an electrically conductive composite.

A conductive filler can have any suitable shape and/or dimensions. For example, an electrically conductive filler can be in form of particles, powders, flakes, platelets, filaments, fiber, crystals, or a combination of any of the foregoing.

A conductive filler can comprise a combination of conductive filler having different shapes, different dimensions, different properties such as, for example, different thermal conduction, electrical conduction, magnetic permittivity, electromagnetic properties, or a combination of any of the foregoing.

A conductive filler can be a solid or can be in the form of a substrate such as a particle having a coating of a conductive material. For example, a conductive filler can be a low-density microcapsule having an exterior conductive coating.

Examples of suitable conductive filler such as electrically conductive filler include metals, metal alloys, conductive oxides, semiconductors, carbon, carbon fiber, and combinations of any of the foregoing.

Other examples of electrically conductive filler include electrically conductive noble metal-based filler such as pure silver; noble metal-plated noble metals such as silver-plated gold; noble metal-plated non-noble metals such as silver plated cooper, nickel or aluminum, for example, silver-plated aluminum core particles or platinum-plated copper particles; noble-metal plated glass, plastic or ceramics such as silver-plated glass microspheres, noble-metal plated aluminum or noble-metal plated plastic microspheres; noble-metal plated mica; and other such noble-metal conductive filler. Non-noble metal-based materials can also be used and include, for example, non-noble metal-plated non-noble metals such as copper-coated iron particles or nickel-plated copper; non-noble metals, e.g., copper, aluminum, nickel, cobalt; non-noble-metal-plated-non-metals, e.g., nickel-plated graphite and non-metal materials such as carbon black and graphite. Combinations of electrically conductive filler and shapes of electrically conductive filler can be used to achieve a desired conductivity, EMI/RFI shielding effectiveness, hardness, and other properties suitable for a particular application.

The amount and type of electrically conductive filler can be selected to produce a sealant composition which, when cured, exhibits a sheet resistance (four-point resistance) of less than 0.50 Ω/cm², or a sheet resistance less than 0.15 Ω/cm². The amount and type of filler can also be selected to provide effective EMI/RFI shielding over a frequency range of from 1 MHz to 18 GHz for an aperture sealed using a sealant composition.

Organic filler, inorganic filler, and low-density filler can be coated with a metal to provide conductive filler.

An electrically conductive filler can include graphene. Graphene comprises a densely packed honeycomb crystal lattice made of carbon atoms having a thickness equal to the atomic size of one carbon atom, i.e., a monolayer of $sp^2$ hybridized carbon atoms arranged in a two-dimensional lattice.

Graphene can comprise graphenic carbon particles. Graphenic carbon particles refer to carbon particles having structures comprising one or more layers of one-atom-thick planar sheets of $sp^2$-bonded carbon atoms that are densely packed in a honeycomb crystal lattice. An average number of stacked layers can be less than 100, for example, less than 50. An average number of stacked layers can be 30 or less, such as 20 or less, 10 or less, or, in some cases, 5 or less. Graphenic carbon particles can be substantially flat, however, at least a portion of the planar sheets may be substantially curved, curled, creased or buckled. Graphenic carbon particles typically do not have a spheroidal or equiaxed morphology.

Graphenic carbon particles can have a thickness, measured in a direction perpendicular to the carbon atom layers, for example, of no more than 10 nm, no more than 5 nm, or no more than 4 or 3 or 2 or 1 nm, such as no more than 3.6 nm. Graphenic carbon particles can be from 1 atom layer up to 3, 6, 9, 12, 20 or 30 atom layers thick, or more. Graphenic carbon particles can have a width and length, measured in a direction parallel to the carbon atoms layers, of at least 50 nm, such as more than 100 nm, more than 100 nm up to 500 nm, or more than 100 nm up to 200 nm. Graphenic carbon particles can be provided in the form of ultrathin flakes, platelets or sheets having relatively high aspect ratios, where the aspect ratio is the ratio of the longest dimension of a particle to the shortest dimension of the particle, of greater than 3:1, such as greater than 10:1.

Graphenic carbon particles can comprise exfoliated graphite and have different characteristics in comparison with the thermally produced graphenic carbon particles, such as different size distributions, thicknesses, aspect ratios, structural morphologies, oxygen contents, and chemical functionalities at the basal planes/edges.

Graphenic carbon particles can be functionalized. Functionalized graphenic carbon particles refers to graphenic carbon particles where organic groups are covalently bonded to the graphenic carbon particles. The graphenic carbon particles can be functionalized through the formation of covalent bonds between the carbon atoms of a particle and other chemical moieties such as carboxylic acid groups, sulfonic acid groups, hydroxyl groups, halogen atoms, nitro groups, amine groups, aliphatic hydrocarbon groups, phenyl groups and the like. For example, functionalization with carbonaceous materials may result in the formation of carboxylic acid groups on the graphenic carbon particles. Graphenic carbon particles may also be functionalized by other reactions such as Diels-Alder addition reactions, 1,3-dipolar cycloaddition reactions, free radical addition reactions and diazonium addition reactions. Flydrocarbon and phenyl groups may be further functionalized. For graphenic carbon particles having a hydroxyl functionality, the hydroxyl functionality can be modified and extended by reacting these groups with, for example, an organic isocyanate.

Different types of graphenic carbon particles may be used in a composition.

A sealant composition can comprise, for example, from 2 wt % to 50 wt %, from 4 wt % to 40 wt %, from 6 wt % to 35 wt %, or from 10 wt % to 30 wt % thermally produced graphenic carbon particles, wherein wt % is based on the total weight of the sealant composition.

Filler used to impart electrical conductivity and EMI/RFI shielding effectiveness can be used in combination with graphene.

Electrically conductive non-metal filler, such as carbon nanotubes, carbon fibers such as graphitized carbon fibers, and electrically conductive carbon black, can also be used in sealant compositions in combination with graphene.

Conductive filler can comprise magnetic filler or combination of magnetic filler.

The magnetic filler can include a soft magnetic metal. This can enhance permeability of the magnetic mold resin. As a main component of the soft magnetic metal, at least one magnetic material selected from Fe, Fe—Co, Fe—Ni, Fe—Al, and Fe—Si may be used. A magnetic filler can be a soft magnetic metal having a high bulk permeability. As the soft magnetic metal, at least one magnetic material selected can be Fe, FeCo, FeNi, FeAl, and FeSi may be used. Specific examples include a permalloy (FeNi alloy), a super permalloy (FeNiMo alloy), a sendust (FeSiAl alloy), an FeSi alloy, an FeCo alloy, an FeCr alloy, an FeCrSi alloy, FeNiCo alloy, and Fe. Other examples of magnetic filler include iron-based powder, iron-nickel based powder, iron powder, ferrite powder, Alnico powder, $Sm_2Co_{17}$ powder, Nd—B—Fe powder, barium ferrite $BaFe_2O_4$, bismuth ferrite $BiFeO_3$, chromium dioxide $CrO_2$, SmFeN, NdFeB, and SmCo.

A surface of the magnetic filler can be insulation-coated or can have a film thickness of the insulation coating equal to or larger than 10 nm.

A surface of the magnetic filler can be insulation-coated with a metal oxide such as Si, Al, Ti, Mg or an organic material for enhancing fluidity, adhesion, and insulation performance.

Examples of carbonaceous materials for use as conductive filler other than graphene and graphite include, for example, graphitized carbon black, carbon fibers and fibrils, vapor-grown carbon nanofibers, metal coated carbon fibers, carbon nanotubes including single- and multi-walled nanotubes, fullerenes, activated carbon, carbon fibers, expanded graphite, expandable graphite, graphite oxide, hollow carbon spheres, and carbon foams.

Sealant compositions can comprise a reactive diluent or combination of reactive diluents. A reactive diluent can be used to reduce the viscosity of the composition. A reactive diluent can be a low molecular weight compound having at least one functional group capable of reacting with at least one of the major reactants of the composition and become part of the cross-linked network. A reactive diluent can have, for example, one functional group, or two functional group. A reactive dilute can be used to control the viscosity of a composition or improve the wetting of filler in a composition.

Sealant compositions can comprise a hydroxyl-functional vinyl ether or combination of hydroxyl-functional vinyl ethers.

A hydroxyl-functional vinyl ether can have the structure of Formula (36):

$$CH_2=CH-O-(CH_2)_t-OH \quad (36)$$

where t is an integer from 2 to 10. In hydroxyl-functional vinyl ethers of Formula (36), t can be 1, 2, 3, 4, 5, or t can be 6. Examples of suitable hydroxyl-functional vinyl ethers include 1-methyl-3-hydroxypropyl vinyl ether, 4-hydroxybutyl vinyl ether, and a combination thereof. A hydroxyl-functional vinyl ether can be 4-hydroxybutyl vinyl ether.

Sealant compositions can comprise, for example, from 0.1 wt % to 10 wt % of a hydroxyl-functional vinyl ether, from 0.2 wt % to 9 wt %, from 0.3 wt % to 0.7 wt % and from 0.4 wt % to 0.7 wt %, where wt % is based on the total weight of the curable composition.

Sealant compositions can comprise an amino-functional vinyl ether or combination of amino-functional vinyl ethers.

An amino-functional vinyl ether can have the structure of Formula (37):

$$CH_2=CH-O-(CH_2)_t-NH_2 \quad (37)$$

where t is an integer from 2 to 10. In amino-functional vinyl ethers of Formula (37), t can be 1, 2, 3, 4, 5, or t can be 6. Examples of suitable amino-functional vinyl ethers include 1-methyl-3-aminopropyl vinyl ether, 4-aminobutyl vinyl ether, and a combination of any of the foregoing. An amino-functional vinyl ether can be 4-aminobutyl vinyl ether.

Sealant compositions can comprise an epoxy-functional vinyl ether or combination of epoxy-functional vinyl ethers.

A hydroxyl-functional vinyl ether can have the structure of Formula (38):

$$CH_2=CH-O-(CH_2)_t-R \quad (38)$$

where t is an integer from 2 to 10, and R is an epoxy group. In epoxy-functional vinyl ethers of Formula (38), t can be 1, 2, 3, 4, 5, or t can be 6. An epoxy-functional vinyl ether can be 2-(4(vinyloxy)butyl)oxirane.

Sealant compositions can comprise, for example, from 0.1 wt % to 10 wt % of an amino-functional vinyl ether, from 0.2 wt % to 9 wt %, from 0.3 wt % to 0.7 wt % and from 0.4 wt % to 0.7 wt %, where wt % is based on the total weight of the sealant composition.

Sealant compositions can comprise vinyl-based diluents such as styrene, α-methyl styrene and para-vinyl toluene; vinyl acetate; and/or n-vinyl pyrrolidone.

Sealant compositions can contain a plasticizer or a combination of plasticizers. Plasticizers can be included to adjust the viscosity of the composition and to facilitate application.

Examples of suitable plasticizers include a combination of phthalates, terepathlic, isophathalic, hydrogenated terphenyls, quaterphenyls and higher or polyphenyls, phthalate esters, chlorinated paraffins, modified polyphenyl, tung oil, benzoates, dibenzoates, thermoplastic polyurethane plasticizers, phthalate esters, naphthalene sulfonate, trimellitates, adipates, sebacates, maleates, sulfonamides, organophosphates, polybutene, butyl acetate, butyl cellosolve, butyl carbitol acetate, dipentene, tributyl phosphate, hexadecanol, diallyl phthalate, sucrose acetate isobutyrate, epoxy ester of iso-octyl tallate, benzophenone and combinations of any of the foregoing.

Sealant compositions can comprise from 0.5 wt % to 7 wt % of a plasticizer or combination of plasticizers from 1 wt % to 6 wt %, from 2 wt % to 5 wt % or from 2 wt % to 4 wt % of a plasticizer or combination of plasticizers, where wt % is based on the total weight of the sealant composition. Sealant compositions can comprise less than 8 wt % plasticizer, less than 6 wt %, less than 4 wt %, or less than 2 wt % of a plasticizer or combination of plasticizers, where wt % is based on the total weight of the sealant composition.

A free radical polymerizable composition can comprise a colorant or a combination of colorants such as any of those described for use with an adhesion-promoting composition provided by the present disclosure.

Sealants can comprise a photochromic material or a combination of photochromic materials. A photochromic material can be a reversible photochromic material or a non-reversable photochromic material.

In certain applications it can be desirable that a photochromic agent that is sensitive to the degree of cure be used. Such agents can provide a visual indication that the sealant has been exposed to a desired amount of actinic radiation, for example, to cure the sealant composition. Certain photochromic agents can be used as cure indicators. A cure indicator can facilitate the ability to assess the extent of cure of a sealant by visual inspection.

Sealants can comprise a photochromic material or a combination of photochromic materials. A photochromic material can be a reversible photochromic material or a non-reversable photochromic material. A photochromic material can be a thermally reversible photochromic material or a thermally non-reversable photochromic material.

A photochromic material can be a compound that is activated by absorbing actinic radiation having a particular wavelength, such as UV radiation, which causes a change in a feature of the photochromic material. A feature change is an identifiable change in a feature of the photochromic material which can be detected using an instrument or visually. Examples of feature changes include a change of color or color intensity and a change in structure or other interactions with energy in the visible UV, infrared (IR), near IR or far IR portions of the electromagnetic spectrum such as absorption and/or reflectance. A color change at visible wavelengths refers to a color change at wavelengths within a range from 400 nm to 800 nm.

A photochromic material can be activated by absorbing radiation energy (visible and non-visible light) having a particular wavelength, such as UV light, to undergo a feature change such as a color change. The feature change can be a change of a feature of the photochromic material alone or it can be a change of feature of a sealant composition. Examples of suitable photochromic materials include spiropyrans, spiropyrimidines, spirooxazines, diarylethenes, photochromic quinones, azobenzenes, other photochromic dyes and combinations thereof. These photochromic materials can undergo a reversible or irreversible feature change when exposed to radiation where the first and second states can be different colors or different intensities of the same color.

Examples of suitable photochromic agents include spiropyrans. Spiropyrans are photochromic molecules that change color and/or fluoresce under different wavelength light sources. Examples of suitable photochromic spiropyrans include 1',3'-dihydro-8-methoxy-1',3',3'-trimethyl-6-nitrospiro[2H-1-benzopyran-2-,2'-(2H)-indole]; 1',3'-dihydro-1',3',3'-trimethyl-6-nitrospiro[2H-1-benzopyran-2,2'-(2H)-indole]; 1,3-dihydro-1,3,3-trimethylspiro[2H-indole-2,3'-[3H]naphth[2,1-b][-1,4]oxazine]; 6,8-dibromo-1,3,3-trimethylspiro[2H-indole-2,3'-[3H]phenanthr[9,-10-b][1,4] oxazine]; 6-bromo-1',3'-dihydro-1',3',3'-trimethyl-8-nitrospiro[2H-1-benzopyran-2,2'-(2H)-indole]; 5-chloro-1, 3-dihydro-1,3,3-trimethylspiro[2H-indole-2,3'-[3H]naphth [2,1-b-][1,4]oxazine]; 1',3'-dihydro-5'-methoxy-1'3,3 trimethyl-6-nitrospiro[2H-1-benzopyran-2,2'-(2H)-indole]; 1,3-dihydro-1,3,3-trimethylspiro[2H-indole-2,3'-3H]

phenanthr[9,10-b[1,4-]oxazine]; 5-methoxy-1,3,3-trimethylspiro[indoline-2,3'-[3H]naphtha[2,1-b]-pyran]; 8'-methacryloxymethyl-3-methyl-6'-nitro-1-selenaspiro-2H-1'-benzopyran-2,2'-benzoselenenazoline; 3-isopropyl-8'-methacryloxymethyl-5-methoxy-6'-nitro-1-selenaspiro[2H-1'-benzopyran-2,2'-benzoselenazoline]; 3-isopropyl-8'-methacryloxymethyl-5-methoxy-6'-nitro-1-selenaspiro[2H-1'-benzopyran-2,2'-benzoselenazoline]; 8'-methacryloxymethyl-5-methoxy-2-methyl-6'-nitro-1-selenaspiro[2H-1'-benzopyran-2,2'-benzoselenazoline]; 2,5-dimethyl-8'-methacryloxymethyl-6'-nitro-1-selenaspiro[2H-1'-benzopyran-2,2'-benzoselenazoline]; 8'-methacryloxymethyl-5-methoxy-3-methyl-6'-nitrospiro[benzoselenazoline-2,2'-(2'H)-1'-benzothiopyran]; 8-methacryloxymethyl-6-nitro-1',3',3'-trimethylspiro[2H-1-benzothiopyran2,2'-indoline]; 3,3-dimethyl-1-isopropyl-8'-methacryloxymethyl-6'-nitrospiro-indoline-2,-2'(2'H)-1'-benzothiopyran; 3,3-dimethyl-8'-methacryloxymethyl-6'-nitro-1-octadecylspiro[indoline-2,2-'(2'H)-1-benzothiopyran], and combinations of any of the foregoing.

Azobenzenes are capable of photoisomerization between trans- and cis-isomers. Examples of suitable photochromic azobenzenes include azobenzene; 4-[bis(9,9-dimethylfluoren-2-yl)amino]azobenzene; 4-(N,N-di methyl amino) azobenzene-4'-isothiocyanate; 2,2'-dihydroxy azobenzene; 1,1'-dibenzyl-4,4'-bipyridinium dichloride; 1,1'-diheptyl-4,4'-bipyridinium dibromide; 2,2',4'-trihydroxy-5-chloroazobenzene-3-sulfonic acid, and combinations of any of the foregoing.

Examples of suitable photochromic spirooxazines include 1,3-dihydro-1,3,3-trimethylspiro[2H-indole-2,3'-[3H]phenanthr[9,10-b](1,4-)oxazine]; 1,3,3-trimethyl spiro(indoline-2,3'-(3H)naphth(2,1-b)(1,4)oxazine); 3-ethyl-9'-methoxy-1,3-dimethylspiro(indoline-2,3'-(3H)naphth(2,1-b)(1,4)-oxazine); 1,3,3-trimethylspiro(indoline-2,3'-(3H) pyrido(3,2-f)-(1,4)benzox-azine); 1,3-dihydrospiro (indoline-2,3'-(3H)pyrido(3,2-f)-(1,4)benzoxazine), and combinations of any of the foregoing.

Examples of suitable photochromic spiropyrimidines include 2,3-dihydro-2-spiro-4'-[8'-aminonaphthalen-1'(4'H)-one]pyrimidine; 2,3-dihydro-2-spiro-7'-[8'-imino-7',8'-dihydronaphthalen-1'-amine]pyrimidine, and combinations of any of the foregoing.

Examples of suitable photochromic diarylethenes include 2,3-bis(2,4,5-trimethyl-3-thienyl)maleic anhydride; 2,3-bis (2,4,5-trimethyl-3-thienyl)maleimide; cis-1,2-dicyano-1,2-bis(2,4,5-trimethyl-3-thienyl)ethane; 1,2-bis[2-methylbenzo [b]thiophen-3-yl]-3,3,4,4,5,5-hexafluoro-1-cyclopentene; 1,2-bis(2,4-dimethyl-5-phenyl-3-thienyl)-3,3,4,4,5,5-hexafluoro-1-cyclopentene; stilbene; dithienylethenes, and combinations of any of the foregoing.

Examples of suitable photochromic quinones include 1-phenoxy-2,4-dioxyanthraquinone; 6-phenoxy-5,12-naphthacenequinone; 6-phenoxy-5,12-pentacenequinone; 1,3-dichloro-6-phenoxy-7,12-phthaloylpyrene, and combinations of any of the foregoing.

Other examples of suitable photochromic agents that can be used as cure indicators include ethylviolet and Disperse Red 177.

A sealant can include, for example, from 0.1 wt % to 10 wt % of a photochromic agent, such as from 0.1 wt % to 5 wt % or from 0.1 wt % to 2 wt %, where wt % is based on the total weight of the sealant.

A sealant can be transmissive to actinic radiation. For example, a sealant overlying an adhesion promoting layer provided by the present disclosure can transmit greater than 1%, greater than 10%, greater than 25%, greater than 75%, or greater than 90% of the relevant energy or range of energies. The transmissibility of the sealant can depend, for example, on the composition of the organic materials, on the type and amount of filler, and/or of the thickness of the sealant layer.

Adhesion-promoting compositions provided by the present disclosure can be applied to a surface of a metal substrate or metal part. Before applying the adhesion-promoting composition, the surface can be solvent cleaned. For example, the surface can be wiped with a cleaning solvent to remove any particulates and oils from the metal surface. A cleaning solvent can comprise a volatile organic solvent such as, for example, methylethyl ketone, solvent L628 available from PPG Aerospace, or ethyl lactate such as DS-108 available from Socomore.

The adhesion-promoting composition can be applied to the solvent-cleaned metal surface using any suitable method such as wiping, spraying, or brushing the adhesion-promoting composition across the surface, for example, using a saturated gauze pad such as a cotton gauze pad. The amount of the adhesion-promoting composition can result in a dried layer thickness, for example, from 1 µm to 10 µm, such as from 2 µm to 8 µm, or from 3 µm to 6 µm. For adhesion-promoting composition comprising a colorant, the coverage and homogeneity of the layer thickness can be evaluated by visual inspection.

An adhesion-promoting composition can be applied to a metal or metal alloy surface, including any metal or metal alloy surface used in the vehicle or aerospace industry. Examples of suitable surfaces include stainless steel AMS 5513, sulfuric acid anodized aluminum AMS 2471, titanium composition C AMS 4911, Alclad 2024 T3 aluminum QQA 250/5, aluminum QQA 250/12, aluminum QQA 250/13, and Alodine® 1200. These surfaces represent surfaces encountered in the aerospace industry.

The applied adhesion-promoting composition can then be dried. The adhesion-promoting composition can be dried by heating or by leaving at ambient conditions (25° C./50% RH) until the solvent has evaporated. For example, at a temperature of about 25° C. the applied adhesion-promoting composition can be left to dry, for example, for at least 10 minutes, at least 20 minutes, at least 30 minutes, or at least 1 hour. The dried adhesion-promoting composition can have a dried layer thickness, for example, from 1 µm to 10 µm, such as from 2 µm to 8 µm, or from 3 µm to 6 µm. The dried thickness of the adhesion-promoting layer can be, for example, greater than 1 µm, greater than 2 µm, greater than 3 µm, greater than 4 µm, greater than 6 µm, or greater than 8 µm. The dried thickness of the adhesion-promoting layer can be, for example, less than 10 µm, less than 8 µm, less than 6 µm, less than 4 µm, or less than 2 µm.

After the applied adhesion-promoting composition is dried, a layer of a sealant composition such as a free radical polymerizable sealant composition can be applied over the dried adhesion-promoting composition.

A sealant composition can contain, for example, from 30% to 70 wt % of a thiol-terminated sulfur-containing prepolymer such as a thiol-terminated polythioether prepolymer, from 35 wt % to 65 wt %, from 40 wt % to 60 wt % or from 45 wt % to 55 wt % of a thiol-terminated polythioether prepolymer, where wt % is based on the total weight of the sealant composition. A sealant composition can contain from 2 wt % to 12 wt % of a poly alkenyl and/or polyalkynyl curing agent, from 3 wt % to 11 wt %, from 4 wt % to 10 wt %, or from 5 wt % to 9 wt % of a poly alkenyl and/or polyalkynyl curing agent, where wt % is based on the total weight of the sealant composition.

Sealant compositions can be applied directly onto the surface of a substrate that has been coated with an adhesion-promoting layer provided by the present disclosure. The substrate, such as a metal substrate can include an aperture, a gap between panels, indentations, and/or fasteners.

The time to form a viable seal using sealant compositions of the present disclosure can depend on several factors as can be appreciated by those skilled in the art, and as defined by the requirements of applicable standards and specifications. In general, sealant compositions can develop adhesion strength within 24 hours to 30 hours, and 90% of full adhesion strength develops from 2 days to 3 days, following mixing and application to a surface. In general, full adhesion strength as well as other properties of cured sealant compositions can become fully developed within 7 days following mixing and application of a sealant composition to a surface.

Sealant systems provided by the present disclosure comprise an adhesion-promoting layer and an overlying sealant composition such as a radical-polymerizable sealant composition.

Sealants provided by the present disclosure can be used to seal surface of vehicles such as aviation and aerospace vehicles. The sealants may be used to seal apertures such as apertures associated with fuel tanks. To seal an aperture a sealant may be applied to a surface or one or more surfaces defining an aperture and the sealant allowed to cure to seal the aperture.

Sealants can have a $T_g$ when cured not higher than −55° C., such as not higher than −60° C., or, in some cases, not higher than −65° C.

For sealant systems comprising a actinic radiation-curable sealant, methods provided by the present disclosure comprise exposing the uncured sealant composition described above to actinic radiation to provide a cured sealant. The examples herein describe suitable conditions for performing this method. In some embodiments of the present disclosure, the thiol-ene reaction, which forms the cured sealant, is initiated by irradiating an uncured sealant composition comprising: (a) a thiol-terminated polythioether (such as any of those described above); and (b) an alkenyl-terminated compound, with actinic radiation. As used herein, "actinic radiation" encompasses electron beam (EB) radiation, ultraviolet (UV) radiation, and visible light. In many cases, the thiol-ene reaction is initiated by irradiating the composition with UV light and, in such cases, as disclosed herein, the composition often further comprises a photoinitiator, among other optional ingredients.

Ultraviolet radiation from any suitable source which emits ultraviolet light having a wavelength ranging from, for example, 180 nanometers to 400 nanometers, may be employed to initiate the thiol-ene reaction described above and thereby form the cured sealant. Suitable sources of ultraviolet light are generally known and include, for example, mercury arcs, carbon arcs, low pressure mercury lamps, medium pressure mercury lamps, high pressure mercury lamps, swirl-flow plasma arcs and ultraviolet light emitting diodes. Certain embodiments of the compositions of the disclosure can exhibit an excellent degree of cure in air at relatively low energy exposure in ultraviolet light.

UV cure of sealants to depths of up to 2 inches or more can be achieved in some cases. This means that cured sealants having a thickness of 2 inches or more, and having desirable sealant properties described herein, can be achieved by exposure of the compositions described herein to actinic radiation, such as ultraviolet radiation, in air at relatively low energy exposure.

A UV light source can have an emission peak in the range of 250 nm to 400 nm and at any wavelength or combination of wavelengths in between 250 nm and 400 nm. For example, useful UV sources include mercury vapor (250 nm to 400 nm; 600 mW/cm$^2$) and Phoseon Firefly™ (395 nm; >1000 mW/cm$^2$ setting).

Compositions can include sealant, coating, and/or electrical potting compositions. As used herein, the term "sealant composition" refers to a composition that is capable of producing a film that has the ability to resist atmospheric conditions, such as moisture and temperature and at least partially block the transmission of materials, such as water, fuel, and other liquid and gasses. A sealant composition of the present disclosure can be useful, e.g., as aerospace sealants and linings for fuel tanks.

Sealant systems produced according to the methods of the present disclosure can be fuel-resistant.

As used herein, the term "fuel resistant" means that a sealant has a percent volume swell of not greater than 40%, in some cases not greater than 25%, in some cases not greater than 20%, in yet other cases not more than 10%, after immersion for one week at 140° F. (60° C.) and ambient pressure in jet reference fluid (JRF) Type I according to methods similar to those described in ASTM D792 or AMS 3269. Jet reference fluid JRF Type I, as employed herein for determination of fuel resistance, has the following composition (see AMS 2629, issued Jul. 1, 1989), § 3.1.1 et seq., available from SAE (Society of Automotive Engineers, Warrendale, Pa.).

Sealant systems produced according to the present disclosure can have an elongation of at least 100% and a tensile strength of at least 250 psi when measured in accordance with the procedure described in AMS 3279, § 3.3.17.1, test procedure AS5127/1, § 7.7.

Sealant systems produced according to the present disclosure can have a tear strength of at least 25 pounds per linear inch (pli) or more when measured according to ASTM D624 Die C.

UV-curable sealant systems provided by the present disclosure may be used in preformed seal caps, which are used to seal fasteners such as those used in aircraft fuel tanks. When placed over a fastener and cured, the preformed seal caps allow visual inspection of the seal between the fastener and the cured composition. Methods for making premixed and frozen seal caps using polythioether polymer compositions are disclosed in U.S. Pat. No. 7,438,974, U.S. Application Publication No. 2013/0284359, U.S. Application Publication No. 2012/0040104, U.S. Application Publication No. 2012/0040103, and U.S. Application Publication No. 2015/0086726. Methods similar to those disclosed in U.S. Pat. No. 7,438,974, can be used to prepare and use the UV curable seal caps provided by the present disclosure. For example, an adhesion-promoting composition provided by the present disclosure can be applied to a fastener and dried, and a seal cap such as a UV-curable seal cap can be applied over the fastener having a pre-applied layer of an adhesion-promoting composition.

A preformed seal cap comprises a preformed shell comprising a sealant composition that is at least partially cured and that defines a cavity. The cavity is filled with an at least partially uncured quantity of a sealant composition. The composition forming the preformed shell may be any suitable sealant composition that is visually clear and that is transmissive to UV radiation. The composition forming the preformed shell can comprise a UV-curable composition provided by the present disclosure.

The composition is at least partially cured sufficient to maintain the integrity of the shell to facilitate handling. In such embodiments, the composition forming the preformed shell may be cured following assembly of the preformed seal cap on a fastener either by the same or other curing mechanism as the composition filling the cavity. The composition forming the preformed shell can be fully cured before the cavity is filled.

The preformed shell may be prepared, for example, by injection molding, compression molding, or other appropriate method. The shell may be any suitable thickness sufficient to retain a sealant composition within the cavity and to facilitate handling and assembly. The shell can have a thickness of 1/32 inches, 1/16 inches, 1/8 inches, or 14 inches. The dimensions of a preformed shell depend at least in part on the dimensions of the fastener intended to be sealed, such that the preformed seal cap completely covers the fastener and provides a surface for adhesion to a substrate to which the fastener is attached.

Similarly, a preformed shell may have any appropriate shape sufficient to cover a fastener and to provide a seal to a substrate to which the fastener is attached. For example, a preformed shell may comprise a first part intended to fit over a fastener and defining an internal cavity in the shaped of a dome or a tube capped by a dome. A preformed shell may include a second part, opposite the dome or cap, with a flared section that can taper to a section configured to conform to a substrate, and that is intended to mount to a substrate. This section also defines the opening to the cavity. The substrate on which the fastener is mounted may be flat or may be other shapes such as curved or arced. In such cases, the flared section of the preformed shell may be configured to have the same shape or similar shape to that of the substrate to which the preformed seal cap is to be mounted.

A method for making a sealant can comprise (1) forming a first sealant composition into a preformed shape comprising a cavity; (2) at least partially curing the first sealant; (3) filling the cavity with a second sealant composition; and (4) maintaining the second sealant composition at least partially uncured. The first sealant composition and the second sealant composition can be visually clear; and the first sealant composition and the second sealant composition comprise: (i) a thiol-terminated polythioether; and (ii) an alkenyl-terminated compound, such as an alkenyl-terminated compound comprising a polyvinyl ether and/or a polyallyl compound. The methods further comprise maintaining the second sealant composition at least partially uncured.

Maintaining the second sealant composition at least partially uncured can comprise shielding the second sealant composition from ultraviolet radiation.

Forming the first sealant composition can comprise compressing the first sealant composition to a predetermined thickness.

Forming the first sealant composition can comprise forming the first sealant composition into a concave shell having an internal cavity; and filling the cavity comprises filling the internal cavity with the second sealant.

The viscosity of the uncured second sealant filling the cavity can be such that it will not readily flow out of the cavity during use, for example, when the seal cap is inverted and placed on a fastener.

The viscosity is also such that the uncured sealant conforms to the fastener during assembly and does not entrap air pockets or bubbles. When placed on a fastener, a seal cap may be slowly lowered over and onto a fastener and gently rotated to distribute the uncured sealant onto the surface of the fastener and gradually completely over a seal cap so as to avoid entrapment of air pockets. The viscosity of the uncured second sealant can be from 5,000 poise to 15,000 poise, from 7,500 poise to 12,500 poise, or 10,000 poise.

After fabrication and at least partial or full curing to a preformed shell, the preformed shell is filled with an uncured second sealant composition. The uncured second sealant composition comprises a UV-curable composition provided by the present disclosure. The composition forming the preformed shell and filling the cavity may both be a UV-curable composition provided by the present disclosure or may be the same composition. The composition filling the cavity may be partially cured or may be uncured.

Prior to use, such as during storage and shipment, a preformed seal cap comprising the shell and cavity filled with the at least partially uncured sealant may be stored under conditions protected from UV radiation to prevent curing of at least the composition filling the cavity. In embodiments in which the preformed shell is fully cured or comprises a UV-curable composition, the temperature a humidity conditions of the storage and transportation environment do not, in general, affect the curing to of the compositions.

Prior to assembly, the preformed seal caps can be removed from the UV-protection. To seal a fastener, a preformed seal cap is placed over the fastener, placed or pressed onto the substrate surface, and exposed to UV radiation to cure the composition filling the cavity. Prior to applying the preformed seal cap over the fastener, the fastener may be wiped clean with a solvent and a partially reacted alkoxysilane primer composition provided by the present disclosure applied to the fastener and allowed to dry. Also, prior to curing, the interface between the fastener and the sealant composition and between the substrate and the sealant composition may be visually inspected to ensure that the interface between the fastener, the substrate, and the sealant composition are free of voids, pockets, and/or separations. If such voids, pockets, and/or separations are observed, the preformed seal cap may be repositioned such that the defects are removed, or may be detached, and a new preformed seal cap mounted on the fastener.

UV curable sealants may be used to fill and planarize surface defects such as depressions, dents, joints, and gaps. Aircraft surface may contain thousands of fasteners, and many joints and panel gaps.

For example, fasteners that attach outer panels of aircraft are often countersunk and attached to conductive inner surfaces. It is desirable that the countersink depressions be planarized to improve the aerodynamics of the structure and also be electrically insulated. In addition, there can be joints between assemblies and gaps between adjacent panels that are desirable to fill to improve surface aerodynamics and to electrically insulate. These and other objectives can be accomplished by using the UV-curable sealants disclosed herein.

Surface depressions on an aerospace substrate, resulting, for example, from countersunk fasteners or dents, can be filled by applying a UV-curable sealant provided by the present disclosure and exposing the applied sealant to UV radiation to cure the sealant. Prior to applying the sealant over a fastener or other surface, the fastener or other surface may be wiped clean with a solvent and an adhesion-promoting composition provided by the present disclosure applied to the fastener or other surface and allowed to dry.

The sealant may be applied to the fastener or surface having a dried layer of the adhesion-promoting composition with an applicator such as a syringe, cartridge, extruder, or spatula in an amount sufficient to fill the depression and smoothed. The applied sealant may be smoothed, for example, by smearing or by applying a plate on top of the sealant. The plate may be transparent to UV radiation, such as a glass plate or a plastic sheet such as a polyethylene sheet, thereby enabling pressure to be applied to the sealant during curing. The applied sealant can then be exposed to UV radiation to cure the sealant. If used, the UV-transmissive pressure plate may then be removed to provide an aerodynamically smooth surface. In certain methods, it may be necessary to remove excess sealant or otherwise smooth the interface between the edge of the cured sealant and the aircraft substrate. This may be accomplished, for example, by sanding the surface using, for example, an abrasive paper, such as 400 wet/dry sand paper.

Similar methods may be used to fill gaps between panels or other surface features.

Such methods may be used during aircraft assembly or during repair and replacement operations. In general, the aircraft surface including the cured UV-curable sealant is painted prior to use.

For aerospace sealant applications it can be desirable that a sealant including a multilayer sealant including a partially reacted alkoxysilane primer and overlying thiol-ene based sealant meet the requirements of Mil-S—22473E (Sealant Grade C) at a cured thickness of 20 mils, exhibit an elongation greater than 200%, a tensile strength greater than 250 psi, and excellent fuel resistance, and maintain these properties over a wide temperature range from −67° F. to 360° F. In general, the visual appearance of the sealant is not an important attribute. Prior to cure, it is desirable that the mixed components have a useful working time or pot life of at least 24 hours and have a tack free cure time at room temperature within 24 hours of the pot life. Useful working time or pot life refers to the time period the composition remains workable for application at ambient temperatures after the catalyst is released.

Sealant systems provided by the present disclosure comprise a metal substrate, an adhesion-promoting layer contacting and overlying the metal substrate, and a sealant contacting and overlying the adhesion-promoting layer. The adhesion-promoting layer enhances the adhesion between the sealant and the metal substrate. Sealant systems provided by the present disclosure can be used to seal surfaces and can be used to repair and/or restore damaged and/or aged surfaces to reseal a surface or maintain the integrity of a sealed surface.

The metal substrate can comprise the surface of a vehicle such as a marine vehicle, a passenger vehicle, a transport vehicle, or an aerospace vehicle. The metal substrate can comprise a surface of a feature or part such as a fuel tank or fastener. Sealant systems including an adhesion-promoting layer provided by the present disclosure can be used to seal and/or reseal apertures, surfaces, joints, fillets, fay surfaces, and fasteners including apertures, surfaces, fillets, joints, fay surfaces fasteners of vehicles including aerospace vehicles. Surfaces including vehicular surfaces such as aerospace surfaces, sealed with a sealant system including an adhesion-promoting layer are included within the scope of the disclosure Sealant systems provided by the present disclosure can be used with vehicles especially where fuel resistance is desired, A sealant refers to a curable composition that has the ability when cured to resist atmospheric conditions such as moisture (e.g., from 5% RH to 100% RH) and temperature (e.g., from −30° C. to 40° C.) and at least partially block the transmission of materials such as water, water vapor, fuel, solvents, and/or liquids and gases.

Sealant compositions may be formulated as Class A, Class B, or Class C sealants. A Class A sealant refers to a brushable sealant having a viscosity of 1 poise to 500 poise (0.1 Pa-sec to 50 Pa-sec) and is designed for brush application. A Class B sealant refers to an extrudable sealant having a viscosity from 4,500 poise to 20,000 poise (450 Pa-sec to 2,000 Pa-sec) and is designed for application by extrusion via a pneumatic gun. A Class B sealant can be used form fillets and sealing on vertical surfaces or edges where low slump/slag is required. A Class C sealant has a viscosity from 500 poise to 4,500 poise (50 Pa-sec to 450 Pa-sec) and is designed for application by a roller or combed tooth spreader. A Class C sealant can be used for fay surface sealing. Viscosity can be measured according to Section 5.3 of SAE Aerospace Standard AS5127/1C published by SAE International Group.

A sealant composition can be applied to an adhesion-promoting layer using any suitable method including, for example, brushing, spraying, roller coating, or extrusion.

A cured sealant can have a thickness, for example, from 5 mils to 25 mils (127 μm to 635 μm) such as from 10 mils to 20 mils (254 μm to 508 μm).

Sealant compositions can be free radical polymerizable compositions and can be curable upon exposure to actinic radiation such as UV radiation.

The free radical photopolymerization reaction can be initiated by exposing a composition provided by the present disclosure to actinic radiation such as UV radiation, for example, for less than 180 seconds, less 120 seconds, less than 90 seconds, less than 60 seconds, or less than 30 seconds.

The free radical photopolymerization reaction can be initiated by exposing a composition provided by the present disclosure to actinic radiation such as UV radiation, for example, for from 5 seconds to 180 seconds, from 15 seconds to 120 seconds, from 15 seconds to 90 seconds, or from 15 seconds to 60 seconds.

The UV radiation can include irradiation at a wavelength at 394 nm.

The total power of the UV exposure can be, for example, from 50 mW/cm$^2$ to 500 mW/cm$^2$, from 50 mW/cm$^2$ to 400 mW/cm$^2$, from 50 mW/cm$^2$ to 300 mW/cm$^2$, from 100 mW/cm$^2$ to 300 mW/cm$^2$, or from 150 mW/cm$^2$ to 250 mW/cm$^2$.

In certain applications a sealant system can be cured without exposure to actinic radiation such as UV radiation. Composition can be at least partly curable upon exposure to actinic radiation and such compositions can include a photoionization. The actinic radiation such as UV radiation can be applied to at least a portion of an applied sealant. The sealant can be accessible to the actinic radiation and the portion of sealant exposed to the UV radiation can be cured to a certain depth below the surface. For example, the actinic radiation can be initiated the photopolymerization reaction to a depth, for example, of at least 4 mm, at least 6 mm, at least 8 mm, or at least 10 mm. A portion of the sealant may not be accessible to actinic radiation either because of absorption or scattering of the actinic radiation of the sealant which prevents the actinic radiant from interacting with the full thickness of the sealant. A portion of the sealant may be obscured by the geometry of the part being sealed or may be obscured by an overlying structure.

Cured sealant systems exhibit properties acceptable for use in vehicle and aerospace sealant applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF Type I for 7 days, and following immersion in a solution of 3% NaCl according to AMS 3265B test specifications; tensile strength between 300 pounds per square inch (psi) and 400 psi (2.75 MPa); tear strength greater than 50 pounds per linear inch (pli) (8.75 N/mm); elongation between 250% and 300%; and hardness greater than 40 Durometer A. These and other cured sealant properties appropriate for aviation and aerospace applications are disclosed in AMS 3265B. It is also desirable that, when cured, compositions of the present disclosure used in aviation and aircraft applications exhibit a percent volume swell not greater than 25% following immersion for one week at 60° C. (140° F.) and ambient pressure in Jet Reference Fluid (JRF) Type 1. Other properties, ranges, and/or thresholds may be appropriate for other sealant applications.

Cured sealant systems can be fuel-resistant. The term "fuel resistant" means that a composition, when applied to a substrate and cured, can provide a cured product, such as a sealant, that exhibits a percent volume swell of not greater than 40%, in some cases not greater than 25%, in some cases not greater than 20%, and in other cases not more than 10%, after immersion for one week at 140° F. (60° C.) and ambient pressure in JRF Type I according to methods described in ASTM D792 (American Society for Testing and Materials) or AMS 3269 (Aerospace Material Specification). JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, § 3.1.1 etc., available from SAE (Society of Automotive Engineers)).

Sealant systems can exhibit a tensile elongation of at least 200% and a tensile strength of at least 200 psi when measured in accordance with the procedure described in AMS 3279, § 3.3.17.1, test procedure AS5127/1, § 7.7. In general, for a Class A sealant there is no tensile and elongation requirement. For a Class B sealant, as a general requirement, tensile strength is equal to or greater than 200 psi (1.38 MPa) and elongation is equal to or greater than 200%. Acceptable elongation and tensile strength can be different depending on the application.

Sealant systems can exhibit a lap shear strength of greater than 200 psi (1.38 MPa), such as at least 220 psi (1.52 MPa), at least 250 psi (1.72 MPa), and, in some cases, at least 400 psi (2.76 MPa), when measured according to the procedure described in SAE AS5127/1 paragraph 7.8.

A cured sealant system can meet or exceed the requirements for aerospace sealants as set forth in AMS 3277.

A cured sealant system provided by the present disclosure can exhibit a peel strength greater than 10 pli and 100% cohesive failure; greater than 20 pli/100% CF, greater than 30 pli/100% CF, or greater than 40 pli/100% CF.

Sealant systems including an adhesion-promoting layer provided by the present disclosure can meet the requirements of AMS draft specification G9-16AA. Specification G9-16AA requires the peel strength to be at least 10 pli (113 N-cm) and 100% cohesive strength on a variety of aerospace substrates.

A cured sealant system provided by the present disclosure can exhibits greater than 20 pli peel strength and 100% cohesive failure determined according to AMS-3277 within 24 hours following cure using cladded aluminum (Alclad, QQ-A-250/5 or 2024-T3) and stainless steel (AMS 5518) substrates.

Sealant systems provided by the present disclosure can exhibit cohesive failure as determined according to AMS G9-16AA after at least 1 week ambient exposure, at least 2 weeks, at least 4 weeks, or at least 8 weeks following curing the sealant system.

Apertures, surfaces, joints, fillets, fay surfaces including apertures, surfaces, fillets, joints, and fay surfaces of aerospace vehicles, sealed with compositions are also disclosed.

Sealant systems including an adhesion-promoting layer provided by the present disclosure can be used to seal a part including a surface of a vehicle.

The term "vehicle" is used in its broadest sense and includes all types of aircraft, spacecraft, watercraft, and ground vehicles. For example, a vehicle can include, aircraft such as airplanes including private aircraft, and small, medium, or large commercial passenger, freight, and military aircraft; helicopters, including private, commercial, and military helicopters; aerospace vehicles including, rockets and other spacecraft. A vehicle can include a ground vehicle such as, for example, trailers, cars, trucks, buses, vans, construction vehicles, golf carts, motorcycles, bicycles, trains, and railroad cars. A vehicle can also include watercraft such as, for example, ships, boats, and hovercraft.

A sealant system can be used in a F/A-18 jet or related aircraft such as the F/A-18E Super Flornet and F/A-18F; in the Boeing 787 Dreamliner, 737, 747, 717 passenger jet aircraft, a related aircraft (produced by Boeing Commercial Airplanes); in the V-22 Osprey; VF1-92, S—92, and related aircraft (produced by NAVAIR and Sikorsky); in the G650, G600, G550, G500, G450, and related aircraft (produced by Gulfstream); and in the A350, A320, A330, and related aircraft (produced by Airbus).

Compositions provided by the present disclosure can be used in any suitable commercial, military, or general aviation aircraft such as, for example, those produced by Bombardier Inc. and/or Bombardier Aerospace such as the Canadair Regional Jet (CRJ) and related aircraft; produced by Lockheed Martin such as the F-22 Raptor, the F-35 Lightning, and related aircraft; produced by Northrop Grumman such as the B-2 Spirit and related aircraft; produced by Pilatus Aircraft Ltd.; produced by Eclipse Aviation Corporation; or produced by Eclipse Aerospace (Kestrel Aircraft).

Sealant systems provided by the present disclosure can be used to seal parts and surfaces of vehicles such as fuel tank surfaces and other surfaces exposed to or potentially exposed to aerospace solvents, aerospace hydraulic fluids, and aerospace fuels.

The present invention includes parts sealed with a sealant system provided by the present disclosure, and assemblies and apparatus comprising a part sealed with a composition provided by the present disclosure.

The present invention includes vehicles comprising a part such as a surface sealed with a sealant system provided by the present disclosure. For example, an aircraft comprising a fuel tank or portion of a fuel tank sealed with a sealant system provided by the present disclosure is included within the scope of the invention.

ASPECTS OF THE INVENTION

The invention is further defined by the following aspects.

Aspect 1. An adhesion-promoting composition comprising: an organic titanate, an organic zirconate, or a combination thereof; and an alkoxysilane composition, wherein the alkoxysilane composition comprises: an amine-functional alkoxysilane; an alkenyl-functional alkoxysilane; and an organic solvent.

Aspect 2. The adhesion-promoting composition of aspect 1, wherein the adhesion-promoting composition comprises: from 1 wt % to 30 wt % of the organic titanate, the organic zirconate, or a combination thereof; from 1 wt % to 30 wt % of the amine-functional alkoxysilane; from 1 wt % to 30 wt % of the alkenyl-functional alkoxysilane; and from 50 wt % to 95 wt % of the organic solvent, wherein wt % is based on the total weight of the adhesion-promoting composition.

Aspect 3. The adhesion-promoting composition of any one of aspects 1 to 2, wherein the adhesion-promoting composition comprises from 0.5 wt % to 20 wt % water, wherein wt % is based on the total weight of the adhesion-promoting composition.

Aspect 4. The adhesion-promoting composition of aspect 1, wherein the adhesion-promoting composition comprises: from 1 wt % to 10 wt % of the organic titanate, the organic zirconate, or a combination thereof; from 5 wt % to 15 wt % of the amine-functional alkoxysilane; from 5 wt % to 15 wt % of the alkenyl-functional alkoxysilane; and from 65 wt % to 85 wt % of the organic solvent, wherein wt % is based on the total weight of the adhesion-promoting composition.

Aspect 5. The adhesion-promoting composition of aspect 4, wherein the adhesion-promoting composition comprises from 0.5 wt % to 10 wt % water, wherein wt % is based on the total weight of the adhesion-promoting composition.

Aspect 6. The adhesion-promoting composition of any one of aspects 1 to 5, wherein the alkoxysilane composition comprises a reacted alkoxysilane composition, wherein the reacted alkoxysilane composition comprises the reaction products of the alkoxysilane composition heated to a temperature up to 100° C. for at least 30 minutes.

Aspect 7. The adhesion-promoting composition of any one of aspects 1 to 6, wherein the alkoxysilane composition comprises: from 1 wt % to 30 wt % of the amine-functional alkoxysilane; from 1 wt % to 30 wt % of the alkenyl-functional alkoxysilane; and from 50 wt % to 95 wt % of the organic solvent, wherein wt % is based on the total weight of the alkoxysilane composition.

Aspect 8. The adhesion-promoting composition of aspect 7, wherein the alkoxysilane composition further comprises from 0.5 wt % to 20 wt % of water, wherein wt % is based on the total weight of the alkoxysilane composition.

Aspect 9. The adhesion-promoting composition of any one of aspects 1 to 6, wherein the alkoxysilane composition comprises: from 5 wt % to 15 wt % of the amine-functional alkoxysilane; from 5 wt % to 15 wt % of the alkenyl-functional alkoxysilane; and from 65 wt % to 85 wt % of the organic solvent, wherein wt % is based on the total weight of the adhesion-promoting composition.

Aspect 10. The adhesion-promoting composition of aspect 9, wherein the alkoxysilane composition comprises from 0.5 wt % to 10 wt % water, wherein wt % is based on the total weight of the adhesion-promoting composition.

Aspect 11. The adhesion-promoting composition of any one of aspects 1 to 10, wherein the amine-functional alkoxysilane comprises a monoamine-functional alkoxysilane, a diamine-functional alkoxysilane, a triamine-functional alkoxysilane, a secondary amine-functional alkoxysilane, a dipodal amine-functional alkoxysilane, or a combination of any of the foregoing.

Aspect 12. The adhesion-promoting composition of any one of aspects 1 to 10, wherein the amine-functional alkoxysilane comprises a monoamine-functional alkoxysilane.

Aspect 13. The adhesion-promoting composition of any one of aspects 1 to 10, wherein the amine-functional alkoxysilane comprises (3-aminopropyl)triethoxysilane, (3-trimethoxysilylpropyl)diethylenetriamine, bis(3-triethoxysilylpropyl)amine, or a combination of any of the foregoing.

Aspect 14. The adhesion-promoting composition of any one of aspects 1 to 13, wherein the alkenyl-functional alkoxysilane comprises a monoalkenyl-functional alkoxysilane, a dialkenyl-functional alkoxysilane, an alkenyl-functional ketoximino alkoxysilane, a dipodal alkenyl-functional alkoxysilane, or a combination of any of the foregoing.

Aspect 15. The adhesion-promoting composition of any one of aspects 1 to 13, wherein the alkenyl-functional alkoxysilane comprises an alkenyl-functional ketoximino alkoxysilane.

Aspect 16. The adhesion-promoting composition of any one of aspects 1 to 13, wherein the alkenyl-functional alkoxysilane comprises vinyltris(methylethylkeoximino)silane.

Aspect 17. The adhesion-promoting composition of any one of aspects 1 to 16, wherein, the alkoxysilane composition is a reacted alkoxysilane composition; and the adhesion-promoting composition further comprises an amine-functional alkoxysilane and/or an alkenyl-functional alkoxysilane.

Aspect 18. The adhesion-promoting composition of any one of aspects 1 to 17, wherein the organic titanate comprises titanium diisopropoxide bis(acetylacetonate), titanium(IV) 2-ethylhexyloxide, or a combination thereof.

Aspect 19. The adhesion-promoting composition of any one of aspects 1 to 18, wherein the organic zirconate comprises the sodium salt of zirconium lactate, tetra-n-propyl zirconate, or a combination thereof.

Aspect 20. The adhesion-promoting composition of any one of aspects 1 to 19, wherein the adhesion-promoting composition comprises from 1 wt % to 9 wt % of the organic titanate and/or organic zirconate.

Aspect 21. The adhesion-promoting composition of any one of aspects 1 to 19, wherein the adhesion-promoting composition comprises from 0.05 wt % to 15 wt % titanium and/or zirconium, wherein wt % is based on the total weight of the adhesion-promoting composition.

Aspect 22. The adhesion-promoting composition of any one of aspects 1 to 19, wherein the adhesion-promoting composition comprises from 0.5 wt % to 5 wt % titanium and/or zirconium, wherein wt % is based on the total weight of the adhesion-promoting composition.

Aspect 23. The adhesion-promoting composition of any one of aspects 1 to 22, wherein the organic solvent comprises an alcohol, a propylene glycol ether, methyl ethyl ketone, ethyl acetate, or a combination of any of the foregoing.

Aspect 24. The adhesion-promoting composition of any one of aspects 1 to 22, wherein the organic solvent comprises isopropanol, propylene glycol methyl ether, or a combination thereof.

Aspect 25. The adhesion-promoting composition of any one of aspects 1 to 24, wherein the adhesion-promoting composition comprises reactive alkenyl groups.

Aspect 26. The adhesion-promoting composition of any one of aspects 1 to 25, wherein the adhesion-promoting composition is storage stable at 25° C. for at least 2 months.

Aspect 27. The adhesion-promoting composition of any one of aspects 1 to 26, wherein the adhesion-promoting composition is visually clear at 25° C. for at least 2 months.

Aspect 28. The adhesion-promoting composition of any one of aspects 1 to 27, wherein the adhesion-promoting composition has a viscosity less than 100 cp measured using a CAP 2000 viscometer (parallel plate) at 25° C. and at a shear rate of 50 rpm.

Aspect 29. The adhesion-promoting composition of any one of aspects 1 to 28, wherein the adhesion-promoting composition comprises a colorant.

Aspect 30. The adhesion-promoting composition of any one of aspects 1 to 29, wherein the adhesion-promoting composition does not comprise an acid catalyst.

Aspect 31. An adhesion-promoting layer prepared from the adhesion-promoting composition of any one of aspects 1 to 30.

Aspect 32. A method of preparing the adhesion-promoting composition of any one of aspects 1 to 30, comprising:
(a) combining, to form a mixture: the organic titanate, an organic zirconate, or a combination thereof; the amine-functional alkoxysilane; the alkenyl-functional alkoxysilane; and the organic solvent; and
(b) aging the mixture to provide the adhesion-promoting composition.

Aspect 33. The method of aspect 32, wherein the mixture comprises: from 1 wt % to 30 wt % of the organic titanate, the organic zirconate, or a combination thereof; from 1 wt % to 30 wt % of the amine-functional alkoxysilane; from 1 wt % to 30 wt % of the alkenyl-functional alkoxysilane; and from 50 wt % to 95 wt % of the organic solvent, wherein wt % is based on the total weight of the mixture.

Aspect 34. The method of any one of aspects 32 to 33, wherein combining further comprises combining, to form the mixture, from 0.5 wt % to 20 wt % of water, wherein wt % is based on the total weight of the mixture.

Aspect 35. The method of any one of aspects 32 to 34, wherein aging comprises equilibrating the mixture at 25° C. for at least 12 hours.

Aspect 36. An adhesion-promoting composition prepared using the method of any one of aspects 32 to 35.

Aspect 37. An adhesion-promoting layer prepared from the adhesion-promoting composition of aspect 36.

Aspect 38. A method of preparing the adhesion-promoting composition of any one of aspects 1 to 30, comprising:
(a) combining, to form an alkoxysilane composition: the amine-functional alkoxysilane; the alkenyl-functional alkoxysilane; and the organic solvent;
(b) heating the alkoxysilane composition to a temperature up to 100° C. for at least 30 minutes to provide a reacted alkoxysilane composition; and
(c) adding the organic titanate and/or an organic zirconate to the reacted alkoxysilane composition to provide an adhesion-promoting composition.

Aspect 39. The method of aspect 38, wherein the alkoxysilane composition comprises: from 1 wt % to 30 wt % of the amine-functional alkoxysilane; from 1 wt % to 30 wt % of the alkenyl-functional alkoxysilane; and from 50 wt % to 95 wt % of the organic solvent, wherein wt % is based on the total weight of the alkoxysilane composition.

Aspect 40. The method of any one of aspects 38 to 39, further comprising combining from 0.5 wt % to 20 wt % of water to form the alkoxysilane composition, wherein wt % is based on the total weight of the alkoxysilane composition.

Aspect 41. The method of any one of aspects 38 to 39, further comprising adding from 0.5 wt % to 20 wt % of water to the reacted alkoxysilane composition, wherein wt % is based on the total weight of the reacted alkoxysilane composition.

Aspect 42. The method of any one of aspects 38 to 41, further comprising, before adding the organic titanate and/or the organic zirconate, cooling the reacted alkoxysilane composition.

Aspect 43. The method of any one of aspects 38 to 41, wherein adding the organic titanate and/or the organic zirconate comprises combining: from 1 wt % to 30 wt % of the organic titanate and/or the organic zirconate; and from 70 wt % to 99 wt % of the reacted alkoxysilane composition, wherein wt % is based on the total weight of the alkoxysilane composition.

Aspect 44. An adhesion-promoting composition prepared using the method of any one of aspects 38 to 43.

Aspect 45. An adhesion-promoting layer prepared from the adhesion-promoting composition of aspect 44.

Aspect 46. A method of preparing an adhesion-promoting composition comprising:
(a) combining, to form an alkoxysilane composition: from 50 wt % to 95 wt % of an organic solvent; from 1 wt % to 30 wt % of an amino-functional alkoxysilane; and from 1 wt % to 30 wt % of an alkenyl-functional alkoxysilane; wherein wt % is based on the total weight of the alkoxysilane composition; and
(b) heating the alkoxysilane composition to a temperature up to 100° C. for at least 30 minutes to provide a reacted alkoxysilane composition;
(c) cooling the reacted alkoxysilane composition to 25° C.; and
(d) combining from 1 wt % to 30 wt % of an organic zirconate and/or an organic titanate and from 70 wt % to 99 wt % of the cooled, reacted alkoxysilane composition to provide a reacted adhesion-promoting composition, wherein wt % is based on the total weight of the adhesion-promoting composition.

Aspect 47. The method of aspect 46, wherein the alkoxysilane composition comprises: from 5 wt % to 15 wt % of the amine-functional alkoxysilane; from 5 wt % to 15 wt % of the alkenyl-functional alkoxysilane; and from 65 wt % to 85 wt % of the organic solvent, wherein wt % is based on the total weight of the alkoxysilane composition.

Aspect 48. The method of any one of aspects 46 to 47, wherein combining comprises combining from 1 wt % to 9 wt % of the organic zirconate and/or organic titanate.

Aspect 49. The method of any one of aspects 46 to 48, wherein preparing further comprises combining from 0.5 wt % to 20 wt % water, wherein wt % is based on the total weight of the alkoxysilane composition.

Aspect 50. The method of any one of aspects 46 to 48, wherein adding further comprises adding from 0.5 wt % to 20 wt % water to the reacted alkoxysilane composition, wherein wt % is based on the total weight of the alkoxysilane composition.

Aspect 51. An adhesion-promoting composition prepared by the method of any one of aspects 46 to 50.

Aspect 52. An adhesion-promoting layer prepared from the adhesion-promoting composition of aspect 51.

Aspect 53. A sealant system comprising:
(a) an adhesion-promoting layer overlying a substrate, wherein the adhesion-promoting layer comprises: from 10 wt % to 90 wt % of an organic titanate, an organic zirconate, or a combination thereof; and from 10 wt % to 90 wt % of alkoxysilanes, wherein the alkoxysilanes comprise an amino-functional alkoxysilane and an alkenyl-functional alkoxysilane; wherein wt % is based on the total weight of the adhesion-promoting layer; and
(b) a sealant overlying the adhesion-promoting layer.

Aspect 54. The sealant system of aspect 53, wherein the adhesion-promoting layer comprises: from 15 wt % to 35 wt % of an organic titanate, an organic zirconate, or a combination thereof; and from 65 wt % to 85 wt % of alkoxysilanes, wherein the alkoxysilanes comprise an amino-functional alkoxysilane and an alkenyl-functional alkoxysilane; wherein wt % is based on the total weight of the adhesion-promoting layer.

Aspect 55. The sealant system of any one of aspects 53 to 54, wherein the sealant comprises a free radical polymerized sealant.

Aspect 56. The sealant system of aspect 55, wherein the sealant comprises a free-radical polymerized sulfur-containing sealant.

Aspect 57. The sealant system of aspect 56, wherein the free-radical polymerized sulfur-containing sealant comprises a reaction product of reactants comprising: a sulfur-containing prepolymer; and a curing agent reactive with the sulfur-containing prepolymer.

Aspect 58. The sealant system of aspect 57, wherein, the sulfur-containing prepolymer comprises a thiol-terminated sulfur-containing prepolymer; and the curing agent comprises a polyalkenyl, a polyalkynyl, or a combination thereof.

Aspect 59. The sealant system of aspect 57, wherein, the sulfur-containing prepolymer comprises an alkenyl-terminated sulfur-containing prepolymer, and alkynyl-terminated prepolymer, or a combination thereof; and the curing agent comprises a polythiol.

Aspect 60. The sealant system of any one of aspects 57 to 59, wherein the sulfur-containing prepolymer comprises a polythioether prepolymer, a polysulfide prepolymer, a sulfur-containing polyformal prepolymer, a monosulfide prepolymer, or a combination of any of the foregoing.

Aspect 61. The sealant system of any one of aspects 57 to 59, wherein the sulfur-containing prepolymer comprises a thiol-terminated sulfur-containing prepolymer.

Aspect 62. The sealant system of any one of aspects 57 to 59, wherein the sulfur-containing prepolymer comprises a thiol-terminated polythioether prepolymer.

Aspect 63. The sealant system of any one of aspects 57 to 62, wherein the curing agent comprises a divinyl ether, a polyalkenyl polyfunctionalizing agent, or a combination thereof.

Aspect 64. The sealant system of any one of aspects 57 to 63, wherein the sealant comprises a free radical initiator.

Aspect 65. The sealant system of aspect 64, wherein the free-radical initiator comprises a UV photoinitiator.

Aspect 66. The sealant system of any one of aspects 57 to 65, wherein the adhesion-promoting layer has a thickness from 1 µm to 20 µm.

Aspect 67. The sealant system of any one of aspects 57 to 66, wherein, the substrate comprises cladded aluminum (Alclad, QQ-A-250/5 or 2024-T3) or stainless steel (AMS 5518); and the sealant system exhibits greater than 20 pli peel strength and 100% cohesive failure determined according to AMS G9-16AA after curing for at least 1 week.

Aspect 68. The sealant system of any one of aspects 57 to 67, wherein the substrate comprises a surface of a vehicle.

Aspect 69. The sealant system of any one of aspects 57 to 67, wherein the substrate comprises a surface of an aerospace vehicle.

Aspect 70. The sealant system of any one of aspects 57 to 67, wherein the substrate comprises a surface of a part.

Aspect 71. The sealant system of aspect 70, wherein the part comprises a vehicle part.

Aspect 72. The sealant system of aspect 70, wherein the part comprises an aerospace vehicle part.

Aspect 73. A vehicle comprising the sealant system of any one of aspects 53 to 72.

Aspect 74. An aerospace vehicle comprising the sealant system of any one of aspects 53 to 72.

Aspect 75. A method of sealing a substrate, comprising: applying the adhesion-promoting composition of any one of claims 1-37, 44, and 51 to a substrate; drying the applied adhesion-promoting composition; applying a sealant composition onto the dried adhesion-promoting composition; and curing the applied sealant composition to seal the substrate.

Aspect 76. The method of aspect 75, wherein the dried adhesion-promoting composition comprises less than 0.1 wt % of the organic solvent, wherein wt % is based on the total weight of the dried adhesion-promoting layer.

Aspect 77. The method of any one of aspects 75 to 76, wherein the dried adhesion-promoting composition comprises less than 0.1 wt % water.

Aspect 78. The method of any one of aspects 75 to 77, wherein drying comprises exposing to 25° C. for at least 1 hour.

Aspect 79. The method of any one of aspects 75 to 78, wherein the sealant composition comprises a free radical polymerizable sealant composition.

Aspect 80. The method of any one of aspects 75 to 79, wherein the sealant composition comprises a photoinitiator.

Aspect 81. The method of any one of aspects 75 to 80, wherein curing comprises exposing the applied sealant composition to actinic radiation to activate the free-radical initiator.

Aspect 82. The method of any one of aspects 75 to 80, wherein curing comprises exposing the applied sealant composition to UV radiation.

Aspect 83. The method of any one of aspects 75 to 82, wherein applying the adhesion-promoting composition comprises applying a layer of the adhesion-promoting composition that, when dried, has a thickness from 1 µm to 20 µm.

Aspect 84. The method of any one of aspects 75 to 83, further comprising, before applying the adhesion-promoting composition, cleaning the surface of the substrate with a volatile organic solvent.

Aspect 85. The method of any one of aspects 75 to 84, wherein applying the adhesion-promoting composition comprises wiping, spraying, or brushing the adhesion-promoting composition onto the substrate.

Aspect 86. The method of any one of aspects 75 to 85, wherein the sealant composition comprises, a sulfur-containing prepolymer comprising a thiol-terminated sulfur-containing prepolymer; and a curing agent comprising a polyalkenyl, a polyalkynyl, or a combination thereof.

Aspect 87. The method of any one of aspects 75 to 85, wherein the sealant composition comprises, a sulfur-containing prepolymer comprising an alkenyl-terminated sulfur-containing prepolymer, an alkynyl-terminated prepolymer, or a combination thereof; and a curing agent comprising a polythiol.

Aspect 88. The method of any one of aspects 75 to 85, wherein the sealant composition comprises a sulfur-containing prepolymer comprising a polythioether prepolymer, a polysulfide prepolymer, a sulfur-containing polyformal prepolymer, a monosulfide prepolymer, or a combination of any of the foregoing.

Aspect 89. The method of aspect 88, wherein the sulfur-containing prepolymer comprises a thiol-terminated sulfur-containing prepolymer.

Aspect 90. The method of any one of aspects 75 to 89, wherein the substrate comprises a metal or a metal alloy.

Aspect 91. The method of any one of aspects 75 to 89, wherein the substrate comprises an aluminum alloy or a stainless steel alloy.

Aspect 92. The method of any one of aspects 75 to 91, wherein the substrate comprises a surface of a vehicle.

Aspect 93. The method of any one of aspects 75 to 91, wherein the substrate comprises a surface of an aerospace vehicle.

Aspect 94. The method of any one of aspects 75 to 91 wherein the substrate comprises a surface of a part.

Aspect 95. The method of aspect 94, wherein the part comprises a vehicle part.

Aspect 96. The method of aspect 94, wherein the part comprises an aerospace vehicle part.

EXAMPLES

Embodiments provided by the present disclosure are further illustrated by reference to the following examples, which describe adhesion-promoting compositions provided by the present disclosure, uses of such compositions, and sealant systems comprising adhesion-promoting layers prepared using adhesion-promoting compositions provided by the present disclosure. It will be apparent to those skilled in the art that many modifications, both to materials, and methods, may be practiced without departing from the scope of the disclosure.

Example 1

Sealant Formulations

The ability of alkoxysilane compositions to serve as adhesive-promoting layers was evaluated using a UC-curable thiol-ene based sealant formulation The sealant was prepared by combining two parts. The compositions of Part A and Part B are provided in Table 1 and Table 2, respectively.

Preparation of Part A: In a Black Max® 200 JAR (Flack-Tek Inc.; Landrum, S.C.) cup, the Part A composition was prepared by sequentially adding vinyl ethers, initiators, plasticizers, and fillers (Table 1) followed by gentle mixing first using a spatula and then by using a Speed Mixer® (Hauschild, Model No. DAC 600FVZ) at 2,000 rpm for 30 sec. After adding the fumed silica, the resulting mixture was mixed at 2,000 rpm for 60 sec to produce a well-dispersed mixture having a viscosity of ca. 280 poise (28 Pa-s) (Brookfield Viscometer CAP 2000; Spindle #7, 10 rpm, 25° C.). In addition, before adding Part A to the formulation, the cup was mixed at 2,000 rpm for 30 sec to ensure homogeneity before transferring the material to a formulating cup.

Preparation of Part B: In a Hauschild Black Max® 200 JAR, 57.34 g of Permapol® P-3.1 E prepolymer (PPG Aerospace, Sylmar, Calif.) (Thiol EW: 1625) was added followed by 13.53 g of a higher functionality Permapol® P3.1 E-2.8 (PPG Aerospace, Sylmar, Calif.) (thiol EW: 1531) and 2.49 g of a polythiol (Table 2). The resulting mixture was first hand-mixed using a spatula followed by mixing at 1,200 rpm for 1 min using a Hauschild Speed Mixer®. To this mixture 5.39 g of ACumist® A6, a micronized oxidized polyethylene homopolymer (Honeywell International, Morris Plains, N.J.) was added, followed by mixing at 2,000 rpm for 1 min. To this mixture, fumed silicas were added followed by mixing at 2,350 rpm for 2 mins. This was followed by the addition of 16.37 g of silica gel (Gasil® IJ35, PQ Corporation, Valley Forge, Pa.) and mixing at 2,300 rpm for 2 min (twice) with intermittent hand mixing to ensure all filler in the cup had been incorporated. This was followed by the addition of lightweight filler (Expancel® 920; AkzoNohel Inc.) and mixing at 1800 rpm for 1 min. This was followed by the addition of adhesion promoter (mercaptopropyl trimethoxy silane) and the formulation mixed at 2,000 rpm for 1 min (twice) with an intermittent hand mix. The final formulation had a viscosity of ca. 20,000 poise (2,000 Pa-s) (Brookfield Viscometer CAP2000; Spindle #7, 10 rpm 25° C.).

TABLE 1

Composition of UV Curable Components: Part A.

| Component | Product | Amount wt % |
|---|---|---|
| Cycloaliphatic divinyl ether | Cyclohexanedimethanol divinyl ether | 69.41 |
| Hydroxyl-functional vinyl ether | 4-hydroxybutyl vinyl ether | 9.49 |
| Photoinitiator | Darocure ® TPO Lucirin ® TPO Speedcure TPO | 0.31 |
| Photoinitiator | Irgacure ® TPO Omnirad ® 551 | 1.25 |
| Plasticizer | Polybutadiene | 8.45 |
| Inorganic filler | Precipitated calcium carbonate | 0.91 |
| Inorganic filler | Fumed silica | 10.18 |

TABLE 2

Composition of UV Curable Components: Part B.

| Component | Product | Amount wt % |
|---|---|---|
| Thiol-terminated polythioether (thiol EW 1625) | Permapol ® 3.1E | 57.34 |
| Thiol-terminated polythioether (thiol EW 1531) | Permapol ® 3.1E-2.8 | 13.53 |
| Polythiol | — | 2.49 |
| micronized oxidized polyethylene homopolymer | ACumist ® A6 | 5.39 |
| Inorganic filler | Fumed Silica | 1.94 |
| Inorganic filler | Fumed Silica | 2.56 |
| Silica gel | Gasil ® IJ35 | 16.37 |
| Lightweight Filler | Expancel ® 920 DE 40 D30 | 0.25 |
| Adhesion Promoter | Mercaptopropyl trimethoxy silane | 0.13 |

Part B and Part A were mixed in a weight ratio of 100 g Part B to 8 g Part A to provide a UV-curable sealant composition (UVSCOD sealant).

Example 2

Adhesion Using Reacted Adhesion-Promoting Compositions

The adhesion of the UVSCOD sealant (UV Cure-On-Demand) described in Example 1 to aluminum and stainless substrates using various adhesion-promoting layers was evaluated. The composition of the adhesion-promoting compositions is provided in Table 3.

TABLE 3

Content of adhesion-promoting formulations.

| Formulation | 1 | 2 | 3 | 4 | 5 | 6 | 7 | 8 |
|---|---|---|---|---|---|---|---|---|
| γ-Aminopropyltriethoxysilane (wt %)[1] | 6 | 6 | 6 | 6 | 6 | 6 | 6 | 6 |
| Alkenyl-functional alkoxysilane (wt %)[2] | 9 | 9 | 9 | 9 | 9 | 9 | 9 | 9 |
| (3-Trimethoxysilylpropyl)diethylene triamine (wt %)[3] | — | 3 | — | — | — | — | — | 3 |
| γ-Mercaptopropyltrimethoxysilane (wt %)[4] | — | — | 5 | — | — | — | — | — |
| n-Octylmethyldichlorosilane (wt %)[5] | — | — | — | 5 | — | — | — | — |
| β-(3,4-Epoxycyclohexyl)ethyltrimethoxysilane (wt %)[6] | — | — | — | — | 5 | — | — | — |
| Vinyl tris(methylethylketoxime)silane (wt %)[7] | — | — | — | — | — | 5 | — | — |
| Tyzor® AA (wt %)[8] | — | — | — | — | — | — | 5 | — |
| Tyzor® 217 (wt %)[9] | — | — | — | — | — | — | — | 5 |
| Water (wt %) | 3.2 | 6 | 3.2 | 3.2 | 3.2 | 3.2 | 3.2 | 6 |
| Organic solvent (wt %) | 81.8[10] | 76.0[11] | 81.8[10] | 81.8[10] | 81.8[10] | 81.8[10] | 81.8[10] | 79.0[11] |

[1]Silquest® A-1100, γ-aminopropyltriethoxy silane; Momentive Performance Materials Inc.
[2]Silquest® Y-15866, alkenyl-functional alkoxysilane; Momentive Performance Materials Inc.
[3]SIT 8398, (3-trimethoxysilylpropyl)diethylene triamine; Gelest.
[4]Silquest® A-189, γ-aminopropyltriethoxy silane; Momentive Performance Materials Inc.
[5]SIO 6712, n-octylmethyldiethoxysilane; Gelest.
[6]Silquest® A-186, β-(3,4-epoxycyclohexyl)ethyltrimethoxysilane; Momentive Performance Materials Inc.
[7]Vinyl tris(methylethylketoxime)silane, Toray Industries.
[8]Tyzor® AA, titanium diisopropoxide bis(acetylacetonate), available from E. I. du Pont de Nemours and Co.
[9]Tyzor® 217, aqueous solution of the sodium salt of zirconium lactate, available from E. I. du Pont de Nemours and Co.
[10]Isopropanol.
[11]PGME, propylene glycol methyl ether.

Formulations 1 and 2 were prepared by combining the amine-functional alkoxysilane(s), the alkenyl-functional alkoxysilane, water, and alcohol or propylene glycol methyl ether (PGME) and heating the mixture to a temperature of 70° C. for 3 hours to provide a reacted alkoxysilane composition.

Formulations 3-8 were prepared by adding an organofunctional alkoxysilane (Formulations 3-6), an organic titanate (Formulation 7), or an organic zirconate (Formulation 8) to the reacted alkoxysilane composition of Formulations 1 or 2 after the reacted alkoxysilane compositions were cooled to 25° C. The formulations were stable at 25° C. and were visibly clear.

Peel samples were prepared on Alclad (2024-T3) and stainless steel (AMS5518) panels according to the AMS draft specification G9-16AA. The panels were first cleaned with methyl ethyl ketone (MEK).

The adhesion-promoting compositions were applied to the cleaned test panels by wiping with a saturated gauze pad. The applied adhesion-promoting compositions were dried at ambient conditions (25° C./50% RH) for at least 30 min.

After drying, the thickness of the adhesion-promoting layer was about 3 μm. The UVSCOD sealant of Example 1 was then applied over the dried adhesion-promoting layer to a thickness of about 0.125 in (3.175 mm). A pre-primed peel medium, for example, a 30-mesh stainless steel screen, was placed on top of the UVSCOD sealant, before an overcoat of the UVSCOD sealant was applied to a thickness of 0.03 in (0.762 mm). The UVSCOD sealant was exposed to UV at 395 nm (LED source) for 1 min at 0.26 W/cm² using an OmniCure® AC475 8 W UV LED lamp (Excelitas Technologies).

The adhesion of the cured sealant system was evaluated within 24 hours after UV exposure according to AMS G9-16AA. Specification AMS G9-16AA requires 100% cohesive failure. The percentage cohesive failure (%) on cladded aluminum (QQ-A-250/5 or 2024-T3) test panels is provided in Table 5, and on stainless steel (AMS-5518) test panels is provided in Table 6.

TABLE 5

Peel data on cladded aluminum (QQ-A-250/5 or 2024-T3).

| Formulation | Composition[1] | 2 h | 1 d | 4 d | 1 wk | 2 wk | 4 wk | 8 wk | 12 wk |
|---|---|---|---|---|---|---|---|---|---|
| 1 | — | — | — | — | AF[2] | AF | AF | AF | AF |
| 2 | — | CF[3] | CF | AF | AF | AF | AF | AF | AF |
| 3 | Mercapto-alkoxysilane | CF | 70% CF | AF | AF | AF | AF | AF | AF |
| 4 | Alkyl-alkoxysilane | CF | CF | AF | AF | AF | AF | AF | AF |
| 5 | Epoxy-alkoxysilane | CF | CF | 40% CF | AF | AF | AF | AF | AF |
| 6 | Ketoxime silane | CF | 80% CF | AF | AF | AF | AF | AF | AF |

TABLE 5-continued

Peel data on cladded aluminum (QQ-A-250/5 or 2024-T3).

| Formulation | Composition[1] | 2 h | 1 d | 4 d | 1 wk | 2 wk | 4 wk | 8 wk | 12 wk |
|---|---|---|---|---|---|---|---|---|---|
| 7 | Tyzor ® AA | AF | CF | CF | CF | CF | CF | CF | CF |
| 8 | Tyzor ® 217 | CF | CF | CF | CF | NA | 60% CF | AF | AF |

[1]Components in addition to the reacted amine-functional/alkenyl-functional alkoxysilane composition.
[2]AF, 100% adhesive failure.
[3]CF, 100% cohesive failure.

TABLE 6

Peel strength on stainless steel (AMS-5518).

| Formulation | Composition[1] | 2 h | 1 d | 4 d | 1 wk | 2 wk | 4 wk | 8 wk | 12 wk |
|---|---|---|---|---|---|---|---|---|---|
| 1 | — | — | — | — | AF[2] | AF | AF | AF | AF |
| 2 | — | CF[3] | CF | AF | AF | AF | AF | AF | AF |
| 3 | Mercapto-alkoxysilane | CF | CF | AF | AF | AF | AF | AF | AF |
| 4 | Alkyl-alkoxysilane | CF | CF | 50% CF | 50% CF | AF | AF | AF | AF |
| 5 | Epoxy-alkoxysilane | CF | CF | 40% CF | AF | AF | AF | AF | AF |
| 6 | Ketoxime silane | CF | CF | AF | AF | AF | AF | AF | AF |
| 7 | Tyzor ® AA | AF | CF | CF | CF | CF | CF | CF | CF |
| 8 | Tyzor ® 217 | CF | CF | CF | CF | NA | CF | 50% CF | AF |

[1]Components in addition to the reacted amine-functional/alkenyl-functional alkoxysilane composition.
[2]AF, 100% adhesive failure.
[3]CF, 100% cohesive failure Adhesion-promoting layers containing an organic titanate or an organic zirconate catalyst provided enhanced adhesion of the UVSCOD sealant compared to adhesion-promoting layers prepared using only reacted organo-functional alkoxysilanes.

Example 3

Stability and Adhesion of Alkoxysilane Adhesion-Promoting Compositions

The stability and adhesion of the UVSCOD sealant of Example 1 to metal surfaces containing an adhesion-promoting layer prepared using non-reacted amine/alkenyl alkoxysilane compositions was evaluated.

The content of the various adhesion-promoting compositions tested is shown in Table 7.

Formulation 9 was prepared by combining the amine-functional alkoxysilane, the alkenyl-functional alkoxysilane, water, and alcohol and heating the mixture at 60° C. for 30 min. After cooling to 25° C., Tyzor® TOT was added. The mixture immediately precipitated.

Formulations 10 and 11 were prepared by combining the amine-functional alkoxysilane, the alkenyl-functional alkoxysilane, and either Tyzor® TOT or Tyzor® NPZ, respectively, in isopropanol.

Water was not used, and the formulations were not heated. Both formulations immediately became cloudy and gelled overnight.

Stable formulations 12-15 were prepared as follows. The amino-functional alkoxysilanes and alkenyl-functional alkoxysilanes were combined with isopropanol (Formulation 12) and reacted at 60° C. for 30 min. The reacted alkoxysilane composition was cooled to 25° C. and either an organic titanate or an organic zirconate was added (Formulations 13-15).

TABLE 7

Content of adhesion-promoting formulations.

| Formulation | 9 | 10 | 11 | 12 | 13 | 14 | 15 |
|---|---|---|---|---|---|---|---|
| Silquest ® A-110 γ-aminopropyltriethoxysilane[1] (wt %) | 6 | 6 | 6 | 6 | 6 | 6 | 6 |
| Silquest ® Y-15866 Alkenyl-functional alkoxysilane[2] (wt %) | 9 | 9 | 9 | 9 | 9 | 9 | 9 |
| Gelest SIB1824 (3-trimethoxysilylpropyl)diethylene triamine[3] (wt %)[3] | 0 | 5 | 5 | 5 | 5 | 5 | 5 |
| SIV 9280 vinyltris(methylethylketoxime)silane[4] | 0 | 0 | 0 | 5 | 5 | 5 | 5 |
| Tyzor ® AA[5] (wt %) | 0 | 0 | 0 | 0 | 5 | 0 | 0 |
| Tyzor ® TOT[6] (wt %) | 5 | 5 | 0 | 0 | 0 | 5 | 0 |
| Tyzor ® NPZ[7] (wt %) | 0 | 0 | 5 | 0 | 0 | 0 | 5 |
| Water (wt %) | 3.2 | 0 | 0 | 0 | 0 | 0 | 0 |
| Isopropanol (wt %) | 81.8 | 75 | 75 | 80 | 75 | 75 | 75 |

[1]Silquest ® A-1100, γ-aminopropyltriethoxy silane; Momentive Performance Materials Inc.
[2]Silquest ® Y-15866, alkenyl-functional alkoxysilane; Momentive Performance Materials Inc.
[3]SIB1824.5, bis(3-triethoxysilylpropyl)amine.
[4]SIV 9280.0, vinyltris(methylethylketoxime)silane.
[5]Tyzor ® AA, titanium diisopropoxide bis(acetylacetonate).
[6]Tyzor ® TOT, titanium(IV) 2-ethylhexyloxide.
[7]Tyzor ® NPZ, tetra-n-propyl zirconate.

The cladded aluminum test panels were prepared and tested according to the methods described in Example 2. Formulations 9-11 were not evaluated. The results are presented in Table 8.

TABLE 8

Peel data on cladded aluminum (QQ-A-250/5 or 2024-T3).

| Formulation No. | Composition | Tyzor ® | 1 day | 4 day | 8 day |
|---|---|---|---|---|---|
| 12 | amino-alkoxysilane alkenyl-alkoxysilane | none | — | — | AF[1] |
| 13 | amino-alkoxysilane alkenyl-alkoxysilane | Tyzor ® AA | CF[2] | CF | CF |
| 14 | amino-alkoxysilane alkenyl-alkoxysilane | Tyzor ® TOT | CF | CF | CF |
| 15 | amino-alkoxysilane alkenyl-alkoxysilane | Tyzor ® NPZ | CF | CF | CF |

[1]AF, adhesive failure.
[2]CF, cohesive failure

A description of the organic titanates and organic zirconates used in the experimental Examples is presented in Table 9.

TABLE 9

Description of certain organic titanates and organic zirconates.

| Organic titanate/zirconate | | Active content (wt %) | TiO$_2$/ZrO$_2$ Content (wt %) | Ti/Zr Content (wt %) | Solvent |
|---|---|---|---|---|---|
| Tyzor ® AA | Titanium acetylacetonate | 75 | 16.5 | 9.9 | isopropanol |
| Tyzor ® TOT | Titanium organic alkoxy | 100 | 14.4 | 8.6 | — |
| Tyxor ® NPZ | Tetra-n-propyl zirconate | 74 | 28 | 20.7 | n-propanol |
| Tyzor ® 217 | Zirconate lactate | 0 | 7.3 | 5.4 | water |

Finally, it should be noted that there are alternative ways of implementing the embodiments disclosed herein. Accordingly, the present embodiments are to be considered as illustrative and not restrictive. Furthermore, the claims are not to be limited to the details given herein and are entitled to their full scope and equivalents thereof.

What is claimed is:

1. An adhesion-promoting composition comprising:
an organic titanate, an organic zirconate, or a combination thereof; and
a reacted alkoxysilane composition, wherein the reacted alkoxysilane composition comprises the reaction product of reactants comprising:
from 1 wt % to 30 wt % of an amine-functional alkoxysilane;
from 1 wt % to 30 wt % of an alkenyl-functional alkoxysilane; and
from 50 wt % to 95 wt % of an organic solvent,
wherein wt % is based on the total weight of the reactants.

2. The adhesion-promoting composition of claim 1, wherein the adhesion-promoting composition comprises from 1 wt % to 10 wt % of the organic titanate, the organic zirconate, or a combination thereof.

3. The adhesion-promoting composition of claim 1, wherein the reactants comprise from 0.5 wt % to 10 wt % water, wherein wt % is based on the total weight of the reactants.

4. The adhesion-promoting composition of claim 1, wherein the reacted alkoxysilane composition comprises the reaction products of the reactants heated to a temperature up to 100° C. for at least 30 minutes.

5. The adhesion-promoting composition of claim 1, wherein the reactants comprise:
from 5 wt % to 15 wt % of the amine-functional alkoxysilane;
from 5 wt % to 15 wt % of the alkenyl-functional alkoxysilane; and
from 65 wt % to 85 wt % of the organic solvent,
wherein wt % is based on the total weight of the reactants.

6. The adhesion-promoting composition of claim 1, wherein,
the amine-functional alkoxysilane comprises (3-aminopropyl)triethoxysilane, (3-trimethoxysilylpropyl)diethylenetriamine, bis(3-triethoxysilylpropyl)amine, or a combination of any of the foregoing; and
the alkenyl-functional alkoxysilane comprises a monoalkenyl-functional alkoxysilane, a dialkenyl-functional alkoxysilane, an alkenyl-functional ketoximino alkoxysilane, a dipodal alkenyl-functional alkoxysilane, or a combination of any of the foregoing.

7. The adhesion-promoting composition of claim 1, wherein,
the organic titanate comprises titanium diisopropoxide bis(acetylacetonate), titanium(IV) 2-ethylhexyloxide, or a combination thereof; and
the organic zirconate comprises the sodium salt of zirconium lactate, tetra-n-propyl zirconate, or a combination thereof.

8. The adhesion-promoting composition of claim 1, wherein the organic solvent comprises an alcohol, a propylene glycol ether, methyl ethyl ketone, ethyl acetate, or a combination of any of the foregoing.

9. The adhesion-promoting composition of claim 1, further comprising a colorant.

10. An adhesion-promoting layer prepared from the adhesion-promoting composition of claim 1.

11. A sealant system comprising:
(a) an adhesion-promoting layer overlying a substrate, wherein the adhesion-promoting layer is derived from:
from 10 wt % to 90 wt % of an organic titanate, an organic zirconate, or a combination thereof; and
from 10 wt % to 90 wt % of reacted alkoxysilanes, wherein the alkoxysilanes comprise an amino-functional alkoxysilane and an alkenyl-functional alkoxysilane;
wherein wt % is based on the total weight of the adhesion-promoting layer; and
(b) a sealant overlying the adhesion-promoting layer, wherein the sealant comprises a reaction product of reactants comprising:
a sulfur-containing prepolymer; and
a curing agent reactive with the sulfur-containing prepolymer.

12. The sealant system of claim 11, wherein the adhesion-promoting layer comprises:
from 15 wt % to 35 wt % of the organic titanate, the organic zirconate, or a combination thereof; and from 65 wt % to 85 wt % of the reacted alkoxysilanes, wherein the alkoxysilanes comprise an amino-functional alkoxysilane and an alkenyl-functional alkoxysilane;

wherein wt % is based on the total weight of the adhesion-promoting layer.

13. The sealant system of claim 11, wherein the sealant comprises a free radical polymerized sealant.

14. The sealant system of claim 11, wherein, the sulfur-containing prepolymer comprises a thiol-terminated sulfur-containing prepolymer; and the curing agent comprises a polyalkenyl, a polyalkynyl, or a combination thereof.

15. The sealant system of claim 11, wherein, the sulfur-containing prepolymer comprises a thiol-terminated polythioether prepolymer; and the curing agent comprises a divinyl ether, a polyalkenyl polyfunctionalizing agent, or a combination thereof.

16. A sealant system comprising:
  (a) an adhesion-promoting layer overlying a substrate, wherein the adhesion-promoting layer is derived from:
    from 10 wt % to 90 wt % of an organic titanate, an organic zirconate, or a combination thereof; and
    from 10 wt % to 90 wt % of reacted alkoxysilanes, wherein the alkoxysilanes comprise an amino-functional alkoxysilane and an alkenyl-functional alkoxysilane;
    wherein wt % is based on the total weight of the adhesion-promoting layer; and
  (b) a sealant overlying the adhesion-promoting layer, wherein the sealant comprises a UV photoinitiator.

17. The sealant system of claim 11, wherein the adhesion-promoting layer has a thickness from 1 μm to 20 μm.

18. A sealant system comprising:
  (a) an adhesion-promoting layer overlying a substrate, wherein the adhesion-promoting layer is derived from:
    from 10 wt % to 90 wt % of an organic titanate, an organic zirconate, or a combination thereof; and
    from 10 wt % to 90 wt % of reacted alkoxysilanes, wherein the alkoxysilanes comprise an amino-functional alkoxysilane and an alkenyl-functional alkoxysilane;
    wherein wt % is based on the total weight of the adhesion-promoting layer; and
  (b) a sealant overlying the adhesion-promoting layer wherein,
    the substrate comprises cladded aluminum or stainless steel; and
    the sealant system exhibits greater than 20 pli peel strength and 100% cohesive failure determined according to AMS G9-16AA after curing for at least 1 week.

19. A aerospace vehicle comprising a sealant system comprising:
  (a) an adhesion-promoting layer overlying a substrate, wherein the adhesion-promoting layer is derived from:
    from 10 wt % to 90 wt % of an organic titanate, an organic zirconate, or a combination thereof; and
    from 10 wt % to 90 wt % of reacted alkoxysilanes, wherein the alkoxysilanes comprise an amino-functional alkoxysilane and an alkenyl-functional alkoxysilane;
    wherein wt % is based on the total weight of the adhesion-promoting layer; and
  (b) a sealant overlying the adhesion-promoting layer.

20. A method of sealing a substrate, comprising:
  applying the adhesion-promoting composition of claim 1 to a substrate;
  drying the applied adhesion-promoting composition;
  applying a sealant composition onto the dried adhesion-promoting composition; and
  curing the applied sealant composition to seal the substrate.

21. The adhesion promoting composition of claim 1, wherein the adhesion promoting composition comprises:
  from 1 wt % to 30 wt % of the organic zirconate, the organic titanate, or combination thereof; and
  from 70 wt % to 99 wt % of the reacted alkoxysilane composition,
  wherein wt % is based on the total weight of the adhesion promoting composition.

* * * * *